US009955528B2

(12) United States Patent
Ciuperca

(10) Patent No.: US 9,955,528 B2
(45) Date of Patent: *Apr. 24, 2018

(54) APPARATUS FOR ELECTRONIC TEMPERATURE CONTROLLED CURING OF CONCRETE

(71) Applicant: Romeo Ilarian Ciuperca, Norcross, GA (US)

(72) Inventor: Romeo Ilarian Ciuperca, Norcross, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/499,205

(22) Filed: Sep. 28, 2014

(65) Prior Publication Data

US 2015/0014300 A1 Jan. 15, 2015

Related U.S. Application Data

(63) Continuation of application No. 13/968,190, filed on Aug. 15, 2013, now Pat. No. 8,855,803, which is a continuation of application No. 13/626,075, filed on Sep. 25, 2012, now Pat. No. 8,532,815.

(51) Int. Cl.
| | | |
|---|---|---|
| H05B 1/02 | (2006.01) |
| B29C 39/00 | (2006.01) |
| B28B 11/24 | (2006.01) |
| B28B 7/42 | (2006.01) |
| B28B 17/00 | (2006.01) |
| E04G 9/10 | (2006.01) |
| E04G 13/00 | (2006.01) |
| E04G 21/24 | (2006.01) |
| C04B 28/08 | (2006.01) |
| C04B 40/04 | (2006.01) |

(52) U.S. Cl.
CPC ............. *H05B 1/0227* (2013.01); *B28B 7/42* (2013.01); *B28B 11/24* (2013.01); *B28B 17/0081* (2013.01); *B29C 39/00* (2013.01); *C04B 28/08* (2013.01); *C04B 40/04* (2013.01); *E04G 9/10* (2013.01); *E04G 13/00* (2013.01); *E04G 21/246* (2013.01); *Y02W 30/92* (2015.05)

(58) Field of Classification Search
CPC .................................................... G05D 11/00
USPC ......................................................... 700/198
See application file for complete search history.

(56) References Cited

U.S. PATENT DOCUMENTS

| | | |
|---|---|---|
| 2,053,135 A | 9/1936 | Dalton |
| 3,199,828 A | 8/1965 | Newton |
| 3,649,725 A | 3/1972 | Olson |
| 3,732,138 A | 5/1973 | Almog |
| 3,892,516 A | 7/1975 | McGrew et al. |

(Continued)

OTHER PUBLICATIONS

U.S. Appl. No. 14/610,744, filed Jan. 30, 2015.

(Continued)

*Primary Examiner* — Sean Shechtman
(74) *Attorney, Agent, or Firm* — Robert E. Richards; Richards IP Law

(57) ABSTRACT

The invention comprises a method of forming a concrete structure or object. The method comprises detecting the temperature of a quantity of curing concrete and selectively adding heat to the curing concrete, so that the temperature of the curing concrete follows a predetermined temperature profile during at least a portion of the concrete curing process. Apparatus for performing the method is also disclosed.

9 Claims, 25 Drawing Sheets

(56) References Cited

U.S. PATENT DOCUMENTS

| | | |
|---|---|---|
| 3,985,329 A | 10/1976 | Liedgens |
| 4,052,031 A | 10/1977 | Melfi |
| 4,085,495 A | 4/1978 | Hebert |
| 4,090,336 A | 5/1978 | Carroll |
| 4,157,638 A | 6/1979 | Della-Donna |
| 4,349,398 A | 9/1982 | Kearns et al. |
| 4,370,840 A | 2/1983 | Bisbee et al. |
| 4,462,949 A | 7/1984 | Fehlmann |
| 4,516,372 A | 5/1985 | Grutsch |
| 4,534,924 A | 8/1985 | Kariakin |
| 4,646,498 A | 3/1987 | Schneller et al. |
| 4,669,234 A | 6/1987 | Wilnau |
| 4,744,849 A | 5/1988 | Michaud-Soret |
| 4,765,109 A | 8/1988 | Boeshart |
| 4,811,927 A | 3/1989 | Slonimsky et al. |
| 4,866,897 A | 9/1989 | Yount |
| 4,885,888 A | 12/1989 | Young |
| 4,889,310 A | 12/1989 | Boeshart |
| 4,907,386 A | 3/1990 | Ekroth |
| 5,107,648 A | 4/1992 | Roby |
| 5,171,118 A | 12/1992 | Rothenbuhler |
| 5,217,339 A | 6/1993 | O'Connor et al. |
| 5,323,578 A | 6/1994 | Chagnon et al. |
| D357,855 S | 5/1995 | Keith et al. |
| 5,493,837 A | 2/1996 | Hepler |
| 5,497,592 A | 3/1996 | Boeshart |
| 5,570,550 A | 11/1996 | Roby |
| 5,606,832 A | 3/1997 | Keith et al. |
| 5,611,182 A | 3/1997 | Spude |
| 5,761,874 A | 6/1998 | Hayakawa |
| 5,765,318 A | 6/1998 | Michelsen |
| 5,792,552 A | 8/1998 | Langkamp et al. |
| 5,809,723 A | 9/1998 | Keith et al. |
| 5,809,725 A | 9/1998 | Cretti |
| 5,809,726 A | 9/1998 | Spude |
| 5,809,728 A | 9/1998 | Tremelling |
| 5,819,489 A | 10/1998 | McKinney |
| 5,836,126 A | 11/1998 | Harkenrider et al. |
| 5,966,885 A | 10/1999 | Chatelain |
| 5,992,114 A | 11/1999 | Zelinsky et al. |
| 6,026,620 A | 2/2000 | Spude |
| 6,086,349 A | 7/2000 | Del Monte |
| 6,134,861 A | 10/2000 | Spude |
| 6,138,981 A | 10/2000 | Keith et al. |
| 6,234,736 B1 | 5/2001 | Miescher |
| 6,263,638 B1 | 7/2001 | Long, Sr. |
| 6,305,135 B1 | 10/2001 | Inaba |
| 6,314,694 B1 | 11/2001 | Cooper et al. |
| 6,360,505 B1 | 3/2002 | Johns |
| 6,426,029 B1 | 7/2002 | Hiscock et al. |
| 6,612,083 B1 | 9/2003 | Richards |
| 6,688,066 B1 | 2/2004 | Cottier et al. |
| 6,725,616 B1 | 4/2004 | Pease |
| 6,729,090 B2 | 5/2004 | Messenger et al. |
| 6,783,273 B1* | 8/2004 | Mullins .............. G01N 25/4833 374/137 |
| 6,898,908 B2 | 5/2005 | Messenger et al. |
| 6,898,912 B2 | 5/2005 | Bravinski |
| 6,935,081 B2 | 8/2005 | Dunn et al. |
| 7,000,359 B2 | 2/2006 | Meyer |
| 7,398,131 B2 | 7/2008 | Trost et al. |
| 7,409,800 B2 | 8/2008 | Budge |
| 7,765,761 B2 | 8/2010 | Paradis |
| 7,818,935 B2 | 10/2010 | Velickovic |
| 7,934,693 B2 | 5/2011 | Bravinski |
| 8,032,244 B2 | 10/2011 | Trost et al. |
| 8,532,815 B1 | 9/2013 | Ciuperca |
| 8,545,749 B2 | 10/2013 | Ciuperca |
| 8,555,583 B2 | 10/2013 | Ciuperca |
| 8,555,584 B2 | 10/2013 | Ciuperca |
| 8,636,941 B1 | 1/2014 | Ciuperca |
| 8,745,943 B2 | 6/2014 | Ciuperca |
| 8,756,890 B2 | 6/2014 | Ciuperca |
| 8,844,227 B1 | 9/2014 | Ciuperca |
| 8,855,803 B2 | 10/2014 | Ciuperca |
| 8,877,329 B2 | 11/2014 | Ciuperca |
| 8,966,845 B1 | 3/2015 | Ciuperca |
| 2002/0005725 A1* | 1/2002 | Scott ............................ 324/637 |
| 2002/0092253 A1 | 7/2002 | Beliveau |
| 2003/0157302 A1* | 8/2003 | Handwerker ................. 428/178 |
| 2003/0192272 A1 | 10/2003 | Bravinski |
| 2004/0129857 A1 | 7/2004 | Musk et al. |
| 2004/0252745 A1* | 12/2004 | Park ...................... B28B 11/245 374/102 |
| 2005/0108985 A1 | 5/2005 | Bravinski |
| 2007/0062143 A1* | 3/2007 | Noushad ......................... 52/426 |
| 2007/0095255 A1 | 5/2007 | Abbate et al. |
| 2007/0144653 A1* | 6/2007 | Padilla et al. .................. 156/64 |
| 2007/0145041 A1* | 6/2007 | Shim ............................. 219/635 |
| 2008/0041004 A1 | 2/2008 | Gibbar et al. |
| 2008/0173788 A1 | 7/2008 | Brewka et al. |
| 2008/0221815 A1* | 9/2008 | Trost et al. ..................... 702/81 |
| 2008/0308210 A1* | 12/2008 | Keller et al. .................... 156/64 |
| 2008/0313991 A1 | 12/2008 | Chouinard |
| 2009/0202307 A1 | 8/2009 | Au et al. |
| 2009/0218474 A1 | 9/2009 | Bowman |
| 2009/0277103 A1 | 11/2009 | De Jaham |
| 2010/0062667 A1 | 3/2010 | Pan et al. |
| 2010/0162659 A1 | 7/2010 | Laprise |
| 2010/0192498 A1 | 8/2010 | Gleckman |
| 2010/0232877 A1* | 9/2010 | Sanvik ..................... E02D 3/11 404/77 |
| 2010/0319295 A1 | 12/2010 | Nelson |
| 2011/0031238 A1* | 2/2011 | Segawa et al. ................ 219/702 |
| 2011/0057090 A1 | 3/2011 | Spude et al. |
| 2011/0239566 A1 | 10/2011 | Ciuperca |
| 2012/0058299 A1 | 3/2012 | Serwin |
| 2012/0103966 A1* | 5/2012 | Gladhill et al. ............... 219/391 |
| 2013/0074432 A1 | 3/2013 | Ciuperca |
| 2013/0074433 A1 | 3/2013 | Ciuperca |
| 2013/0119576 A1 | 5/2013 | Ciuperca |
| 2013/0343734 A1* | 12/2013 | Dock et al. .................... 392/441 |
| 2014/0041329 A1 | 2/2014 | Ciuperca |
| 2014/0083333 A1 | 3/2014 | Ciuperca |
| 2014/0084132 A1 | 3/2014 | Ciuperca |
| 2014/0087158 A1 | 3/2014 | Ciuperca |
| 2014/0088756 A1 | 3/2014 | Ciuperca |
| 2014/0174647 A1 | 6/2014 | Ciuperca |
| 2014/0212643 A1 | 7/2014 | Ciuperca |
| 2014/0260034 A1 | 9/2014 | Ciuperca |
| 2014/0263942 A1 | 9/2014 | Ciuperca |
| 2014/0272302 A1 | 9/2014 | Ciuperca |
| 2014/0312524 A1 | 10/2014 | Ciuperca |
| 2014/0332658 A1 | 11/2014 | Ciuperca |
| 2014/0333004 A1 | 11/2014 | Ciuperca |
| 2014/0333010 A1 | 11/2014 | Ciuperca |
| 2015/0007524 A1 | 1/2015 | Ciuperca |
| 2015/0014300 A1 | 1/2015 | Ciuperca |

OTHER PUBLICATIONS

U.S. Appl. No. 14/311,310, filed Jan. 30, 2015.
U.S. Appl. 14/227,490, filed Mar. 27, 2015.
U.S. Appl. No. 14/499,205, filed Sep. 28, 2014.
U.S. Appl. No. 14/531,644, filed Nov. 3, 2014.
U.S. Appl. No. 13/626,103, filed Sep. 25, 2012.
U.S. Appl. No. 14/610,772, filed Jan. 30, 2015.
U.S. Appl. No. 14/165,630, filed Jan. 28, 2014.
U.S. Appl. No. 14/499,208, filed Sep. 28, 2014.
U.S. Appl. No. 13/834,697, filed Mar. 15, 2013.
U.S. Appl. No. 14/214,815, filed Mar. 15, 2014.
U.S. Appl. No. 14/275,854, filed May 12, 2014.
U.S. Appl. No. 14/275,833, filed May 12, 2014.
U.S. Appl. No. 14/480,948, filed Sep. 9, 2014.
U.S. Appl. No. 14/480,967, filed Sep. 9, 2014.
U.S. Appl. No. 14/229,566, filed Mar. 28, 2014.

* cited by examiner

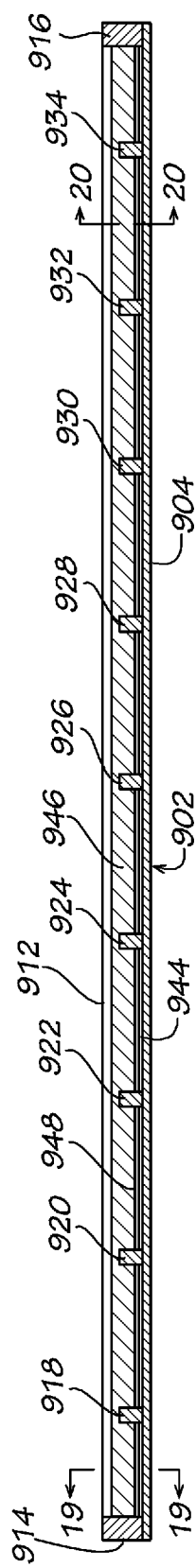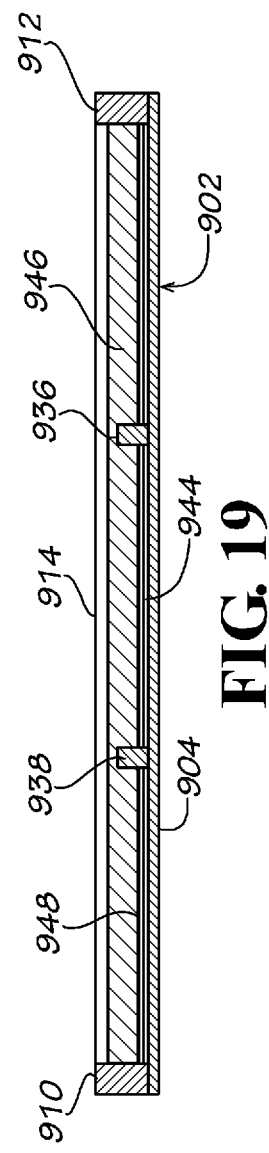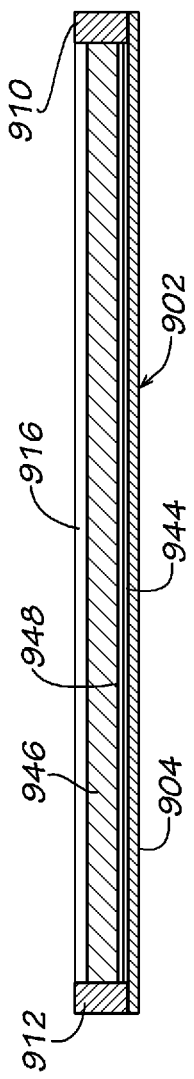

APPARATUS FOR ELECTRONIC TEMPERATURE CONTROLLED CURING OF CONCRETE

CROSS-REFERENCE TO RELATED APPLICATIONS

The present application is a continuation of application Ser. No. 13/968,190 filed Aug. 15, 2013, now U.S. Pat. No. 8,855,803, which is a continuation of application Ser. No. 13/626,075 filed Sep. 25, 2012, now U.S. Pat. No. 8,532,815.

FIELD OF THE INVENTION

The present invention generally relates to concrete curing. More particularly, this invention relates to a system for controlling the temperature of concrete in a concrete form or mold, particularly an insulated concrete form or mold. The present invention also relates to curing concrete over time in a concrete form or mold according to a predetermined temperature profile to achieve increased concrete strength. The present invention also relates to curing concrete to accelerated concrete maturity or equivalent age of concrete to achieve improved physical properties. The present invention also relates to a system for controlling the temperature differential in concrete, especially mass concrete.

BACKGROUND OF THE INVENTION

Concrete walls, and other concrete structures and objects, traditionally are made by building a form or a mold. The forms and molds are usually made from wood, plywood, metal and other structural members. Unhardened (plastic) concrete is poured into the space defined by opposed spaced form members. Once the concrete hardens sufficiently, although not completely, the forms are removed leaving a concrete wall, or other concrete structure, structural member or concrete object, exposed to ambient temperatures. The unprotected concrete walls, structures or objects are then exposed to the elements during the remainder of the curing process. The exposure of the concrete to the elements, especially temperature variations, often makes the curing of the concrete a slow process and the ultimate strength difficult to control or predict. To compensate for these losses, larger amounts of portland cement sometimes are used than otherwise would be necessary in order to insure sufficient concrete strength is achieved.

The curing of plastic concrete requires two elements, water and heat, to fully hydrate the cementitious material. The curing of plastic concrete is an exothermic process. This heat is produced by the hydration of the portland cement, or other cementitious materials, that make up the concrete. Initially, the hydration process produces a relatively large amount of heat. As the hydration process proceeds, the rate of hydration slows thereby reducing the rate of heat production. At the same time, moisture in the concrete is lost to the environment. If one monitors the temperature of concrete during the curing process, it produces a relatively large increase in temperature which then decreases rapidly over time. This chemical reaction is temperature dependent. That is, the hydration process, and consequently the strength gain, proceeds faster at higher temperature and slower at lower temperature. In traditional curing of concrete, first, the heat is lost which slows the hydration process; then, the moisture is lost making it difficult for the cementitious material to fully hydrate, and, therefore, impossible for the concrete to achieve its maxim strength.

Concrete in conventional concrete forms or molds is typically exposed to the elements. Conventional forms or molds provide little insulation to the concrete contained therein. Therefore, heat produced within the concrete form or mold due to the hydration process usually is lost through a conventional concrete form or mold relatively quickly. Thus, the temperature of the plastic concrete may initially rise 20 to 40° C., or more, above ambient temperature due to the initial hydration process and then fall relatively quickly to ambient temperature, such as within 12 to 36 hours. This initial relatively large temperature drop may result is concrete shrinkage and/or concrete cracking. The remainder of the curing process then proceeds at approximately ambient temperatures, because the relatively small amount of additional heat produced by the remaining hydration process is relatively quickly lost through the uninsulated concrete form or mold. The concrete is therefore subjected to the hourly or daily fluctuations of ambient temperature from hour-to-hour, from day-to-night and from day-to-day. Failure to cure the concrete under ideal temperature and moisture conditions affects the ultimate strength and durability of the concrete. In colder weather, concrete work may even come to a halt since concrete will freeze, or not gain much strength at all, at relatively low temperatures. By definition (ACI 306), cold weather conditions exist when " . . . for more than 3 consecutive days, the average daily temperature is less than 40 degrees Fahrenheit and the air temperature is not greater than 50 degrees Fahrenheit for more than one-half of any 24 hour period." Therefore, in order for hydration to take place, the temperature of concrete must be above 40° F.; below 40° F., the hydration process slows and at some point may stop altogether. It is typically recommended that concrete by moisture cured for 28 days to fully hydrate the concrete. However, this is seldom possible to achieve in commercial practice.

Insulated concrete form systems are known in the prior art and typically are made from a plurality of modular form members. U.S. Pat. Nos. 5,497,592; 5,809,725; 6,668,503; 6,898,912 and 7,124,547 (the disclosures of which are all incorporated herein by reference) are exemplary of prior art modular insulated concrete form systems. Full-height insulated concrete forms are also known in the prior art. U.S. Pat. No. 8,555,583 (the disclosure of which is incorporated herein by reference) discloses a full-height insulated concrete form.

Insulated concrete forms or molds reduce the heat transmission to and from the concrete within such forms or molds. However, some heat may still manage to escape or penetrate the insulation and thereby affect the temperature of the concrete therein. Concrete will not cure to its maximum strength and durability unless it is cured under proper temperature conditions.

Electrically heated insulating blankets are known in the prior art, such as those disclosed in U.S. Pat. Nos. 7,183,524 and 7,230,213. Such electrically heated insulating blankets are known for use in northern climates for thawing frozen ground and preventing curing concrete from freezing. It is know that plastic concrete will not cure satisfactorily at temperature below 50° F. However, such electrically heated blankets are designed to provide a constant amount of heat to the plastic concrete and are used only for the purpose of preventing the concrete from freezing in cold weather.

U.S. Pat. No. 5,707,179 discloses a system using water in pipes placed within plastic concrete for either heating or cooling the concrete. Again, the objective of this system is to maintain the concrete at a sufficiently high temperature so that it will cure when the ambient conditions would otherwise prevent proper curing. This system however is not practical. Furthermore, this system does not disclose adjusting the amount of heat provided to the concrete as a function of time so that the concrete temperature follows a predetermined temperature profile.

Another problem exists when large volumes of concrete are placed in forms or molds. In such cases, the interior portion of the concrete may heat more quickly and cool more slowly than the outer portion of the concrete. The difference in the rate of heating/cooling between the interior and outer portions produces a temperature differential between the interior portion of the concrete and the outer portion of the concrete. If the temperature differential exceeds a certain amount, cracking of the concrete may result. This problem is frequently found in mass concrete. The ACI Committee defines "mass concrete" as "any large volume of cast-in-place concrete with dimensions large enough to require that measures be taken to cope with the generation of heat and attendant volume change to minimize cracking". Previous attempts at controlling this problem include refining concrete mix proportions, using aggregate with desirable thermal properties, pre-cooling the concrete constituent materials, cooling the plastic concrete with liquid nitrogen, using internal water-filled pipes to cool the concrete itself, and placing the concrete in several lifts or pours. These approaches are not entirely desirable or successful since they do not control the temperature differential between the surface and the core of the concrete mass. They can also be expensive to implement in practice.

Therefore, it would be desirable to produce a concrete forming or molding system that controls the temperature of curing concrete at predetermined levels over time. It would also be desirable to provide a concrete curing system that adjusts the temperature of curing concrete in a forming or molding system so that the temperature follows a predetermined temperature profile over time. It would also be desirable to provide a concrete curing system that accelerates concrete maturity or equivalent age to achieve improved concrete strength, particularly early concrete strength. It would also be desirable to provide a concrete curing system that adjusts the temperature differential of concrete in a forming or molding system, especially mass concrete.

SUMMARY OF THE INVENTION

The present invention satisfies the foregoing needs by providing an improved concrete curing system to fully, or substantially, hydrate the cementitious material in the early stages before the moisture is lost from the concrete.

In one disclosed embodiment, the present invention comprises a method. The method comprises detecting the temperature of a quantity of concrete and selectively adding heat to the concrete, so that the temperature of the concrete follows a predetermined temperature profile during the concrete curing process.

In another disclosed embodiment, the present invention comprises a method. The method comprises detecting the temperature within a quantity of concrete and selectively adding heat to the concrete. The method also comprises controlling the amount of heat added to the concrete so that the temperature of the concrete follows a predetermined temperature profile during at least a portion of the concrete curing process.

In another disclosed embodiment, the present invention comprises detecting the temperature of a quantity of concrete and selectively adding heat to the concrete in response to the detected temperature of the quantity of concrete so as to control the temperature of the quantity of concrete according to a predetermined temperature profile.

In another disclosed embodiment, the present invention comprises an apparatus. The apparatus comprises a temperature sensor disposed and arranged for detecting the temperature of concrete within a concrete form or mold and an electric heating element disposed and arranged so that heat from the heating element is provided to concrete within the concrete form or mold. The apparatus also comprises a controller connected to the electric heating element for adjusting the amount of heat produced by the heating element, a computing device connected to the temperature sensor so that the computing device detects the temperature of concrete within the concrete form or mold. The computing device is connected to the controller and is programmed to control the amount of heat provided to the concrete in the concrete form or mold so that the temperature of the concrete in a form or mold follows a predetermined temperature profile over time.

In another disclosed embodiment, the present invention comprises a method. The method comprises selectively adding heat to curing concrete such that the temperature of the curing concrete follows a predetermined temperature profile during at least a portion of the concrete curing process, wherein the heat is selectively added to the concrete from a location outside the concrete.

In another disclosed embodiment, the present invention comprises a method. The method comprises detecting the temperature of a first portion of a quantity of curing concrete and detecting the temperature of a second portion the quantity of curing concrete. The method also comprises selectively adding heat to the curing concrete in response to the detected temperatures and controlling the amount of heat added to the second portion of curing concrete so that the difference between the temperature of the first portion and the second portion does not exceed a desired amount.

In another embodiment, the present invention comprises a concrete form. The concrete form comprises a panel having a first surface for contacting plastic concrete and a second surface opposite the first surface, the panel being made from a heat conducting material. The concrete form also comprises a plurality of heating elements in thermal contact with the second surface of the panel.

In another embodiment, the present invention comprises a method. The method comprises placing plastic concrete in a space defined between opposed concrete forms and detecting the temperature of the concrete between the forms. The method also comprises selectively adding heat to the forms in response to the detected temperature of the concrete so as to control the temperature of the curing concrete according to a predetermined temperature profile.

In another embodiment, the present invention comprises a method. The method comprises detecting the temperature of a first portion of a quantity of curing concrete between opposed concrete forms and detecting the temperature of a second portion of the quantity of curing concrete between the opposed concrete forms. The method also comprises selectively adding heat to the forms in response to the detected temperatures, such that heat from the forms is transferred to the second portion of the curing concrete and controlling the amount of heat added to the forms so that the difference between the temperature of the first portion and the second portion does not exceed a desired amount.

In another embodiment, the present invention comprises a method. The method comprises detecting the temperature of a quantity of curing concrete and selectively adding heat to the curing concrete in response to the detected temperature thereof.

In still another embodiment, the present invention comprises a method. The method comprises providing a local area network including a plurality of nodes, wherein each node corresponds to an electrically heated concrete form and controlling the temperature of each of the plurality of electrically heated concrete forms using the local area network.

In another embodiment, the present invention comprises a system. The system comprises a computing device establishing a local area network and an electrically heated concrete form having a plurality of settings for adjusting the temperature of a concrete form panel, the concrete form being equipped for communication via the local area network with at least the computing device, wherein the computing device allows manipulation of the plurality of temperature setting of the concrete form panel and wherein the computing device communicates one or more of the plurality of temperature settings to the concrete form panel via the local area network.

In yet another embodiment, the present invention comprises a system. The system comprises a computing device establishing a local area network and an electrically heated concrete form having a temperature sensing device associated therewith for sensing the temperature of the concrete form panel, the concrete form being equipped for communication via the local area network with at least the computing device and wherein the concrete form communicates the temperature of the concrete form panel sensed by the temperature sensing device associated therewith to the computing device via the local area network.

In another embodiment, the present invention comprises a system. The system comprises a computing device establishing a local area network and an electrically heated concrete form having a plurality of settings for adjusting the temperature of a concrete form panel, the concrete form being equipped for communication via the local area network with at least the computing device. The system also comprises the electrically heated concrete form having a temperature sensing device associated therewith for sensing the temperature of the concrete form panel, wherein the computing device allows manipulation of the plurality of temperature setting of the concrete form panel, wherein the concrete form communicates the temperature of the concrete form panel sensed by the temperature sensing device associated therewith to the computing device via the local area network and wherein the computing device communicates one or more of the plurality of temperature settings to the concrete form via the local area network.

In another embodiment, the present invention comprises an apparatus. The apparatus comprises a temperature sensor for detecting the temperature of concrete within a concrete form or mold and an electric heating element for providing heat to concrete within a concrete form or mold. The apparatus also comprises a controller connected to the electric heating element for adjusting the amount of heat produced by the heating element and a computing device connected to the temperature sensor so that the computing device can detect the temperature of concrete within a concrete form or mold, the computing device being connected to the controller and programmed to control the amount of heat provided by the electric heating element so that the temperature of concrete in the form or mold is controlled to follow a predetermined temperature profile over time.

In another embodiment, the present invention comprises a method. The method comprises selectively adding heat to curing concrete such that the temperature of the curing concrete follows a predetermined temperature profile during at least a portion of the concrete curing process, wherein the heat is selectively added to the concrete from a location outside the concrete.

In a further embodiment, the present invention comprises a method. The method comprises detecting the temperature of a first portion of a quantity of curing concrete and detecting the temperature of a second portion of the quantity of curing concrete. The method also comprises selectively adding heat to the second portion of curing concrete in response to the detected temperature and controlling the amount of heat added to the second portion of curing concrete so that the difference between the temperature of the first portion and the second portion does not exceed a desired amount.

In another embodiment, the present invention comprises a method. The method comprises detecting the temperature of a first portion of a quantity of curing concrete between opposed concrete forms and detecting the temperature of a second portion of the quantity of curing concrete between the opposed concrete forms. The method also comprises selectively adding heat to the forms in response to the detected temperature, such that heat from the forms is transmitted to the second portion of the curing concrete and controlling the amount of heat added to the forms so that the difference between the temperature of the first portion and the second portion does not exceed a desired amount.

In another embodiment, the present invention comprises a method. The method comprises detecting the temperature of a quantity of curing and selectively adding heat to the curing concrete in response to the detected temperature. The method further comprises controlling the temperature of the curing concrete so that the concrete temperature follows a predetermined temperature so that the concrete temperature follows a predetermined temperature profile during at least a portion of the concrete curing process. In a further embodiment, the predetermined temperature profile comprises controlling the temperature of the concrete such that it has a maximum temperature at least 10% greater than the maximum temperature the same concrete mix would have reached in a non-insulated concrete form or mold under the same conditions; i.e., ambient conditions without added heat. In a further embodiment, the predetermined temperature profile comprises reducing the temperature of curing concrete from its maximum temperature at a rate slower than the rate the same concrete mix would reduce in a non-insulated concrete form or mold under the same conditions; i.e., ambient conditions without added heat. In another embodiment, the predetermined temperature profile comprises heating the concrete to a maximum temperature and maintaining the maximum temperature for at least 24 hours and reducing the temperature of the concrete from its maximum temperature to ambient temperature over a period of 1 to 3 days. In another embodiment, the predetermined temperature profile comprises heating the concrete to a maximum temperature of about 60 to about 70° C. In another embodiment, the predetermined temperature profile comprises controlling the temperature of the curing concrete so that at 3 days the concrete has an equivalent age at least 25% greater than the same concrete mix would have in a non-insulated concrete form or mold under the same conditions; i.e., ambient conditions without added heat. In another embodiment, the predetermined temperature profile comprises controlling the temperature of the curing concrete so that at 3 days the concrete has an equivalent age about 70% greater than the same concrete mix would have when cured in accordance with ASTM C-39. In another embodiment, the predetermined temperature profile comprises controlling the temperature of the curing concrete so that at 7 days the concrete has an equivalent age about 70% greater than the same concrete mix would have when cured in accordance with ASTM C-39.

Accordingly, it is an object of the present invention to provide an improved concrete form or mold.

Another object of the present invention is to provide an improved method for curing concrete by fully hydrating the cementitious material before needed moisture is lost to the environment.

A further object of the present invention is to provide a system for curing concrete that controls the temperature of the concrete during the curing process.

Another object of the present invention is to provide a method for accelerating the maturity or equivalent age of concrete to achieve improved concrete strength.

A further object of the present invention is to provide an accelerated concrete curing system to improve the maturity and equivalent age for concrete formulations that uses relatively large amounts of recycled industrial waste material, such as slag cement, fly ash, silica fume, pulverized glass, ground or shredded rubber, synthetic fibers, glass, cellulose, carbon or steel fibers, and/or rice husk ash, in combination with inert or filler material, such as ground limestone, calcium carbonate, titanium dioxide, or quartz, while producing concrete having an ultimate strength equivalent to, or better than, concrete made with conventional amounts of portland cement.

Another object of the present invention is to provide a system for curing concrete such that the concrete develops its maximum strength as early as possible.

A further object of the present invention is to provide a concrete curing system that uses reduced amounts of portland cement while producing concrete having an ultimate strength equivalent to concrete made with conventional amounts of portland cement.

Yet another object of the present invention is to provide a system for curing concrete such that the concrete develops its maximum durability.

Another object of the present invention is to provide a system for curing concrete such that concrete mixes containing reduced amounts of portland cement can be cured efficiently and effectively therein while having compressive strengths equivalent to or better than conventional concrete mixes.

Another object of the present invention is to provide a system for curing concrete more quickly.

A further object of the present invention is to provide a system for curing concrete that controls the temperature of the concrete in a form or mold according to a predetermined temperature profile.

Another object of the present invention is to provide a system for curing concrete that lowers the maximum concrete temperature gradually over time to the ambient temperature, thereby reducing or eliminating temperature shrinkage and/or cracking.

Still another object of the present invention is to provide concrete mixes or mortar mixes that can be used to create improved precast concrete objects or structures, such as panels, wall cladding, pipes, vaults, pavers, brick, artificial stone and architectural concrete objects.

Yet another object of the present invention is to provide an improved system for curing mass concrete, such as airport runways, bridge supports and the like.

Another object of the present invention is to provide a system for controlling the temperature differential between an inner portion and an outer portion of concrete, especially mass concrete.

Another object of the present invention is to provide an improved insulated concrete form or mold.

A further object of the present invention is to provide a concrete form or mold that can be selectively heated in a controlled manner.

Another object of the present invention is to provide an electrically heated concrete form or mold.

Yet another object of the present invention is to provide a system for controlling a plurality of electrically heated concrete forms.

Another object of the present invention is to provide a system for controlling a plurality of electrically heated concrete forms using a local area network These and other objects, features and advantages of the present invention will become apparent after a review of the following detailed description of the disclosed embodiments and the appended drawing and claims.

BRIEF DESCRIPTION OF THE DRAWINGS

FIG. 18 is the cross-sectional view of the electrically heated concrete form shown in FIG. 17 taken along the line 18-18.

FIG. 19 is the cross-sectional view of the electrically heated concrete form shown in FIG. 18 taken along the line 19-19.

FIG. 20 is the cross-sectional view of the electrically heated concrete form shown in FIG. 18 taken along the line 20-20.

DETAILED DESCRIPTION OF THE DISCLOSED EMBODIMENTS

Figure 6:
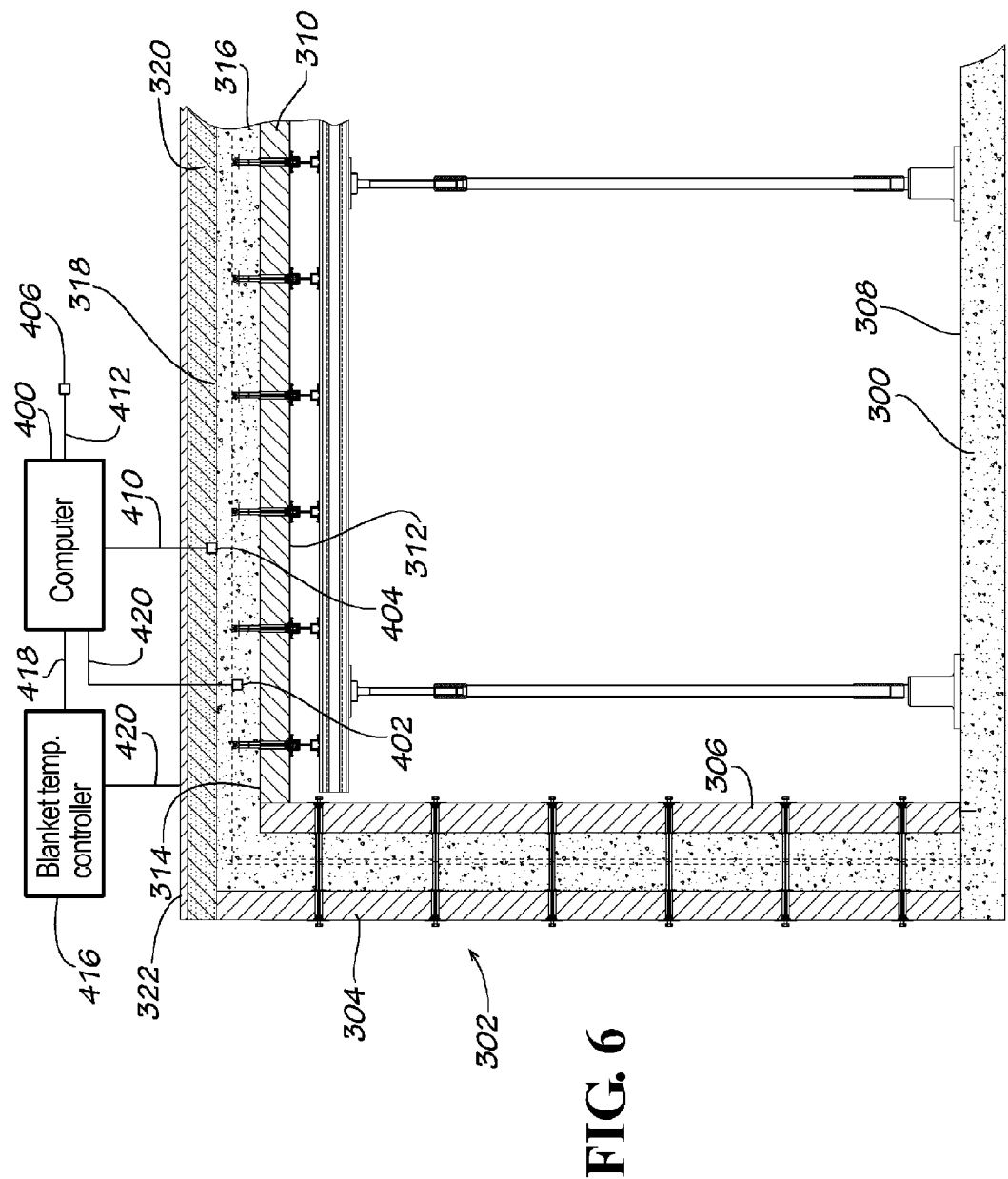
FIG. 6 is the cross-sectional side view of a disclosed embodiment of an insulated concrete form for constructing an elevated concrete slab and a schematic diagram of a disclosed embodiment of a temperature control system in accordance with the present invention.
Figure 7:
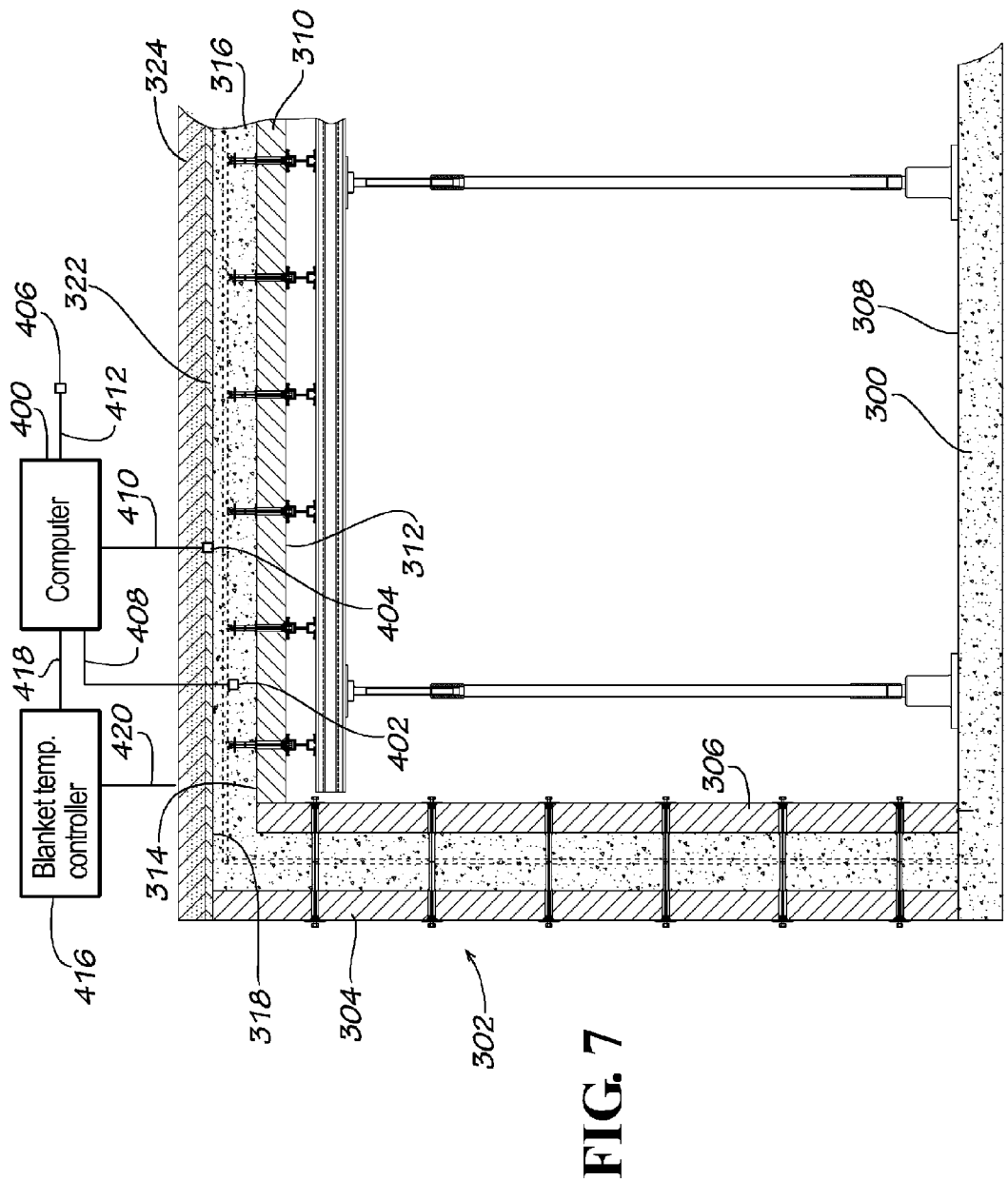
FIG. 7 is the cross-sectional side view of another disclosed embodiment of an insulated concrete form for constructing an elevated concrete slab and a schematic diagram of a disclosed embodiment of a temperature control system in accordance with the present invention.

The disclosures of U.S. Pat. Nos. 8,756,890 and 8,555,584, are both incorporated herein by reference in their entirety. FIGS. 1-5 of the present application relate to the disclosure of U.S. Pat. No. 8,555,584; FIGS. 6 and 7 of the present application relate to the disclosure of U.S. Pat. No. 8,756,890.

Figure 1:
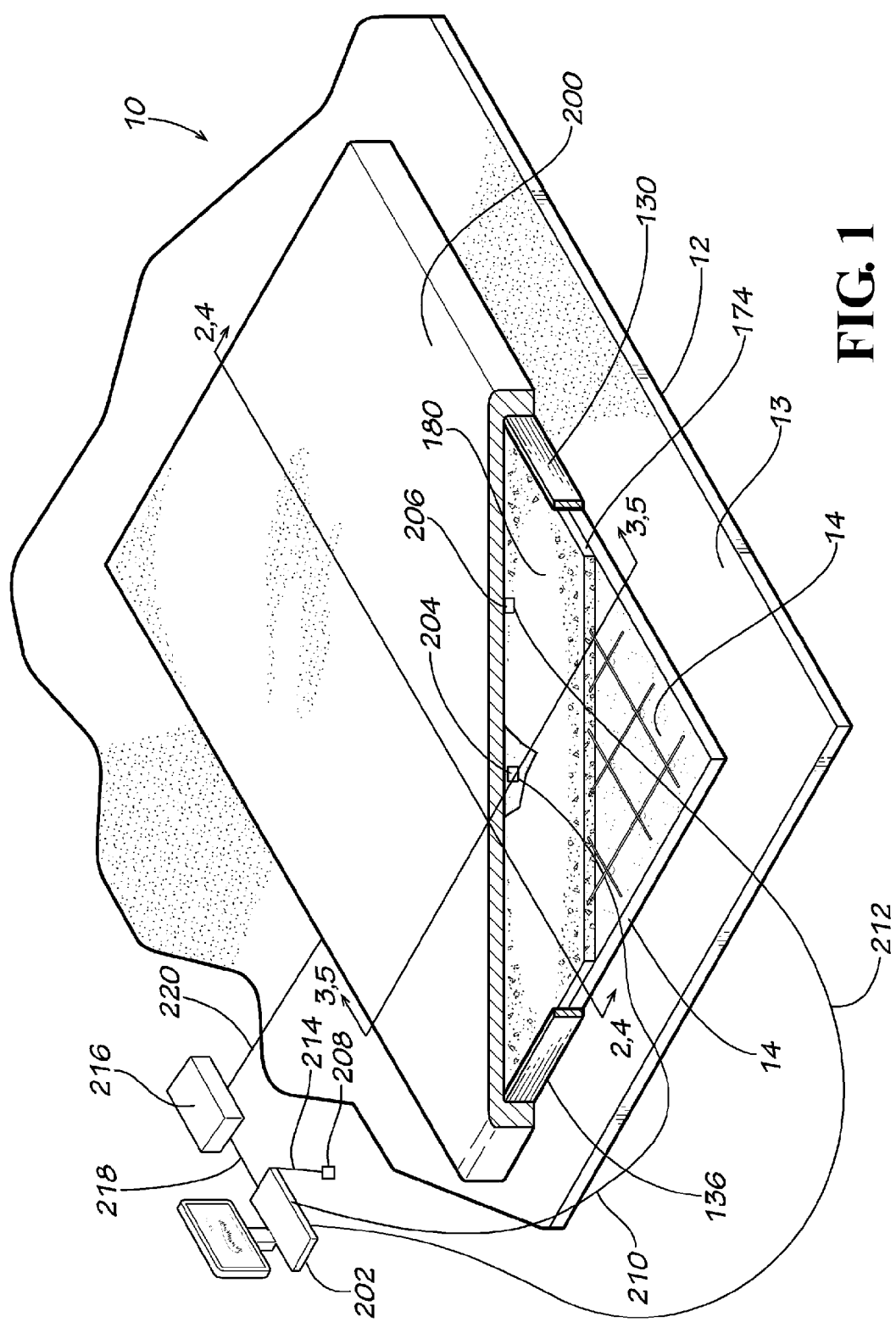
FIG. 1 is the perspective view of a disclosed embodiment of an insulated concrete form and a schematic diagram of a disclosed embodiment of a temperature control system in accordance with the present invention.

Referring now to the drawing in which like numbers indicate like elements throughout the several views, there is shown in FIG. 1 a disclosed embodiment of a precast insulated concrete form 10 in accordance with the present invention. The precast insulated concrete form 10 rests horizontally on a previously formed, and at least partially cured, concrete slab 12, which forms a floor of a proposed building (not shown). Alternately, the insulated concrete form 10 can be used on any solid, level, casting surface (not shown). The concrete slab 12 has a horizontal flat upper surface 13. The precast insulated concrete form 10 includes a plurality of rectangular foam insulating panels, such as five foam insulating panels 14, 20, 22 (only three of which are shown in FIGS. 1-5). The foam insulating panels 14-22 are any suitable size, but in this disclosed embodiment are each 4 feet wide and 10 feet long. When the foam insulating panels 14-22 are adhesively joined together side-by-side as shown in FIGS. 1-5, they form a larger foam insulating panel, which in this disclosed embodiment is a panel 10 feet wide and 20 feet long. This is a size of a precast concrete panel that may be used for building a two-story high warehouse building, such as a home building supply store or a warehouse grocery store/general merchandise store. Of course, any size foam insulating panel can be constructed in accordance with the present invention by using foam insulating panels of different sizes or a larger or smaller number of such panels attached to each other. The foam insulating panels 14-22 can be made from any insulating material that is sufficiently rigid to withstand the pressures of the concrete placed in the form and from workers walking on the foam insulating panels. The foam insulating panels 14-22 preferably are made from a closed cell polymeric foam material, such as molded expanded polystyrene or extruded expanded polystyrene. Other closed cell polymeric foams can also be used, such as polyisocyanurate or polyurethane. The foam insulating panels should also have a density sufficient to make them substantially rigid, such as approximately 1 to approximately 3 pounds per cubic foot, preferably approximately 1.5 pounds per cubic foot. High density expanded polystyrene foam is available under the trademark Neopor® and is available from Georgia Foam, Gainesville, Ga.

The foam insulating panels 14-22 can be made by molding to the desired size and shape, by cutting blocks or sheets of pre-formed extruded expanded polystyrene foam into a desired size and shape or by extruding the desired shape and then cutting to the desired length. Although the foam insulating panels 14-22 can be of any desired size, it is specifically contemplated that the panels will be of a length equal to the width of the precast concrete panel. Additional foam insulating panels can then be placed adjacent the first foam insulating panel and adhesively attached thereto. Any number or size of foam insulating panels can be joined together to provide a form bottom of a dimension equal to the desired height of the precast concrete panel being formed. However, for ease of handling, the foam insulating panels 14-22 will generally be about 8 to 16 feet long and about 4 feet wide.

For the insulated concrete form 10, the layer of foam insulating panels 14-22 preferably are made from closed cell polymeric foam. The foam insulating panels 14-22 preferably are made from closed cell foams of polyvinyl chloride, urethane, polyurethane, polyisocyanurate, phenol, polyethylene, polyimide or polystyrene. Such foam preferably has a density of 1 to 3 pounds per cubic foot, or more. The layer of foam insulating panels 14-22 preferably has insulating properties equivalent to at least 0.5 inches of expanded polystyrene foam, preferably equivalent to at least 0.5 inch of expanded polystyrene foam, preferably equivalent to at least 1 inch of expanded polystyrene foam, more preferably equivalent to at least 2 inches of expanded polystyrene foam, more preferably equivalent to at least 3 inches of expanded polystyrene foam, most preferably equivalent to at least 4 inches of expanded polystyrene foam. There is no maximum thickness for the insulation equivalence of expanded polystyrene foam useful in the present invention. The maximum thickness is usually dictated by economics, ease of handling and building or structure design. However, for most applications a maximum insulation equivalence of 8 inches of expanded polystyrene foam can be used. In another embodiment of the present invention, the layer of insulating material 202 has insulating properties equivalent to approximately 0.5 to approximately 8 inches of expanded polystyrene foam, preferably approximately 1 to approximately 8 inches of expanded polystyrene foam, preferably approximately 2 to approximately 8 inches of expanded polystyrene foam, more preferably approximately 3 to approximately 8 inches of expanded polystyrene foam, most preferably approximately 4 to approximately 8 inches of expanded polystyrene foam. These ranges for the equivalent insulating properties include all of the intermediate values. Thus, the foam insulating panels 14-22 used in another disclosed embodiment of the present invention has insulating properties equivalent to approximately 0.5 inches of expanded polystyrene foam, approximately 1 inch of expanded polystyrene foam, approximately 2 inches of expanded polystyrene foam, approximately 3 inches of expanded polystyrene foam, approximately 4 inches of expanded polystyrene foam, approximately 5 inches of expanded polystyrene foam, approximately 6 inches of expanded polystyrene foam, approximately 7 inches of expanded polystyrene foam, or approximately 8 inches of expanded polystyrene foam. Expanded polystyrene foam has an R-value of approximately 4 to 5 per inch thickness. Therefore, the foam insulating panels 14-22 should have an R-value of greater than 1.5, preferably greater than 2.5, preferably greater than 5, preferably greater than 10, more preferably greater than 15, especially greater than 20. The foam insulating panels 14-22 preferably have an R-value of approximately 2.5 to approximately 40; more preferably between approximately 10 to approximately 40; especially approximately 15 to approximately 40; more especially approximately 20 to approximately 40. The foam insulating panels 14-22 preferably have an R-value of approximately 5, more preferably approximately 10, especially approximately 15, most preferably approximately 20. Of course, different amounts of insulation or different amounts of equivalent insulation can be used above and below a horizontal concrete slab or for the interior vertical insulated concrete form and the exterior vertical insulated concrete form in accordance with the present invention, as design requirement may require.

Alternatively, instead of using a polymeric foam, the foam insulating panels 14-22 can be made from an insulating material, such as a refractory blanket, a refractory board or a refractory felt or paper. Refractory insulation is typically used to line high temperature furnaces or to insulate high temperature pipes. Refractory insulating material is typically made from ceramic fibers made from materials including, but not limited to, silica, silicon carbide, alumina, aluminum silicate, aluminum oxide, zirconia, calcium silicate; glass fibers, mineral wool fibers, Wollastonite and fireclay. Refractory insulating material is commercially available in bulk fiber, foam, blanket, board, felt and paper form. Refractory insulation is commercially available in blanket form as Fiberfrax Durablanket® insulation blanket from Unifrax I LLC, Niagara Falls, N.Y., USA and RSI4-Blank and RSI8-Blank from Refractory Specialties Incorporated, Sebring, Ohio, USA. Refractory insulation is commercially available in board form as Duraboard® from Unifrax I LLC and CS85, Marinite and Transite boards from BNZ Materials Inc., Littleton, Colo., USA. Refractory insulation in felt form is commercially available as Fibrax Felts and Fibrax Papers from Unifrax I LLC. The refractory insulating material can be any thickness that provides the desired insulating properties. However, refractory insulating material useful in the present invention can range from approximately $\frac{1}{32}$ inch to approximately 2 inches.

Optionally, applied to the lower (i.e., bottom) surface of each foam insulating panel 14-22 is a layer of reinforcing material 24 (FIGS. 2-5), as disclosed in U.S. Pat. Nos. 8,555,583; 8,756,890 and 8,555,584 (all of which are incorporated herein by reference in their entirety).

The foam insulating panels 14-22 include a plurality of panel anchor member/locking cap assemblies 26. As shown in FIGS. 2-5, a plurality of panel anchor member/locking cap assemblies identical to the panel anchor member/locking cap assemblies 26, are positioned in spaced rows and columns across the width and height of the foam insulating panels 14-22. The panel anchor member/locking cap assemblies 26 are disclosed in U.S. Pat. No. 8,555,584 (the disclosure of which is incorporated herein by reference).

Figure 2:
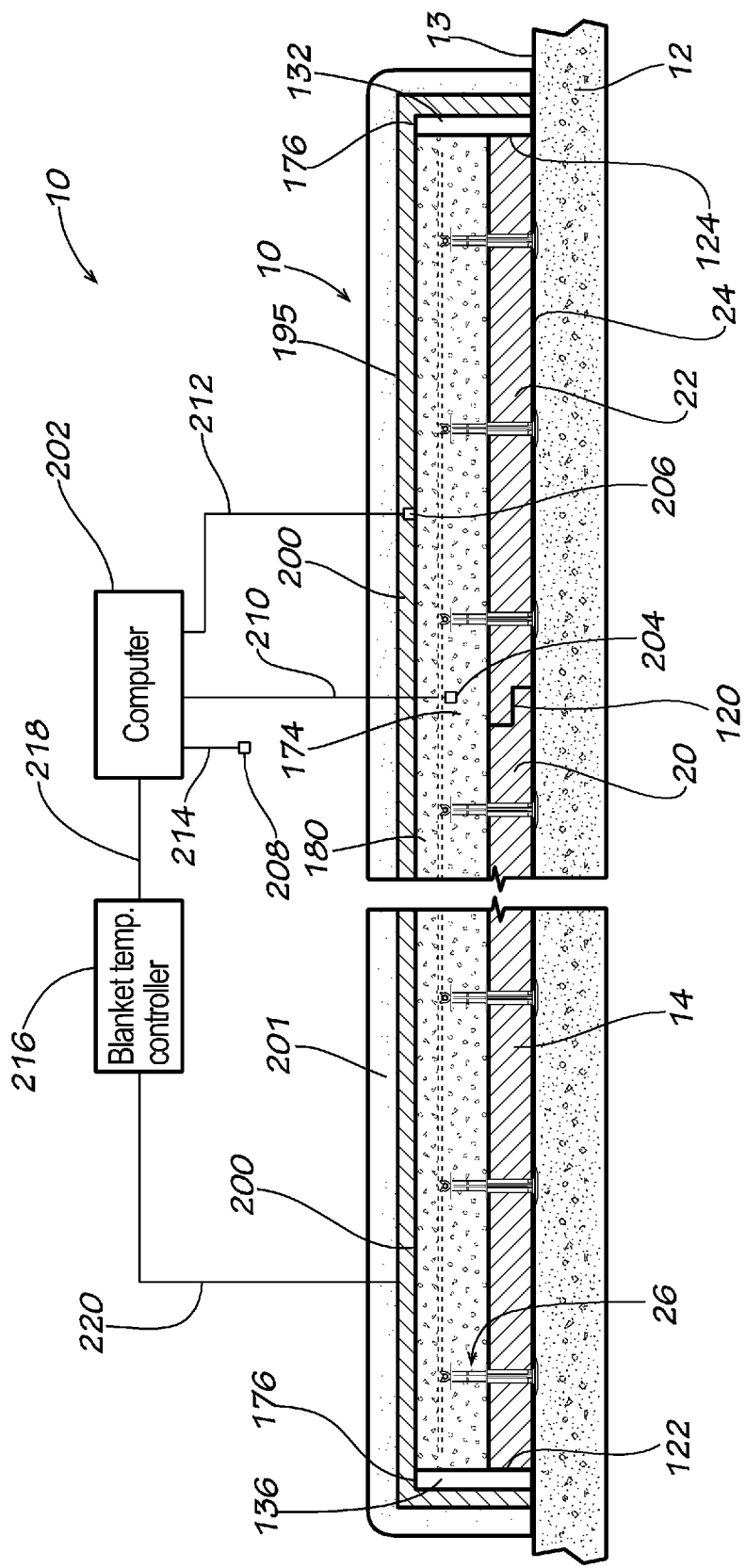
FIG. 2 is the cross-sectional view of the insulated concrete form shown in FIG. 1 taken along the line 2, 4-2, 4 and a schematic diagram of a disclosed embodiment of a temperature control system in accordance with the present invention.
Figure 4:
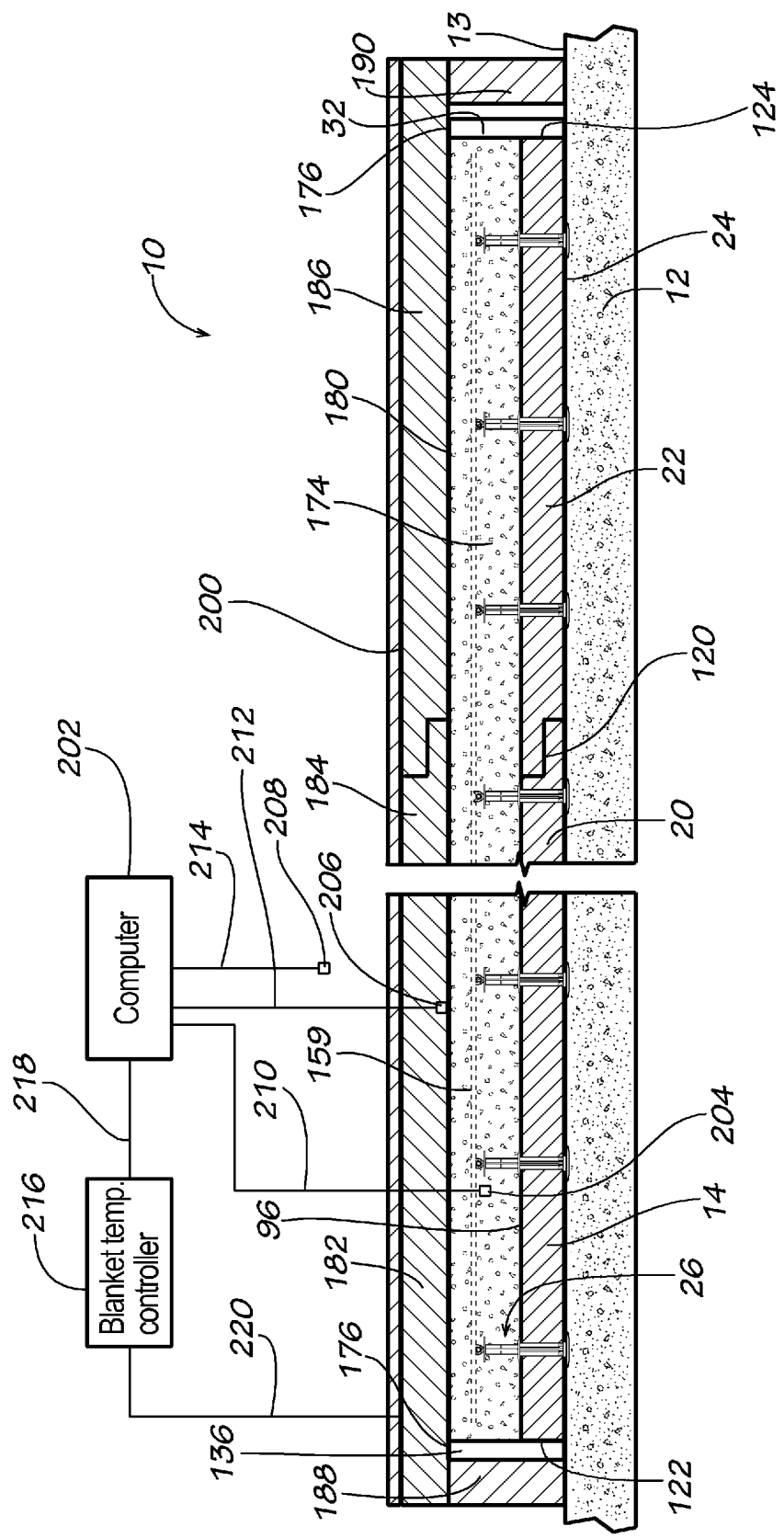
FIG. 4 is the cross-sectional view of another disclosed embodiment of the insulated concrete form shown in FIG. 1 taken along the line 2, 4-2, 4 and a schematic diagram of a disclosed embodiment of a temperature control system in accordance with the present invention.

It is anticipated that the foam insulating panels 14-22 with the panel anchor member/locking caps assemblies 26 installed in them will be preassembled at a remote location and then transported to a job site. The foam insulating panels 14-22 are then placed on a flat horizontal surface, such as on the flat surface 13 of the concrete slab 12. Each of the 4 feet by 10 feet foam insulating panels is laid adjacent each other foam insulating panel on the surface 13 of the concrete slab 12. Then, the adjacent edges of the foam insulating panels, such as the joint between the panels 20 22, are adhered to each other with a water-proof adhesive. The foam insulating panels 14-22 preferably have a shiplap edge, such as shown in U.S. Pat. No. 8,555,583, which is incorporated herein by reference in its entirety. Thus, when the foam insulating panel 14 and the adjacent foam insulating panel (not shown) are placed side-by-side, a Z-shaped joint (not shown) is formed therebetween. An identical Z-shaped joint 120 is formed between the panels 20, 22, as shown in FIGS. 2 and 4, and between other adjoining foam insulating panels (not shown). Before the adjacent composite foam insulating panels, such as the panels 20, 22, are joined together, a water-proof adhesive is applied to the longitudinal shiplap edges thereof.

When all of the foam insulating panels 14-22 are adhered to each other they collectively form a bottom surface of the insulated concrete form 10 and have the exact desired dimensions of the finished precast concrete panel, which in this case is illustrated as being 10 feet by 20 feet. It should be noted that the exterior longitudinal edges of the panels 14-22, such as the longitudinal edge, 126, 128 of the panel 14 (FIG. 3), are flat and do not include the shiplap feature. Similarly, the lateral edges of the panels 14, 22, such as the lateral edges 122, 124 (FIG. 2) of the foam insulating panel are flat and do not include the shiplap feature.

After all of the foam insulating panels 14-22 are adhered to each other, as described above, a conventional wood or metal form or mold is constructed around the peripheral edges of the foam insulating panels. Specifically, as shown in FIGS. 1-5, a longitudinal form member 130 is disposed against the right lateral exterior edges 128 of the panels 14-22. A transverse form member 132 is disposed against the upper longitudinal exterior edge 124 of the panel 22. A longitudinal form member 134 is disposed against the left lateral exterior edges 126 of the panels 14-22. And, a transverse form member 136 is disposed against the lower longitudinal exterior edge 122 of the panel 22. The side form members 130-136 are joined together in a manner well known in the art. Although this embodiment has been disclosed as adhering the foam insulating panels 14-22 together and then constructing the side form members 130-136, the present invention also contemplates constructing the side form members first and then adhering the foam insulating panels 14-22 to each other within the side frame members. If the side form members 130-136 are constructed first, it may be necessary to trim the foam insulating panels 14-22 to fit. This can easily be done with a saw or preferably with a hot knife. The height of the side form members 130-136 is selected such that it is equal to the thickness of the foam insulating panels 14-22 plus the desired thickness of the precast concrete panel. For example, if the foam insulating panels 14-22 are four inches thick and the precast concrete panel is to be six inches thick, the side form members 130-136 will be 10 inches high.

After a rebar grid is constructed in the insulated concrete form 10, such as the rebar 142, 159, the form is filled with plastic concrete 174. Sufficient plastic concrete 174 is placed in the form such that the plastic concrete in the form reaches the top 176 of the side form members 130-136. The top surface 180 of the plastic concrete 174 is then finished in any desired conventional manner, such as by troweling, or to provide other types of architectural finishes or patterns.

Figure 5:
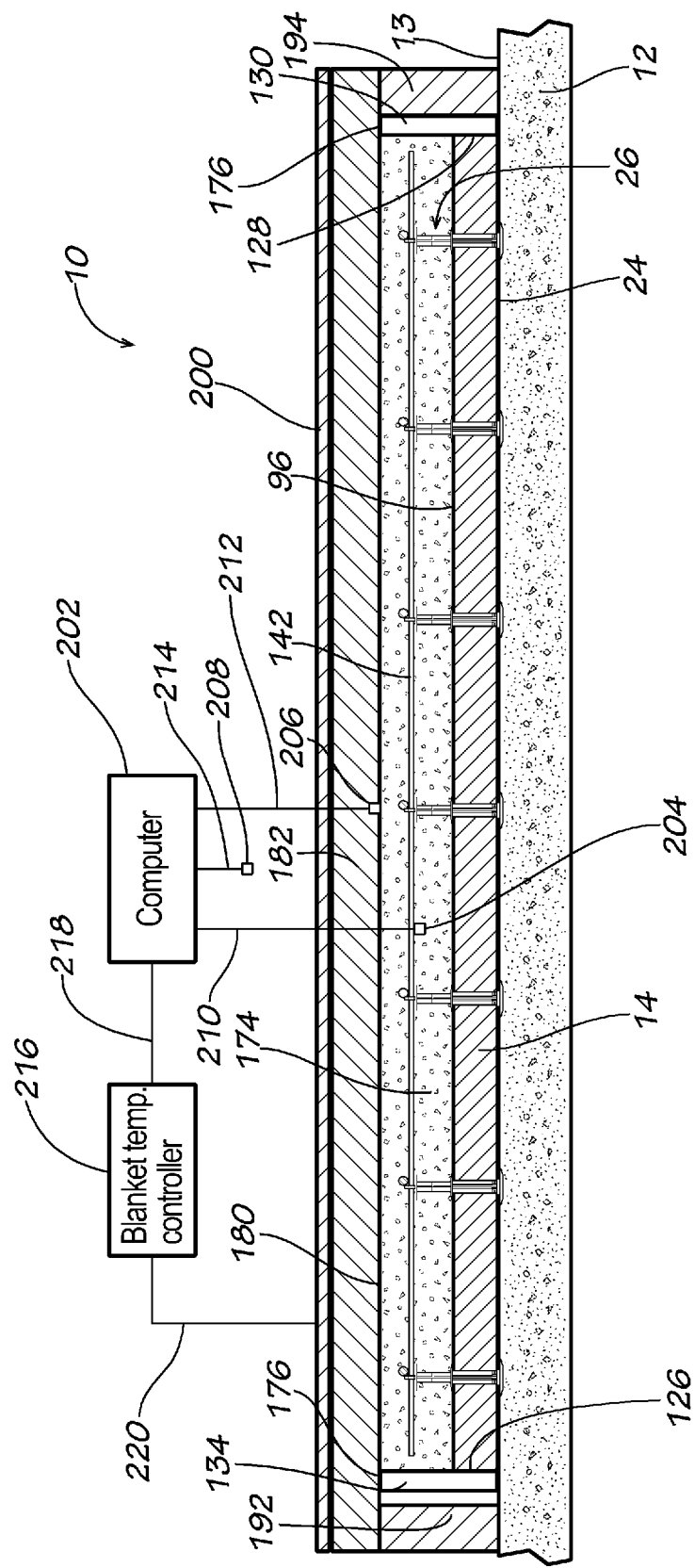
FIG. 5 is the cross-sectional view of another disclosed embodiment of the insulated concrete form shown in FIG. 1 taken along the line 3, 5-3, 5 and a schematic diagram of a disclosed embodiment of a temperature control system in accordance with the present invention.

After the plastic concrete in the form has been finished, an insulating material is placed on the top 176 of the side form members 130-136 and the top surface 180 of the finished plastic concrete 174, as shown in FIGS. 4 and 5. The insulating material is preferably made from the same material as the foam insulating panels 14-22 that form the bottom of the insulated concrete form 10. The insulating material on top of the form 10 is preferably made from five separate top foam insulating panels joined together in the same manner as the foam insulating panels 14-22, such as the top foam insulating panels 182, 184, 186, as shown in FIG. 4 (only three of the five top foam insulating panels are shown). However, the top foam insulating panels 182-186 are slightly longer and wider than the bottom foam insulating panels 14-22 so that the top foam insulating panels overhang (i.e., extend horizontally outwardly beyond) the side form members 130-136. Narrower side foam insulating panels 188, 190, 192 and 194 are positioned against the side form members 136, 132, 134, 130, respectively, and under the overhanging portions of the top foam insulating panels, such as the top foam insulating panels 182, 186. The side foam insulating panels 188-194 are attached to the overhanging portion of the top foam insulating panels, such as the top foam insulating panels 182-186, by any suitable means, such as by a waterproof adhesive or by providing a connector, such as a screw, through the top foam insulating panels into the side foam insulating panels. The side foam insulating panels 188-194 can also be attached to the side form members 130-136 by a waterproof adhesive or by providing a connector, such as a screw through the side foam insulating panels into the side form members. The top foam insulating panels 182-186 and the side foam insulating panels 188-194 are preferably made from the same material and of the same thickness as the bottom foam insulating panels 14-22, or have the same R-value as the bottom panels. If the top and side foam insulating panels 182-186, 188-194 are made from a material other than expanded polystyrene foam, the top and side foam insulating panels should have insulating properties equivalent to at least 0.5 inches of expanded polystyrene foam; preferably, 1 inch of expanded polystyrene foam; preferably, approximately 2 to approximately 8 inches of expanded polystyrene foam; especially at least 2 inches of expanded polystyrene foam; more especially at least 3 inches of expanded polystyrene foam; most especially, at least 4 inches of expanded polystyrene foam. If the top and side foam insulating panels 182-186, 188-194 are made from a material other than expanded polystyrene foam, the top and side foam insulating panels should have insulating properties equivalent to approximately 0.5 inches of expanded polystyrene foam, approximately 1 inch of expanded polystyrene foam, approximately 2 inches of expanded polystyrene foam, approximately 3 inches of expanded polystyrene foam, or approximately 4 inches of expanded polystyrene foam.

Figure 3:
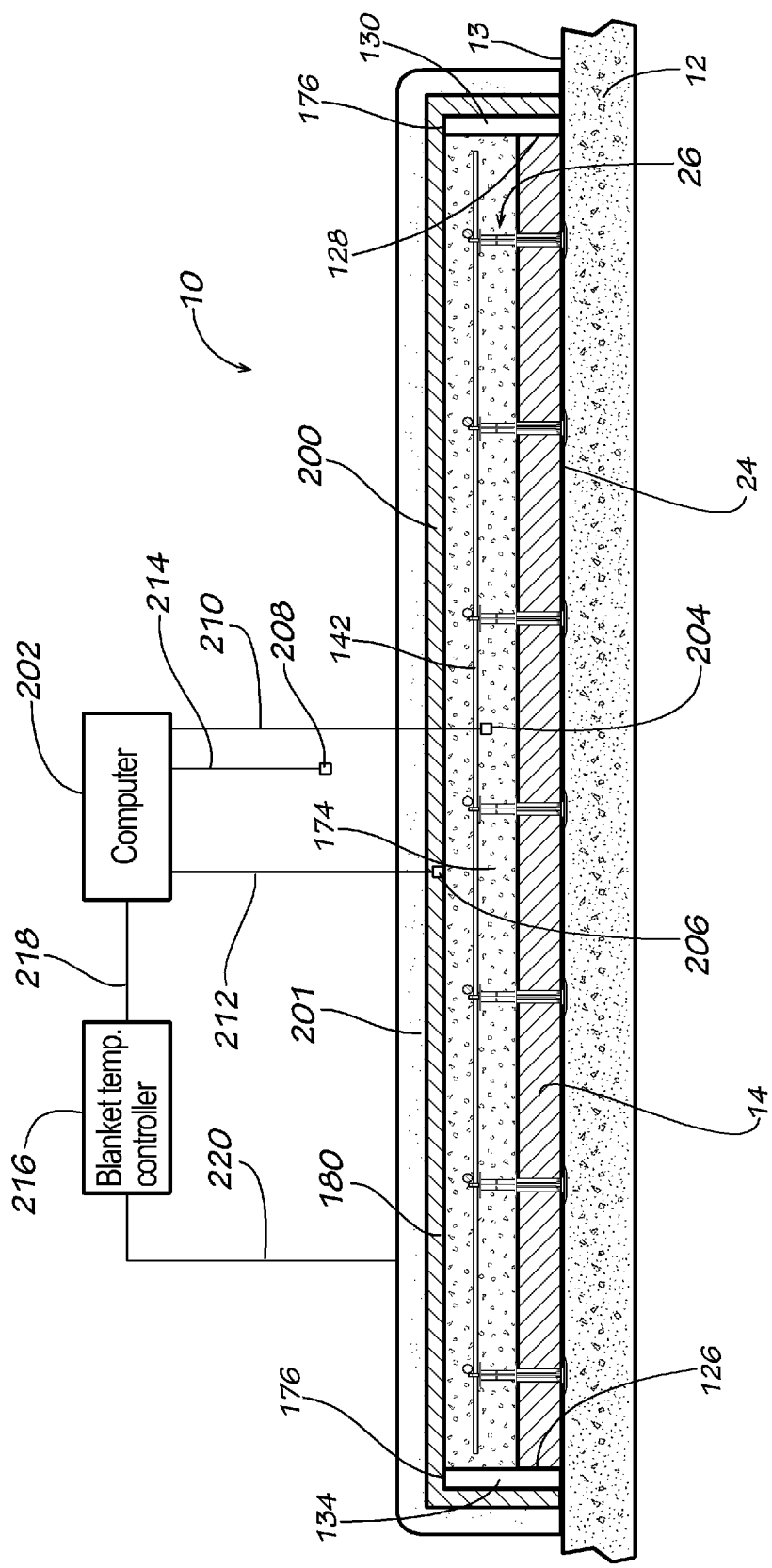
FIG. 3 is the cross-sectional view of the insulated concrete form shown in FIG. 1 taken along the line 3, 5-3, 5 and a schematic diagram of a disclosed embodiment of a temperature control system in accordance with the present invention.

As shown in FIGS. 4 and 5, an electrically heated blanket 200 is placed on top of the top foam insulating panels 182-186. An electrically heated blanket suitable for use in the present invention is disclosed in U.S. Pat. Nos. 7,183,524 and 7,230,213 (the disclosures of which are both incorporated herein by reference in their entirety). Alternately, as shown in FIGS. 1-3, the electrically heated blanket 200 is place directly on top of the plastic concrete 174 and is draped over the side form members 130-136. Then, a layer of insulating material 201 can optionally be placed on top of the electrically heated blanket 200. The insulating material 201 can be any material that reduces conductive heat los radiant heat loss, or both, from the concrete 174 in the form 10. Examples of the conductive heat insulating material 201 useful in the present invention include, but are not limited to, a concrete insulating blanket, flexible polymeric foam, foam insulating panels, such as polystyrene foam insulating panels similar to the top foam insulating panels 182-186. Examples of radiant heat insulating material includes, but, is not limited to, a radiant heat reflective material, such as a metal foil, especially aluminum foil. A preferred radiant heat reflective material is a metalized polymeric film, more preferably, metalized biaxially-oriented polyethylene terephthalate film, especially aluminized biaxially-oriented polyethylene terephthalate film. Biaxially-oriented polyethylene terephthalate film is commercially available under the designation Mylar®, Melinex® and Hostaphen®. Mylar® film is typically available in thicknesses of approximately 1 mil or 2 mil. Aluminized Mylar® film is commercially available from the Cryospares division of Oxford Instruments Nanotechnology Tools Ltd., Abingdon, Oxfordshire, United Kingdom and from New England Hydroponics, Southampton, Mass., USA. An especially preferred insulating material is the combination of a layer of conduction heat insulation material and a layer of radiant heat reflective material, such as a layer of closed cell polymeric foam, such as polyethylene or polyurethane foam, and a layer of aluminized Mylar® film. Another preferred material is metalized plastic bubble pack-type insulating material or metalized closed cell polymeric foam. Such material is commercially available as Space Age® reflective insulation from Insulation Solutions, Inc., East Peoria, Ill. 61611. The Space Age® product is available as two layers of polyethylene air bubble pack sandwiched between one layer of white polyethylene and one layer of reflective foil; two layers air bubble pack sandwiched between two layers of reflective foil; or a layer of closed cell polymeric foam (such as high density polyethylene foam) disposed between one layer of polyethylene film and one layer of reflective foil. All three of these Space Age® product configurations are useful in the present invention for the insulating material 201. A preferred material for the insulating material 201 is refractory insulating material. Refractory insulating material is typically made from ceramic fibers made from materials including, but not limited to, silica, silicon carbide, alumina, aluminum silicate, aluminum oxide, zirconia, calcium silicate; glass fibers, mineral wool fibers, Wollastonite and fireclay. A preferred refractory insulating material is Wollastonite. Refractory insulating material is commercially available in bulk fiber, foam, blanket, board, felt and paper form. Refractory insulating material is commercially available in blanket form as Fiberfrax Durablanket® insulation blanket from Unifrax I LLC, Niagara Falls, N.Y., USA and RSI4-Blank and RSI8-Blank from Refractory Specialties Incorporated, Sebring, Ohio, USA. Refractory insulation is commercially available in board form as Duraboard® from Unifrax I LLC and CS85, Marinite and Transite boards from BNZ Materials Inc., Littleton, Colo., USA. Refractory insulation in felt form is commercially available as Fibrax Felts and Fibrax Papers from Unifrax I LLC. The refractory insulating material can be any thickness that provides the desired insulating properties. However, refractory insulating material useful in the present invention can range from approximately 1/32 inch to approximately 2 inches. Refractory insulating material may have both conductive heat insulating properties and radiant heat reflective properties. A preferred layer of insulating material 201 includes both a layer of conductive heat insulating material and a layer of radiant heat reflective material. Another preferred layer of insulating material 201 is a layer of refractory insulating material and a layer of aluminum foil.

As shown in FIGS. 1-5, there is disclosed a computing device 202, which is connected to three temperature sensors 204, 206, 208 by electric circuits, such as by the wires 210, 212, 214, respectively. The computing device 202 is preferably a computer, a microprocessor or central processing unit (CPU) with EERAM function to store parameters or a specially programmed digital controller. The temperature sensor 204 is positioned at approximately the middle of the concrete 174. The temperature sensor 204 measures the internal temperature of the concrete 174 as it cures. The temperature sensor 206 is positioned at the interface between the concrete 174 and the top foam insulating panel 182 (FIGS. 4 and 5) or at the interface between the concrete and the electrically heated blanket 200 (FIGS. 2 and 3). Both of these locations will be considered to give a concrete surface temperature reading. The temperature sensor 208 is positioned adjacent the insulated concrete form 10 so as to read the ambient temperature adjacent the insulated concrete form. Other temperature sensors can be placed at different locations in order to measure the temperature of the concrete 174 within the form 10. The specific sensor locations disclosed herein are only examples of operative sensor locations. Other means, either direct or indirect, of measuring the temperature of the concrete 174 in the form 10 are also considered to be useful and within the scope of the present invention. For concrete of a thickness such that the temperature differential between the surfaces and the middle of the concrete is not significant, only one of the temperature sensors 204, 206 needs to be used. The ambient temperature sensor 208 is also optional. It is specifically contemplated that in the embodiment shown in FIGS. 2-3, the temperature sensor 206 is attached to the under side of the heated blanket 200, so that when the heated blanket is applied to the top of the concrete, the temperature sensor will be positioned at the interface between the heated blanket and the concrete 174.

The computing device 202 is connected to the temperature sensors 204-208 so that it can continuously, or periodically, read and store the temperature measured by each of the temperature sensors. The computing device 202 is connected to a blanket temperature controller 216 by an electric circuit, such as the wires 218. The blanket temperature controller 216 is connected to a source of electricity, such as 24, 60, 120 or 220 volts AC or 12 or 24 volts DC electric current, by wires (not shown). Far infrared heating blankets also can be used due to their relatively low voltage and relatively low power consumption characteristics. The lower voltages are preferred as they reduce or eliminate the chances of electrocution by a worker. The blanket temperature controller 216 is connected to the electrically heated blanket 200 by an electric circuit, such as by the wires 220. The computing device 202 and the blanket temperature controller 216 are configured and programmed such that the computing device controls the amount of heat produced by the electrically heated blanket 200. Thus, the computing device 202 controls the amount of heat that is provided to the concrete 174 within the insulated concrete form 10.

Although the foregoing embodiment has been disclosed as being useful for producing a precast concrete panel, it is specifically contemplated that the present invention can be used to produce a slab on grade. For a slab on grade, the same system as disclosed above is used except that the slab is formed on the ground instead of on the surface 13 of the concrete slab 12. Examples of slabs on grade include, but are not limited to, commercial or residential floors, basement floors, warehouse floors, airport runways, roads, bridges, highways and the like, especially as described below with respect to FIGS. 25-27.

FIGS. 6 and 7 show an alternate disclosed embodiment of the present invention where the insulated concrete form is used for an elevated concrete slab or roof structure. FIG. 6 shows a horizontal concrete slab 300 that has been built upon a vertical concrete wall 302 using two vertically oriented and horizontally spaced foam insulating panels 304, 306. The insulated concrete forms used to construct the vertical concrete wall 302 are described in U.S. Pat. No. 8,756,890 (the disclosure of which is incorporated herein by reference). However, the vertical concrete wall 302 can be of conventional construction, if desired; i.e., using conventional concrete forms instead of the foam insulating panels 304, 306.

The insulated concrete form for the elevated concrete slab or roof structure is then prepared by first erecting a supporting structure. The supporting structure comprises a plurality of post shores, the bottoms of which sit on a top surface 308 of a concrete slab 300. The top portion of the post shores support a plurality of horizontal elongate beams. The beams extend laterally from the vertical wall 302 to the opposing wall (not shown). The plurality of beams supports a plurality of stringers. Each of the stringers is connected to the end of a panel spacer member as disclosed in U.S. Pat. No. 8,756,890 (the disclosure of which is incorporated herein by reference). The panel spacer members attach to a horizontal foam insulating panel 310 having a lower surface 312 and an upper surface 314. The panel anchor members attach to the horizontal foam insulating panel 310 in the manner shown in U.S. Pat. No. 8,756,890 (the disclosure of which is incorporated herein by reference).

Before the horizontal composite foam insulating panel 310 is placed on top of the beam, the panel anchor members are attached to the horizontal composite foam insulating panel at spaced intervals in rows and columns. Then, the stringers are attached to the panel anchor members. Then, the horizontal foam insulating panel 310 is laid on top of the beams such that the beams contact and support the stringers. Additional horizontal composite foam insulating panels (not shown) are assembled in the same manner and are positioned adjacent each other so as to form a continuous form floor for the elevated concrete slab. Joints between adjacent horizontal composite foam insulating panels are adhered to each other in the same manner as described above. Similarly, the horizontal composite foam insulating panel 310 and the interior composite foam insulating panel 306 are adhered to each other so as to seal the joint there between in the same manner as described above.

The panel anchor members each optionally includes a C-shaped clamping member, as disclosed in U.S. Pat. No. 8,756,890 (the disclosure of which is incorporated herein by reference). The clamping member is sized and shaped to form a chair to receive and retain an elongate round steel rebar. Aligned rows of panel anchor members provide aligned rows of clamping members such that adjacent parallel rows of rebar of desired length can be attached to the rows of panel anchor members. Crossing columns of rebar can be laid on top of the rows of rebar to form a conventional rebar grid.

After the rebar grid has been formed, unhardened (plastic) concrete 316 is placed on top of the top surface 314 of the horizontal foam insulating panel 310 to a desired depth. Of course, for an elevated concrete slab, such as shown here, it may be desirable to use lightweight concrete instead of conventional concrete.

As shown in FIGS. 6 and 7, the exterior composite foam insulating panel 304 extends higher than the interior foam insulating panel 306, thereby forming the perimeter of the mold space for the elevated concrete slab. After the plastic concrete has been placed on the horizontal composite foam insulating panel 310, the upper surface 318 of the plastic concrete is finished in a conventional manner. After the upper surface 318 of the concrete has been finished in a desired manner, a layer of insulation 320 is temporarily placed on the upper surface 318 of the uncured concrete. The layer of insulation 320 is preferably a concrete insulating blanket or another horizontal foam insulating panel identical to the panel 310. On top of the layer of insulation 320 is an electrically heated blanket 322, as shown in FIG. 6. Alternately, as shown in FIG. 7, the electrically heated blanket 322 is placed on the top surface 318 of the plastic concrete 316. Then, insulating material 324 is optionally placed on top of the electrically heated blanket 322.

The insulating material 320, 324 can be any material that reduces heat loss from the concrete 316 in the form, such as conductive heat insulating material, radiant heat reflective material, or both. Examples of conductive heat insulating material 320, 324 useful in the present invention include, but are not limited to, a concrete insulating blanket, foam insulating panels, such as polystyrene foam insulating panels similar to the foam insulating panel 310. Examples of a radiant heat reflective material useful for the insulating material 320 include, but are not limited to, metal foil, especially aluminum foil. A preferred radiant heat reflective material is a metalized polymeric film, more preferably, metalized biaxially-oriented polyethylene terephthalate film, especially aluminized biaxially-oriented polyethylene terephthalate film. An especially preferred insulating material is the combination of a layer of conduction heat insulation and a layer of radiant heat reflective material, such as a layer of polymeric foam, such as polyethylene or polyurethane foam, and a layer of aluminized Mylar® film. Such a product is available from Industrial Noise Control, Inc., North Aurora, Ill., USA. Another preferred material is metalized plastic bubble pack type insulating material or metalized closed cell polymeric foam. Such material is commercially available as Space Age® reflective insulation from Insulation Solutions, Inc., East Peoria, Ill. 61611. The Space Age® product is available as two layers of polyethylene air bubble pack sandwiched between one layer of white polyethylene and one layer of reflective foil; two layers air bubble pack sandwiched between two layers of reflective foil; or a layer of closed cell polymeric foam (such as high density polyethylene foam) disposed between one layer of polyethylene film and one layer of reflective foil. All three of these Space Age® product configurations are useful in the present invention for the insulating material 324. A preferred material for the insulating material 320, 324 is refractory insulating material. Refractory insulating material is typically made from ceramic fibers made from materials including, but not limited to, silica, silicon carbide, alumina, aluminum silicate, aluminum oxide, zirconia, calcium silicate; glass fibers, mineral wool fibers, Wollastonite and fireclay. A preferred refractory insulating material is Wollastonite. Refractory insulating material is commercially available in bulk fiber, foam, blanket, board, felt and paper form. Refractory insulating material is commercially available in blanket form as Fiberfrax Durablanket® insulation blanket from Unifrax I LLC, Niagara Falls, N.Y., USA and RSI4-Blank and RSI8-Blank from Refractory Specialties Incorporated, Sebring, Ohio, USA. Refractory insulation is commercially available in board form as Duraboard® from Unifrax I LLC and CS85, Marinite and Transite boards from BNZ Materials Inc., Littleton, Colo., USA. Refractory insulation in felt form is commercially available as Fibrax Felts and Fibrax Papers from Unifrax I LLC. The refractory insulating material can be any thickness that provides the desired insulating properties. However, refractory insulating material useful in the present invention can range from approximately 1/32 inch to approximately 2 inches. Refractory insulating material may have both conductive heat insulating properties and radiant heat reflective properties. A preferred insulating material 320, 324 includes both a layer of conductive heat insulating material and a layer of radiant heat reflective material. Another preferred insulating material 320, 324 is a layer of refractory insulating material and a layer of aluminum foil.

As shown in FIGS. 6 and 7, there is disclosed a computing device 400 that is connected to three temperature sensors 402, 404, 406 by electric circuits, such as by the wires 408, 410, 412, respectively. The temperature sensor 402 is positioned at approximately the middle of the concrete 316. The temperature sensor 402 measures the interior temperature of the concrete 316 as it cures. The temperature sensor 404 is positioned at the interface between the layer of insulating material 320 and the concrete 316 (FIG. 6) or at the interface between the electrically heated blanket 322 and the concrete 316 (FIG. 7). The temperature sensor 406 is positioned adjacent the insulated concrete form so as to read the ambient temperature adjacent the form. For concrete of a thickness such that the temperature differential between the surface and the middle of the concrete is not significant, only one of the temperature sensors 402, 404 needs to be used. The ambient temperature sensor 406 is also optional. It is specifically contemplated that in the embodiment shown in FIG. 7, the temperature sensor 404 is attached to the under side of the electrically heated blanket 322, so that when the heated blanket is applied to the top 318 of the concrete 316, the temperature sensor will be positioned at the interface between the electrically heated blanket and the concrete 316.

The computing device 400 is connected to the temperature sensors 402-406 so that it can continuously, or periodically, read and store the temperature measured by each of the temperature sensors. The computing device 400 is connected to a blanket temperature controller 416 by an electric circuit, such as the wires 418. The blanket temperature controller 416 is connected to a source of electricity, such as 24, 60, 120 or 220 volts AC or 12 or 24 volts DC electric current, by wires (not shown). Far infrared heating blankets also can be used due to their relatively low voltage and relatively low power consumption characteristics. The lower voltages are preferred as they reduce or eliminate the chances of electrocution by a worker. The blanket temperature controller 416 is connected to the electrically heated blanket 322 by an electric circuit, such as by the wires 420. The computing device 400 and the blanket temperature controller 416 are configured and programmed such that the computing device controls the amount of heat produced by the electrically heated blanket 322. Thus, the computing device 400 controls the amount of heat that is provided to the concrete 316 within the insulated concrete form.

Figure 8:
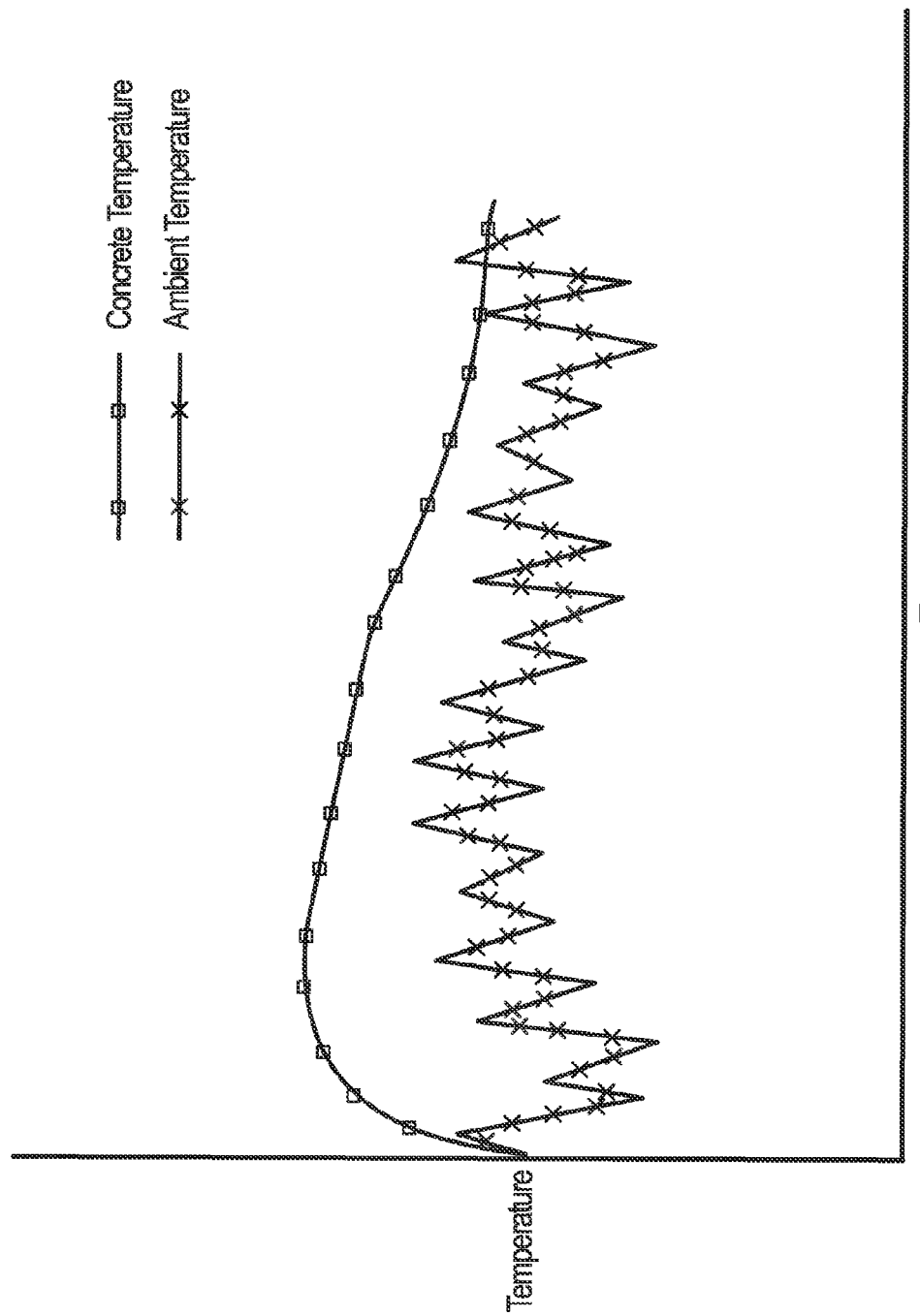
FIG. 8 is a graph of concrete temperature versus elapsed concrete curing time of a disclosed embodiment of a curing temperature profile for concrete in accordance with the present invention. An example of ambient temperature is also shown on the graph.

FIG. 8 shows a graph of a disclosed embodiment of a desired curing temperature profile for concrete as a function of time. In this graph, the temperature of the concrete is shown on the vertical axis and elapsed concrete curing time is shown on the horizontal axis. The intersection of the vertical and horizontal axes represents 0° C. concrete temperature and zero elapsed concrete curing time. Ambient temperature is also shown on this graph. The peaks and troughs of the ambient temperature represent the daily (i.e., day to night) fluctuation of ambient temperature. As can be seen in this graph, the temperature of the concrete initially increases quite rapidly over a relatively short time, such as 1 to 3 days. After a period of time, the concrete temperature reaches a maximum and then slowly drops to ambient temperature over an extended period, such as 1 to 7 days, preferably 1 to 14 days, more preferably 1 to 28 days, especially 3 to 5 days or more especially 5 to 7 days. The maximum temperature will vary depending on the composition of the concrete mix. However, it is desirable that the maximum temperature is at least 35° C., preferably, at least 40° C., at least 45° C., at least 50° C., at least 55° C., at least 60° C. or at least 65° C. The maximum concrete temperature should not exceed about 70° C. The maximum concrete temperature is preferably about 70° C., about 69° C., about 68° C., about 67° C., about 66° C., about 65° C., about 64° C., about 63° C., about 62° C., about 61° C. about 60° C. or about 60 to about 70° C. Furthermore, it is desirable that the temperature of the concrete is maintained above approximately 30° C., approximately 35° C., approximately 40° C., approximately 45° C., approximately 50° C., approximately 55° C. or approximately 60° C. for 1 to approximately 4 days from the time of concrete placement, preferably 1 to approximately 3 days from the time of concrete placement, more preferably about 24 to about 48 hours from the time of concrete placement. It is also desirable that the temperature of the concrete is maintained above approximately 30° C. for 1 to approximately 7 days from the time of concrete placement, preferably above approximately 35° C. for 1 to approximately 7 days from the time of concrete placement, more preferably above approximately 40° C. for 1 to approximately 7 days from the time of concrete placement, most preferably above approximately 45° C. for 1 to approximately 7 days from the time of concrete placement. It is also desirable that the temperature of the concrete be maintained above ambient temperature for 1 to approximately 3 days from the time of concrete placement; 1 to approximately 5 days from the time of concrete placement, for 1 to approximately 7 days from the time of concrete placement, for 1 to approximately 14 days from the time of concrete placement, preferably approximately 3 to approximately 14 days from the time of concrete placement, especially approximately 7 to approximately 14 days from the time of concrete placement. It is also desirable that the temperature of the concrete be maintained above ambient temperature for approximately 3 days, approximately 5 days, approximately 7 days or approximately 14 days from the time of concrete placement. It is further desirable that the temperature of the concrete be reduced from the maximum temperature to ambient temperature gradually, such as in increments of approximately 0.5 to approximately 5° C. per day, preferably approximately 1 to approximately 2° C. per day, especially approximately 1° C. per day. The electrically heated blanket is preferably kept on the curing concrete until the concrete is strong enough such that cracking due to temperature shrinkage will not occur from further cooling. Different curing temperature profiles may apply to different concrete mix designs and/or different materials used for the cementitious portion of the concrete mix in order to achieve a desired concrete strength or a desired concrete strength within a desired period of time in different weather conditions. However, all curing temperature profiles in accordance with the present invention will have the same general shape as shown in FIG. 8 relative to ambient temperature. Thus, as used herein the term "temperature profile" includes increasing the concrete temperature above ambient temperature over a period of time followed by decreasing the concrete temperature over a period of time, preferably to ambient temperature, wherein the slope of a line plotting temperature versus time during the temperature increase phase is greater than the absolute value of the slope of a line plotting temperature versus time during the temperature decrease phase. Furthermore, the absolute value of the slope of a line plotting temperature versus time during the temperature decrease phase of the temperature profile in a concrete form in accordance with the present invention is less than the absolute value of the slope of a line plotting temperature versus time if all added heat were stopped and the concrete were simply allowed to cool in a conventional concrete form; i.e., an uninsulated concrete form, under the same conditions. The term "temperature profile" includes the specific ranges of temperature increase and ranges of temperature decrease over ranges of time as set forth above with respect to FIG. 8. The term "temperature profile" includes increasing the temperature of curing concrete in a concrete form or mold to a maximum temperature at least 10% greater than the maximum temperature the same concrete mix would have reached in a conventional (i.e., non-insulated) concrete form or mold of the same configuration. The term "temperature profile" also includes reducing the temperature of curing concrete in a concrete form or mold from its maximum temperature at a rate slower than the rate the same concrete mix would reduce from its maximum temperature in a conventional (i.e., non-insulated) concrete form or mold of the same configuration. The principle behind concrete maturity is the relationship between strength, time, and temperature in young concrete. Maturity is a powerful and accurate means to predict early strength gain. Concrete maturity is measured as "equivalent age" and is given in temperature degrees×hours (either ° C.-Hrs or ° F.-Hrs). The term "temperature profile" includes controlling the temperature of curing concrete so that at 3 days it has a concrete maturity or equivalent age at least 25% greater than the same concrete mix would have in a conventional (i.e., non-insulated) concrete form or mold of the same configuration under the same conditions; preferably at least 30% greater, more preferably at least 35% greater, most preferably at least 40% greater, especially at least 45% greater, more especially at least 50% greater. The term "temperature profile" includes controlling the temperature of curing concrete so that at 3 days it has a concrete maturity or equivalent age about 70% greater than the same concrete mix would have when cured in accordance with ASTM C-39; preferably at least 75% greater, more preferably at least 80% greater, most preferably at least 85% greater, especially at least 90% greater, more especially at least 95% greater, most especially at least 100% greater. The term "temperature profile" includes controlling the temperature of curing concrete so that at 7 days it has a concrete maturity or equivalent age about 70% greater than the same concrete mix would have when cured in accordance with ASTM C-39; preferably at least 75% greater, more preferably at least 80% greater, most preferably at least 85% greater, especially at least 90% greater, more especially at least 95% greater, most especially at least 100% greater. The term "temperature profile" specifically does not include adding a constant amount of heat to the concrete followed by stopping adding heat to the concrete, such as would be involved when turning an electrically heated blanket or heated concrete form on and then turning the heated blanket or heated concrete form off. The disclosure of U.S. Pat. No. 8,545,749 is incorporated herein by reference in its entirety.

Figure 9:
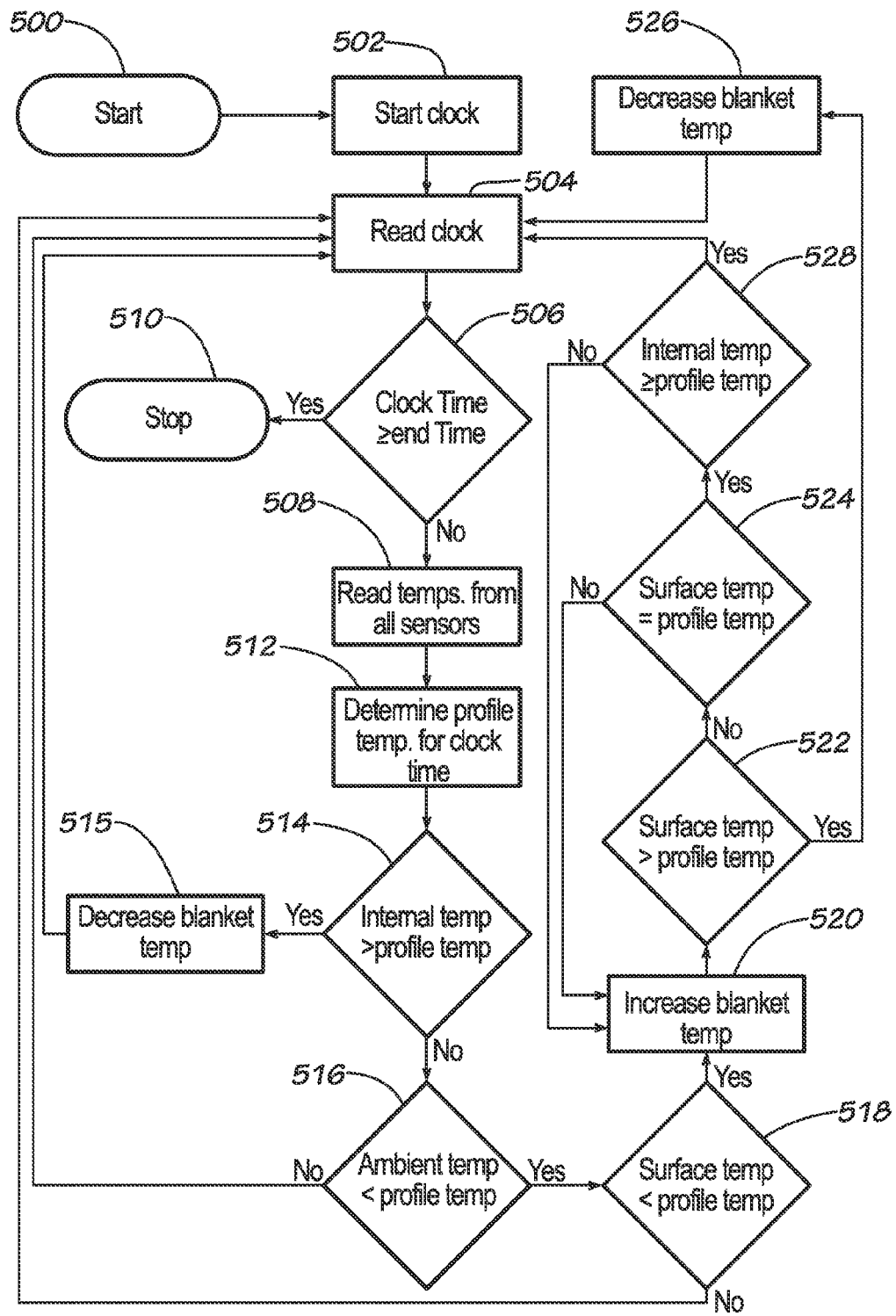
FIG. 9 is a flow diagram of a disclosed embodiment of a temperature controlled concrete curing process in accordance with the present invention.

FIG. 9 shows a flow diagram for a disclosed embodiment of a process for controlling the heat provided to curing concrete so that the temperature of the concrete can be controlled to match a desired temperature profile, such as that shown in FIG. 8. The computing device 202, 400 is programmed so that it will perform the process shown by this flow diagram.

The process starts at the block 500 and proceeds to the block 502 where a clock is initialized to time equal to zero and the clock is started. The clock measures the elapsed time from when the plastic concrete is placed into an insulated concrete form or mold, such as the forms shown in FIGS. 1-7. This elapsed time therefore is a measure of the elapsed time for the curing of the concrete.

The process proceeds from the block 502 to the block 504 where the clock is read. The time that is read from the clock is then stored in a memory location, such as in the RAM memory of the computing device 202, 400. The process proceeds from the block 504 to the decision block 506. A desired end time for terminating the process, such as 1 to 28 days, is preprogrammed into a memory location in the computing device 202, 400. At the block 506, the clock time stored in the memory location is compared to the end time stored in the memory location of the computing device 202, 400. If the clock time is less than the end time, the process proceeds to the block 508. If the clock time is greater than or equal to the end time, the process proceeds to the block 510 where the process is terminated.

At the block 508, the temperature from each of the sensors, such as the sensors 204-208, 402-406, is read and stored in memory locations, such as in the RAM memory of the computing device 202, 400. For example, the temperature from the sensor 204, 402 is stored as the internal concrete temperature, the temperature from the sensor 206, 404 is stored as the surface concrete temperature and the temperature from the sensor 208, 406 is stored as the ambient temperature. The process then proceeds from the block 508 to the block 512.

At the block 512 the temperature from the profile is determined for the clock time stored in the memory location. This can be done from the temperature profile curve, such as the curve shown in FIG. 8. The clock time is found on the horizontal axis and the temperature is determined by finding the vertical axis component of the curve for the time corresponding to the clock time. When this temperature is determined, it is stored in a memory location, such as in the RAM memory of the computing device 202, 400. In an alternate disclosed embodiment, instead of using a graph, such as shown in FIG. 8, the temperature profile can be in the form of a lookup table. The lookup table lists a range of times and a profile temperature corresponding to each of the ranges of time. For example, for the time 20 hours to 21 hours, the corresponding profile temperature from the lookup table might be 45° C.; for the time 21 hours to 22 hours, the corresponding profile temperature from the lookup table might be 46° C. Of course, the time intervals for the lookup table can be longer or shorter than one hour and any useful or desirable time interval can be used for the lookup table. The process then proceeds from the block 512 to the decision block 514.

At the decision block 514 the internal temperature of the concrete is compared to the profile temperature corresponding to the stored clock time. If the internal temperature is greater than the profile temperature, the process proceeds to the block 515. When this condition is encountered, the internal temperature of the concrete is greater than the profile temperature, so it is not necessary to provide additional heat to the concrete so that the temperature of the concrete will equal the profile temperature. If the internal temperature of the concrete is less than or equal to the profile temperature, the process proceeds to the decision block 516.

At the block 515, the temperature of the blanket is decreased. This can be done by the computing device 202, 400 sending a signal to the blanket temperature controller 216, 416, to decrease the temperature of the electrically heated blanket 200, 322. This can be done by the blanket temperature controller 216, 416 providing a reduced electrical voltage to the electrically heated blanket 216, 416 or by energizing the electrically heated blanket for a shorter period of time. The process then proceeds from the block 515 to the block 504 where a new clock time is read.

At the decision block 516, the ambient temperature is compared to the profile temperature corresponding to the stored clock time. If the ambient temperature is less than the profile temperature, the process proceeds to the decision block 518. If the ambient temperature is greater than or equal to the profile temperature, the process proceeds to the block 504. When this condition is encountered, the ambient temperature is greater than or equal to the profile temperature, so it is not necessary to provide additional heat to the concrete so that the temperature of the concrete will equal the profile temperature.

At the decision block 518, the surface temperature is compared to the profile temperature. If the surface temperature is less than the profile temperature, the process proceeds to the block 520. When this condition is encountered, both the surface temperature of the concrete and the internal temperature of the concrete are less than the profile temperature, so it is necessary to provide additional heat to the concrete so that the temperature of the concrete will equal the profile temperature. If the surface temperature is greater than or equal to the profile temperature, the process proceeds to the block 504.

At the block 520 the temperature of the electrically heated blanket 200, 322 is increased. This can be done by the computing device 202, 400 sending a signal to the blanket temperature controller 216, 416, to increase the temperature of the electrically heated blanket 200, 322. This can be done by the blanket temperature controller, such as the controller 216, 416, providing a greater electrical voltage to the electric heated blanket 200, 322 or energizing the electrically heated blanket for a longer period of time. The process then proceeds from the block 520 to the decision block 522.

At the decision block 522, the surface temperature is compared to the profile temperature. If the surface temperature is greater than the profile temperature, the process proceeds to the block 526. At the block 526, the temperature of the electrically heated blanket 200, 322 is decreased. This can be done by the computing device 202, 400 sending a signal to the blanket temperature controller 216, 416 to decrease the temperature of the electrically heated blanket 200, 322. This can be done by the blanket temperature controller 216, 416 providing a reduced electrical voltage to the electrically heated blanket 200, 322 or energizing the electrically heated blanket for a shorter period of time. The process then proceeds from the block 526 to the block 504 where a new clock time is read. If the surface temperature is greater than or equal to the profile temperature, the process proceeds to the decision block 524.

At the decision block 524, the surface temperature is compared to the profile temperature. If the surface temperature is equal to the profile temperature, the process proceeds to the decision block 528. If the surface temperature is less than the profile temperature, the process proceeds to the block 520 where the temperature of the electrically heated blanket 200, 322 is increased.

At the decision block 528, the internal temperature is compared to the profile temperature. If the internal temperature is greater than or equal to the profile temperature, the process proceeds to the block 504 where a new clock time is read. If the internal temperature is less than the profile temperature, the process proceeds to the block 520 where the temperature of the electrically heated blanket 200, 322 is increased.

The foregoing process regulates the heat provided by the electrically heated blanket 200, 322 so that the temperature of the concrete is equal to the profile temperature at any given elapsed concrete curing time. When the temperature of the concrete is less than the profile temperature at a given time, the electrically heated blanket 200, 322 provides heat to the concrete until the temperature of the concrete is equal to the profile temperature. When the temperature of the concrete is greater than the profile temperature at a given time, no additional heat is provided to the concrete or the amount of heat provided to the concrete is reduced until the concrete temperature equals the profile temperature. Thus, the concrete temperature is continuously monitored and adjusted so that over time the concrete temperature will follow the predetermined temperature profile. Thus, over a predetermined time the concrete temperature is maintained at predetermined levels and the concrete temperature is reduced to ambient temperature at a predetermined rate.

There is also an assumption that there is no temperature gradient between the internal temperature of the concrete and the surface temperature of the plastic concrete. If this is the case, the concrete surface temperature, such as measured by the sensor 206, 404, will approximate the internal concrete temperature. Thus, the surface temperature of the concrete can be taken as the temperature of the concrete.

However, cold weather conditions may be such that there is some significant temperature gradient between those two points; i.e., between the internal concrete temperature, as measured by the sensors 204, 402, and the concrete surface temperature, as measured by the sensors 206, 404. Thus, at the blocks 518, 522 and 524 the conditions of the surface temperature being greater than or equal to some value must take the temperature gradient into account. For example, if there is a temperature gradient between the surface temperature and the internal temperature of the concrete of 2° C., then the computer is programmed so that the actual surface temperature is adjusted downward by an amount equal to the temperature gradient. Therefore, if the actual surface temperature is measured as 57° C. by for example the surface temperature sensor, such as the sensor 204, 404, the temperature stored by the computing device 202, 400 for use in the process shown in FIG. 9 should be 55° C. Thus, in the block 524 if the profile temperature is 55° C. and the actual temperature measured by the sensor 204, 404 is 57° C., the decision block 524 will be answered "Yes" because the surface temperature is reduced by 2° C. to compensate for the temperature gradient through the concrete from the surface to the interior thereof. The temperature gradient can be measured or it can be estimated based on the thickness of the concrete, the amount of insulation used in the insulated concrete form and the ambient temperature conditions. Preferably, the temperature gradient for various thicknesses of concrete, thicknesses of insulation and ambient temperature are measured and known in advance and are compiled into a lookup table that is stored in the computing device 202, 400 so that is can be automatically taken into account by the computer when initially set up for each project.

Figure 10:
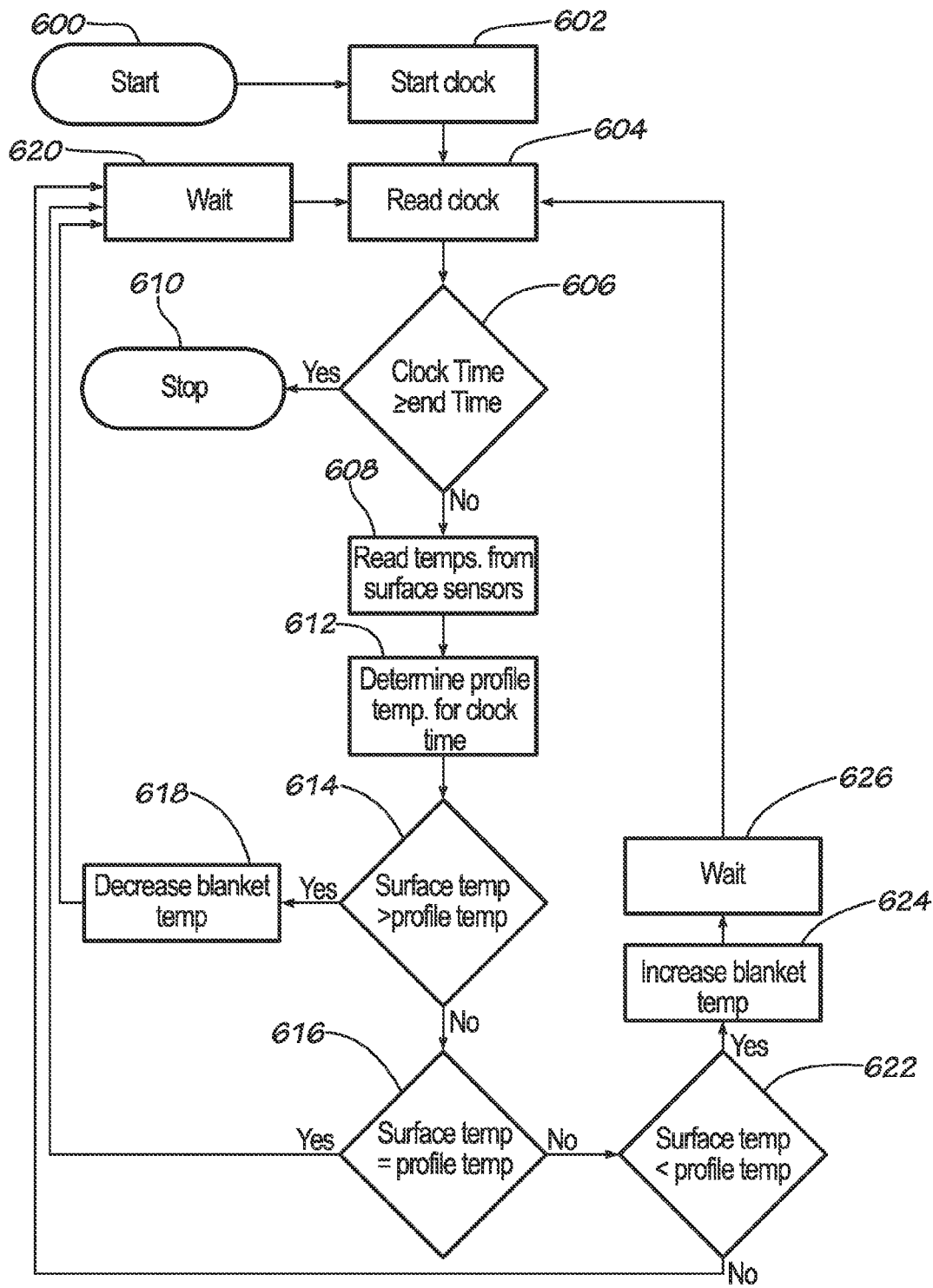
FIG. 10 is a flow diagram of another disclosed embodiment of a temperature controlled concrete curing process in accordance with the present invention.

FIG. 10 shows an alternate disclosed embodiment of a flow diagram for a process for controlling the heat provided to the concrete so that the temperature of the concrete can be controlled to match a desired temperature profile, such as shown in FIG. 8. The computing device 202, 400 is programmed so that it will perform the process shown by this flow diagram.

The process starts at the block 600 and proceeds to the block 602 where the clock is initialized to time equal to zero and the clock is started. The clock measures the elapsed time from when the plastic concrete is placed into the insulated concrete form or mold, such as the forms shown in FIGS. 1-7. This elapsed time therefore is a measure of the elapsed time for the curing of the concrete.

The process proceeds from the block 602 to the block 604 where the clock is read. The time that is read from the clock is then stored in a memory location, such as in the RAM memory of the computing device 202, 400. The process proceeds from the block 604 to the decision block 606. A desired end time for terminating the process, such as 1 to 28 days, is preprogrammed into a memory location, such as in the RAM memory of the computing device 202, 400. At the block 606, the clock time stored in the memory location is compared to the end time stored in the memory location of the computing device 202, 400. If the clock time is less than the end time, the process proceeds to the block 608. If the clock time is greater than or equal to the end time, the process proceeds to the block 610 where the process is terminated.

At the block 608, the temperature from the surface concrete temperature sensor 206, 404 is read and stored in a memory location, such as in the RAM memory of the computing device 202, 400. The process then proceeds from the block 608 to the block 612.

At the block 612 the temperature from the predetermined temperature profile is determined for the clock time stored in the memory location. This can be done from the temperature profile curve, such as the curve shown in FIG. 8. The clock time is found on the horizontal axis and the temperature is determined by finding the vertical axis component of the curve for the time corresponding to the clock time. When this temperature is determined, it is stored in a memory location, such as in the RAM memory of the computing device 202, 400. In an alternate disclosed embodiment, instead of using a graph, such as shown in FIG. 8, the temperature profile can be in the form of a lookup table. The lookup table can list a range of times and a profile temperature corresponding to the range of times. The process then proceeds from the block 612 to the decision block 614.

At the decision block 614, the surface temperature of the concrete is compared to the profile temperature corresponding to the stored clock time. If the surface temperature is greater than the profile temperature, the process proceeds to the block 618. When this condition is encountered, the surface temperature of the concrete is greater than the profile temperature, so it is not necessary to provide additional heat to the plastic concrete so that the temperature of the plastic concrete will equal the profile temperature. Therefore, at the block 618 the temperature of the electrically heated blanket 200, 322 is decreased. This can be done by the blanket temperature controller 216, 416 providing a reduced electrical voltage to the electrically heated blanket 200, 322 or by energizing the electrically heated blanket for a shorter period of time. The process then proceeds from the block 618 to the block 620. At the block 620, a predetermined wait time is executed before the process proceeds from the block 620 to the block 604 where a new clock time is read. The wait time can be any desired time that is suitable for the concrete temperature being measured, such as one second, ten seconds, 30 seconds, one minute, one hour and the like. If the surface temperature of the concrete is less than or equal to the profile temperature, the process proceeds to the decision block 616.

At the decision block 616, the surface concrete temperature is compared to the profile temperature corresponding to the stored clock time. If the surface concrete temperature is equal to the profile temperature, the process proceeds from the block 616 to the block 620. If the surface concrete temperature is not equal to the profile temperature, the process proceeds to the decision block 622.

At the decision block 622, the surface concrete temperature is compared to the profile temperature. If the surface concrete temperature is greater than or equal to the profile temperature, the process proceeds to the block 620. If the surface concrete temperature is less than the profile temperature, the process proceeds to the block 624.

At the block 624, the temperature of the electrically heated blanket 200, 322 is increased. This can be done by the computing device 202, 400 sending a signal to the blanket temperature controller 216, 416, to increase the temperature of the electrically heated blanket 200, 322. This can be done by the blanket temperature controller 216, 416, providing a greater electrical voltage to the electrically heated blanket 200, 322 or by energizing the electrically heated blanket for a longer period of time. The process then proceeds from the block 624 to the block 626.

At the decision block 626, a predetermined wait time is executed before the process proceeds from the block 626 to the block 604. The wait time can be any desired time that is suitable for the concrete temperature being measured, such as one second, ten seconds, 30 seconds, one minute, one hour and the like. The process then proceeds from the block 626 to the block 604 where a new clock time is read.

The foregoing process regulates the heat provided by the electrically heated blanket 200, 322 so that the temperature of the concrete is equal to the profile temperature at any given time. When the temperature of the concrete is less than the profile temperature at a given curing time, the electrically heated blanket 200, 322 provides heat to the concrete until the temperature of the concrete is equal to the profile temperature. When the temperature of the concrete is greater than the profile temperature at a given curing time, no additional heat or a reduced amount of heat is provided to the concrete. Thus, the concrete temperature is continuously monitored and adjusted so that over time the concrete temperature will follow the predetermined temperature profile. Thus, over a predetermined time period the concrete temperature is maintained at predetermined levels that reduce to ambient temperature at a predetermined rate.

When the process of FIG. 9 or 10 is completed, the electrically heated blanket 200, 322 and any additional insulation, such as the insulating material 320, 324, is removed from the cured concrete 174, 316. In the embodiment shown in FIG. 1, the side form members 130-136 are stripped from the concrete. In the embodiment shown in FIGS. 6 and 7, the beams, stringers and post shore supports are removed. The curing of the concrete is then complete, or is sufficiently complete, that it can be used for its intended purpose.

A particularly difficult problem with concrete curing is associated with mass concrete. Mass concrete is so thick that during curing the concrete in the interior may be significantly hotter than concrete adjacent the surface. This temperature differential may cause cracking of the concrete due to the quicker cooling of the outer portion of the concrete. The present invention can be used to control the temperature differential in concrete, particularly mass concrete. The present invention can also be used in conjunction with the prior art systems for cooling the core of the mass concrete, such as pipes carrying chilled water through the center of the mass concrete.

Figure 11:
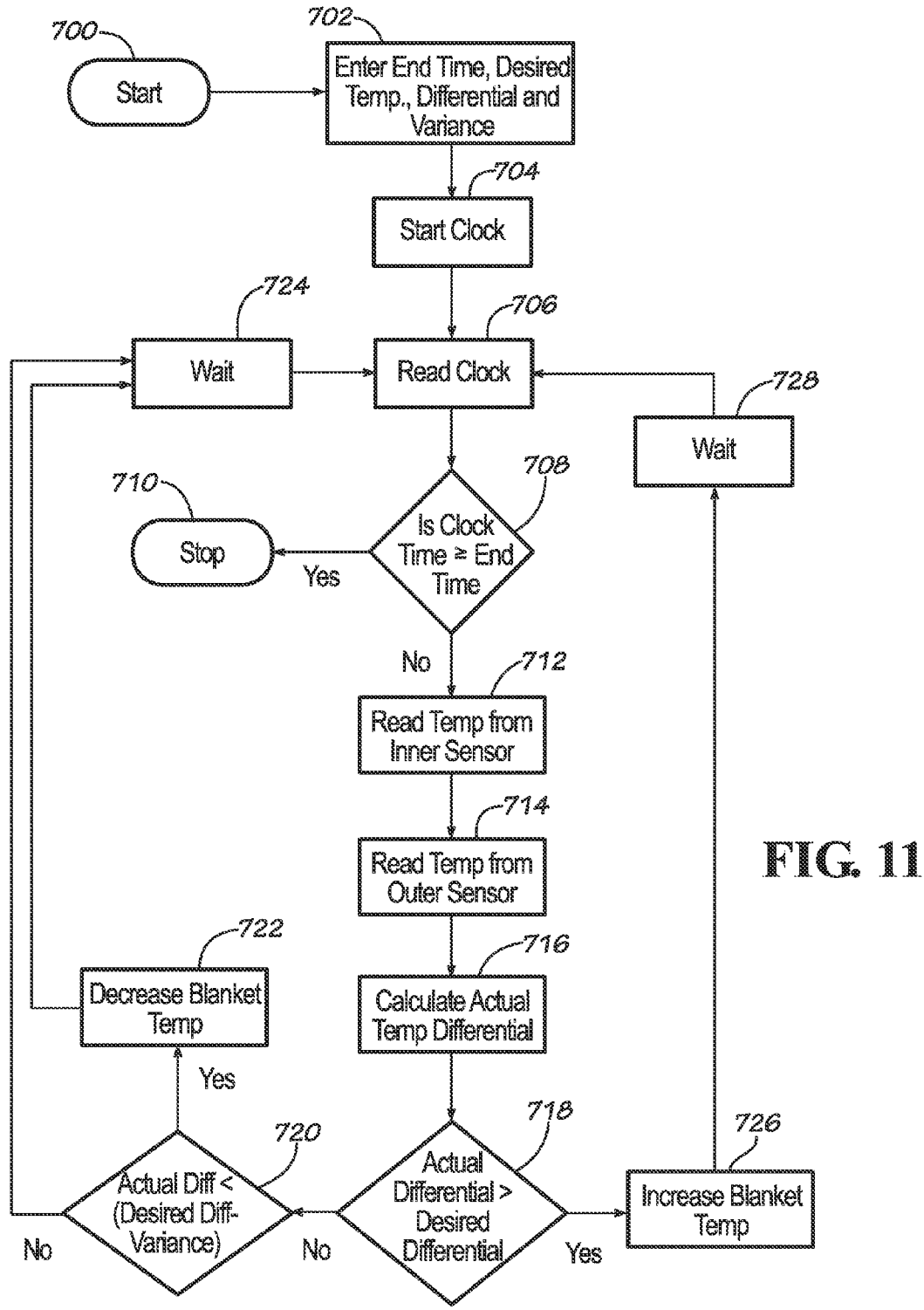
FIG. 11 is a flow diagram of another disclosed embodiment of a temperature controlled concrete curing process in accordance with the present invention for use with mass concrete.

FIG. 11 shows an alternate disclosed embodiment of a flow diagram for a process for controlling the heat provided to mass concrete so that the temperature of the mass concrete can be controlled to match a desired temperature differential. For example, if the concrete 174 (FIGS. 1-5) or the elevated slab 316 (FIGS. 6 and 7) are of a sufficient thickness they may be considered mass concrete, such as might be found in building foundations, airport runways, bridge abutments or piers. In this case, the temperature differential between an inner portion of the concrete, for example as determined by the temperature sensor 204, 402, and an outer portion of the concrete, for example as determined by the temperature sensor 206, 404, should not exceed a desired amount. FIG. 11 shows a system for controlling this temperature differential. The computing device 202, 400 is programmed to perform the process shown in FIG. 11.

The process starts at the block 700 and proceeds to the block 702 where a desired end time, a desired temperature differential and a desired temperature variance are entered. A useful temperature variance may be, for example, 1 degree, 2 degrees, 3 degrees, 4 degrees or 5 degrees. These values are stored in memory locations, such as in the RAM memory of the computing device 202, 400. The end time is the desired amount of temperature controlled curing time for the concrete. The temperature differential is the desired difference in temperature of an inner portion of the concrete, such as determined by the temperature sensor 204, 402, and an outer portion of the concrete, such as determined by the temperature sensor 206, 404. This temperature differential will vary depending upon the thickness of the concrete and the particular concrete mix that is used. However, it is preferred that the temperature differential is less than 20° C.; more preferably less than 15° C.; most preferably less than 10° C.; especially less than 5° C. The process proceeds from block 702 to block 704 where a clock is initialized to time equal to zero and the clock is started. The clock measures the elapsed time from when the concrete is placed into the insulated concrete form or mold, such as shown in FIGS. 1-7. This elapsed time therefore is a measure of the elapsed time for the curing of the concrete.

The process proceeds from the block 704 to the block 706 where the clock is read. The time that is read from the clock is then stored in a memory location, such as in the RAM memory of the computing device 202, 400. The process proceeds from the block 706 to the decision block 708. A desired end time for terminating the process, such as 1 to 28 days, was entered into a memory location in the computing device 202, 400 at the block 702. At the block 708, the clock time stored in the memory location is compared to the end time stored in the memory location of the computing device 202, 400. If the clock time is less than the end time, the process proceeds to the block 712. If the clock time is greater than or equal to the end time, the process proceeds to the block 710 where the process is terminated.

At the block 712, the temperature from the inner concrete temperature sensor 204, 402 is read and stored in a memory location, such as in the RAM memory of the computing device 202, 400. The process then proceeds from the block 712 to the block 714. At the block 714 the temperature from the outer concrete temperature sensor 206, 404 is read and stored in a memory location, such as in the RAM memory of the computing device 202, 400. The process then proceeds from the block 714 to the block 716.

At the block 716, the actual measured temperature differential is calculated. This is done by subtracting the temperature of the outer concrete temperature sensor 206, 404 from the temperature of the inner temperature sensor 204, 402. This actual measured temperature differential is then stored in a memory location, such as in the RAM memory of the computing device 202, 400. The process then proceeds from the block 716 to the decision block 718.

At the decision block 718 the actual measured temperature differential is compared to the stored desired temperature differential. If the actual measured temperature differential is less than or equal to the stored desired temperature differential, the process proceeds to the block 720. When this condition is encountered, the actual temperature differential of the concrete is less than or equal to the desired temperature differential, so it is not necessary to provide additional heat to the outer portion of the concrete to thereby reduce the actual temperature differential. The process then proceeds from the decision block 718 to the decision block 720. At the decision block 720, the actual measured temperature differential is compared to the stored desired temperature differential minus the desired temperature variance. If the actual measured temperature differential is less than the stored desired temperature differential minus the desired temperature variance, the process proceeds to the block 722. At the block 722 the temperature of the electrically heated 200, 322 blanket is decreased. This can be done by the blanket temperature controller 216, 416 providing a reduced electrical voltage to the electrically heated blanket 200, 322 or by energizing the electrically heated blanket for a reduced period of time. The process then proceeds from the block 722 to the block 724. At the block 724, a predetermined wait time is executed before the process proceeds from the block 724 to the block 706. The wait time can be any desired time that is suitable for the concrete temperature being measured, such as one second, ten seconds, 30 seconds, one minute, one hour and the like. If the actual measured temperature differential is greater than or equal to the stored desired temperature differential minus the desired temperature variance, the process proceeds from the decision block 720 to the block 724.

At the decision block 718, if the actual measured temperature differential is greater than the stored desired temperature differential, the process proceeds to the block 726. At the block 726, the temperature of the electrically heated blanket 200, 322 is increased. This can be done by the computing device 202, 400 sending a signal to the blanket temperature controller 216, 416, to increase the temperature of the electrically heated blanket 200, 322. This can be done by the blanket temperature controller 216, 416, providing a greater electrical voltage to the electrically heated blanket 200, 322 or energizing the electrically heated blanket for a longer period of time. The process then proceeds from the block 726 to the block 728. At the block 728, a predetermined wait time is executed before the process proceeds from the block 728 to the block 706. The wait time can be any desired time that is suitable for the concrete temperature being measured, such as one second, ten seconds, 30 seconds, one minute, one hour and the like.

The foregoing process regulates the heat provided by the electrically heated blanket 200, 322 so that the difference between the temperature of the inner portion of the concrete and the temperature of the outer portion of the concrete does not exceed a desired temperature differential. When the temperature differential of the concrete is greater than a desired amount, the electrically heated blanket 200, 322 provides heat to the outer portion of the concrete so as to reduce the temperature differential. When the temperature differential of the concrete is less than a desired amount minus a desired temperature variance, the electrically heated blanket 200, 322 provides less heat to the outer portion of the concrete so as to increase the temperature differential. This keeps the actual temperature differential within the range of the desired temperature differential to the desired temperature differential minus the desired temperature variance. This is an important feature. If the outer portion of concrete were allowed to get too warm, such as the same temperature as the inner portion of concrete, the inner portion of concrete would never cool. Therefore, it is important to keep the actual temperature differential within a desired range of temperatures. Thus, the concrete temperature is continuously monitored and adjusted so that over time a constant temperature differential range is provided. Also, as the temperature of the inner portion of the concrete decreases over time, the temperature of the outer portion of the concrete is reduced so as to maintain the desired temperature differential. By controlling the temperature differential of the concrete, the concrete will experience reduced cracking. It is also specifically contemplated that the processes shown in FIGS. 9 and 10 can be used in conjunction with the process shown in FIG. 10.

In the foregoing embodiments, the electrically heated blanket 200, 322 is shown as partially enclosing the concrete 174, 316 in the insulated form or mold. However, it is also specifically contemplated that the electrically heated blanket can completely enclose the concrete within the concrete form or mold; i.e., the electrically heated blanket covers all sides of the concrete form or mold. Alternately, it is specifically contemplated that electrical heating elements can be built into the concrete forms or molds. For example, for a concrete structure for which a specific form or mold is constructed and will be reused multiple times, electrical heating elements can be built into the material from which the form or mold is made, such as by including electrical heating elements in plastic used to construct the concrete form or mold. Or, if the form or mold is made of metal, the electrical heating elements can be placed so that they thermally contact the side of the metal form or mold opposite the side that contacts the plastic concrete. In this embodiment, the heat from the heating element is transferred through the metal form or mold to the concrete therein. If the electric heating elements are built into the form or mold and provide sufficient heat to maintain the temperature of the concrete at desired levels, the foam insulating panels, insulating blankets or other insulating material may not be necessary. However, providing insulation over the heating elements will make them more efficient, and, therefore, is preferred. These embodiments will be discussed in more detail below.

Although it is preferred to measure the temperature of the concrete in the insulated concrete form using a temperature sensor embedded in the concrete, such as at the approximately middle of the concrete, such as the temperature sensors 204, 402, a close approximation of the temperature of the concrete can be measured by placing a temperature sensor only at the surface of the concrete, such as the temperature sensors 206, 404. Alternately, two surface temperature sensors can be used, such as the surface temperature sensor 206, 404, and another surface temperature sensor (not shown) placed at the opposite surface of the concrete; e.g., at the interface between the concrete 174 and the foam insulating panels 14-22 (FIGS. 1-5) or at the interface between the concrete 316 and the foam insulating panel 310 (FIGS. 6 and 7). The temperature of the concrete can then be determined by averaging the temperature detected by the two temperature sensors positioned on the opposite sides of the concrete. Of course, multiple temperature sensors can be placed at multiple locations and the temperature readings of all the temperature sensors can be averaged to provide the temperature of the curing concrete. All of these methods for measuring the temperature of the concrete are contemplated by the present invention.

The insulated concrete form or mold can be any insulated concrete form or mold that is sufficiently strong to hold the plastic concrete. Preferred insulated concrete forms are disclosed in U.S. Pat. Nos. 8,555,583; 8,756,890 and 8,555,584 (the disclosures of which are incorporated herein by reference'. Modular insulated concrete forms can also be used, such as those disclosed in U.S. Pat. Nos. 5,497,592; 5,809,725; 6,026,620; 6,668,503; 6,898,912 and 7,124,547 and U.S. Pat. App. Publication Nos. 2002/0092253 and 2011/0057090 (the disclosures of which are all incorporated herein by reference). It is also specifically contemplated that a conventional concrete form or mold can be made into an insulated concrete form or mold by applying insulating material, such as expanded polystyrene foam, to the exterior of the conventional form or mold. Alternatively, the insulating material can be sprayed on the exterior surface of a reusable conventional concrete form or mold in liquid form and then foamed in situ, such as by including a blowing agent in the liquid, such as a low-boiling liquid. Polymers that can be sprayed on, either already foamed or in liquid form and then foamed and cured in situ include, but are not limited to, polystyrene, polyurethane, polyisoprene and other polymers well known to those skilled in the art. Thus, any form or mold known in the art for forming concrete structures, precast concrete structures, mortar structures or concrete objects can be made into an insulated concrete form or mold by applying an insulating material to all, or a portion, of the exterior of the conventional form or mold; i.e., the side of the form or mold that does not contact the concrete. An insulated blanket or an electrically heated blanket can also be used for a portion of the insulated concrete form or mold, such as on one side of the foam or mold. Also, a conventional concrete form or mold can be partially or completely wrapped in insulating material, an insulated blanket or an electrically heated blanket. The configuration of the form or mold is not important to the present invention. What is important is that the insulated concrete form holds in a sufficient amount of the heat of hydration and additional heat is added to the form or mold, as necessary, so that the temperature of the concrete therein follows a predetermined temperature profile. Thus, the form or mold or the insulating material applied to the form or mold preferably has sufficient insulating properties, as specified below.

In addition to providing the foregoing process to horizontal concrete structures, especially mass concrete structures; the process of the present invention can be applied to vertical concrete structures, especially vertical mass concrete structures, such as walls, piers, columns, bridge supports, dam structures and the like. With reference to FIGS. 12-15, there is shown a mass concrete form 800 for a mass concrete column. The mass concrete column is, for example, 36 inches square and 10 feet high. The mass concrete form 800 is formed by placing plastic concrete 802 in a space defined by four opposed vertical concrete forms 804, 806, 808, 810 disposed on opposite sides of the column. The vertical forms 804-810 can be any conventional concrete forms, such as the aluminum concrete forms available from Wall-Ties & Forms, Inc., Shawnee, Kans., USA or Wall Formwork of Doka, Amstetten, Austria and Lawrenceville, Ga., USA. The vertical forms 804-810 rest on a concrete footing or concrete slab 812. Inside the mass concrete form 800 there will typically be a grid of vertical and horizontal rebar (not shown). The rebar grid provides a convenient place to attach temperature sensors. A first temperature sensor 814 is placed in the approximate middle of the column (FIG. 13). A second temperature sensor 816 is placed adjacent a surface of a side of the concrete column. A third temperature sensor 818 is optionally placed adjacent the surface of the top of the concrete column. The first temperature sensor 814 therefore measures the temperature of an inner portion of the concrete column, whereas the temperature sensors 816, 818 measure the temperature of an outer portion of the concrete column. For example, the sensors 816, 818 can be located at the surface of the concrete 802, such as at the interface between the concrete and the form 808. The specific sensor locations disclosed herein are only examples of operative sensor locations. Any other means, either direct or indirect, of measuring the temperature of an inner portion of the concrete and an outer portion of the concrete in the mass concrete form 800 are also considered to be useful in the present invention.

Each of the temperature sensors 814-818 is connected to a computing device 820 by an electric circuit, such as by wires 822, 824, 826, respectively. The computing device 820 is connected to the temperature sensors 814-818 so that it can continuously, or periodically, read and store the temperature measured by each of the temperature sensors. The computing device 820 is connected to a blanket temperature controller 828 by an electric circuit, such as the wires 830. The blanket temperature controller 828 is connected to a source of electricity, such as 12, 24, 120 or 220 volts AC or 12 or 24 volts DC electric current, by wires (not shown). The lower voltages are desirable as they eliminate the chances of electrocution by a worker in a wet environment. The blanket temperature controller 828 is connected to a first electrically heated blanket 832 by an electric circuit, such as by the wires 834. The blanket temperature controller 828 is connected to a second electrically heated blanket 836 by an electric circuit, such as by the wires 838. The second electrically heated blanket 836 covers the top of the mass concrete form 800. The first electrically heated blanket 832 surrounds the sides of the mass concrete form 800, including the vertical forms 804-810. Thus, the electrically heated blankets 832, 836 completely surround the concrete within the mass concrete form 800, except for the bottom, which rests on the footing or slab 812. The computing device 820 and the blanket temperature controller 828 are configured and programmed such that the computing device controls the amount of heat produced by the electrically heated blankets 832, 836. Thus, the computing device 820 controls the amount of heat that is provided to the concrete 802 within the mass concrete form 800.

Use of the mass concrete form 800 will now be considered. The forms 804-810 are erected and fastened together to form the mold for the mass concrete column. Plastic concrete 802 is then poured into the space defined by the forms 804-810. After the plastic concrete 802 is placed in the form, the forms 804-810 are wrapped with the electrically heated blankets 832, 836. The electrically heated blanket 836 is first placed on the top of the concrete 802 and the forms 804-810. Then, the forms 804-810 are wrapped with the electrically heated blanket 832. The electrically heated blanket 832 can be held in place, for example with bungee cords (not shown) encircling the forms 804-810 and the blanket 832. After a few days, it may be desirable to remove the forms 804-810. This can be done by first removing the electrically heated blankets 832, 836. The forms 804-810 can then be removed in a conventional manner so that the forms can be reused on a different project. After the forms 804-810 are removed from the concrete column 802, as shown in FIG. 14, the electrically heated blanket 836 is placed on top of the concrete column 802. The electrically heated blanket 832 is then wrapped around the concrete column 802. The electrically heated blanket 832 can be held in place, for example with bungee cords (not shown) encircling the blanket 832 and concrete column 802. The computing device 820 is programmed to operate according to the flow diagram shown in FIG. 11 for both the configuration shown in FIGS. 12 and 13 and the configuration shown in FIGS. 14 and 15.

The process starts at the block 700 and proceeds to the block 702 where a desired end time, a desired temperature differential and a desired temperature variance are entered. These values are stored in memory locations, such as in the RAM memory of the computing device 820. The end time is the desired amount of temperature controlled curing time for the mass concrete column 802. The temperature differential is the desired difference in temperature of an inner portion of the concrete, as determined by the temperature sensor 814, and an outer portion of the concrete, as determined by the temperature sensors 816, 818. This temperature differential will vary depending upon the thickness of the concrete and the particular concrete mix that is used. However, it is preferred that the temperature differential is less than 20° C.; more preferably less than 15° C.; most preferably less than 10° C.; especially less than 5° C. The temperature variance is the amount that the temperature differential can vary from the desired temperature differential. The process then proceeds from block 802 to block 804 where the clock is initialized to time equal to zero and the clock is started. The clock measures the elapsed time from when the plastic concrete 802 is placed into the insulated concrete form 800. This elapsed time therefore is a measure of the elapsed time for the curing of the concrete 802.

The process proceeds from the block 704 to the block 706 where the clock is read. The time that is read from the clock is then stored in a memory location, such as in the RAM memory of the computing device 820. The process proceeds from the block 706 to the decision block 708. A desired end time for terminating the process, such as 1 to 28 days, was entered into a memory location in the computing device 820 at the block 702. At the block 708, the clock time stored in the memory location is compared to the end time stored in the memory location of the computing device 820. If the clock time is less than the end time, the process proceeds to the block 712. If the clock time is greater than or equal to the end time, the process proceeds to the block 710 where the process is terminated.

At the block 712, the temperature measured by the internal concrete temperature sensor 814 is read and stored in a memory location, such as in the RAM memory of the computing device 820. The process then proceeds from the block 712 to the block 714. At the block 714 the temperature measured by the outer concrete temperature sensor 816, 818 is read and stored in a memory location, such as in the RAM memory of the computing device 820. The process then proceeds from the block 714 to the block 716.

At the block 716, the actual temperature differential is calculated. This is done by subtracting the temperature of the outer concrete temperature sensors 816, 818 from the temperature of the internal temperature sensor 814. This actual measured temperature differential is then stored in a memory location, such as in the RAM memory of the computing device 820. The process then proceeds from the block 716 to the decision block 718.

At the decision block 718 the actual measured temperature differential is compared to the stored desired temperature differential. If the actual measured temperature differential is less than or equal to the stored desired temperature differential, the process proceeds to the block 720. When this condition is encountered, the actual temperature differential of the concrete is less than or equal to the desired temperature differential, so it is not necessary to provide additional heat to the outer portion of the concrete to thereby reduce the actual temperature differential. The process then proceeds from the decision block 718 to the decision block 720. At the decision block 720, the actual measured temperature differential is compared to the stored desired temperature differential minus the desired temperature variance. If the actual measured temperature differential is less than the stored desired temperature differential minus the desired temperature variance, the process proceeds to the block 722. At the block 722 the temperature of the blanket is decreased. This can be done by the computing device 820 sending a signal to the blanket temperature controller 828 to reduce the temperature of the electrically heated blankets 832, 836. This can be done by the blanket temperature controller 828 providing a reduced electrical voltage to the electrically heated blankets 832, 836 or by energizing the electrically heated blankets for a reduced period of time. The process then proceeds from the block 722 to the block 724. At the block 724, a predetermined wait time is executed before the process proceeds from the block 724 to the block 706 where a new clock time is read. The wait time can be any desired time that is suitable for the concrete temperature being measured, such as one second, ten seconds, 30 seconds, one minute, one hour and the like. If the actual measured temperature differential is greater than or equal to the stored desired temperature differential minus the desired temperature variance, the process proceeds from the decision block 720 to the block 724.

At the decision block 718, if the actual measured temperature differential is greater than the stored desired temperature differential, the process proceeds to the block 726. At the block 726, the temperature of the electrically heated blankets 832, 836 is increased. This can be done by the computing device 820 sending a signal to the blanket temperature controller 828 to increase the temperature of the electrically heated blankets 832, 836. This can be done by the blanket temperature controller 828, providing a greater electrical voltage to the electrically heated blankets 832, 836 or by energizing the electrically heated blanket 832, 836 for a longer period of time. The process then proceeds from the block 726 to the block 728. At the block 728, a predetermined wait time is executed before the process proceeds from the block 728 to the block 706 where a new clock time is read. The wait time can be any desired time that is suitable for the concrete temperature being measured, such as one second, ten seconds, 30 seconds, one minute, one hour and the like.

The foregoing process regulates the heat provided by the electrically heated blankets 832, 836 to the concrete so that the difference between the temperature of the inner portion of the concrete and the temperature of the outer portion of the concrete does not exceed a desired temperature differential. When the temperature differential of the concrete is greater than a desired amount, the electrically heated blankets 832, 836 provide heat to the outer portion of the concrete so as to reduce the temperature differential. When the temperature differential of the concrete is less than a desired amount minus a desired variance, the electrically heated blankets 832, 836 provide less heat, or no heat, to the outer portion of the concrete so as to increase the temperature differential.

Figure 12:
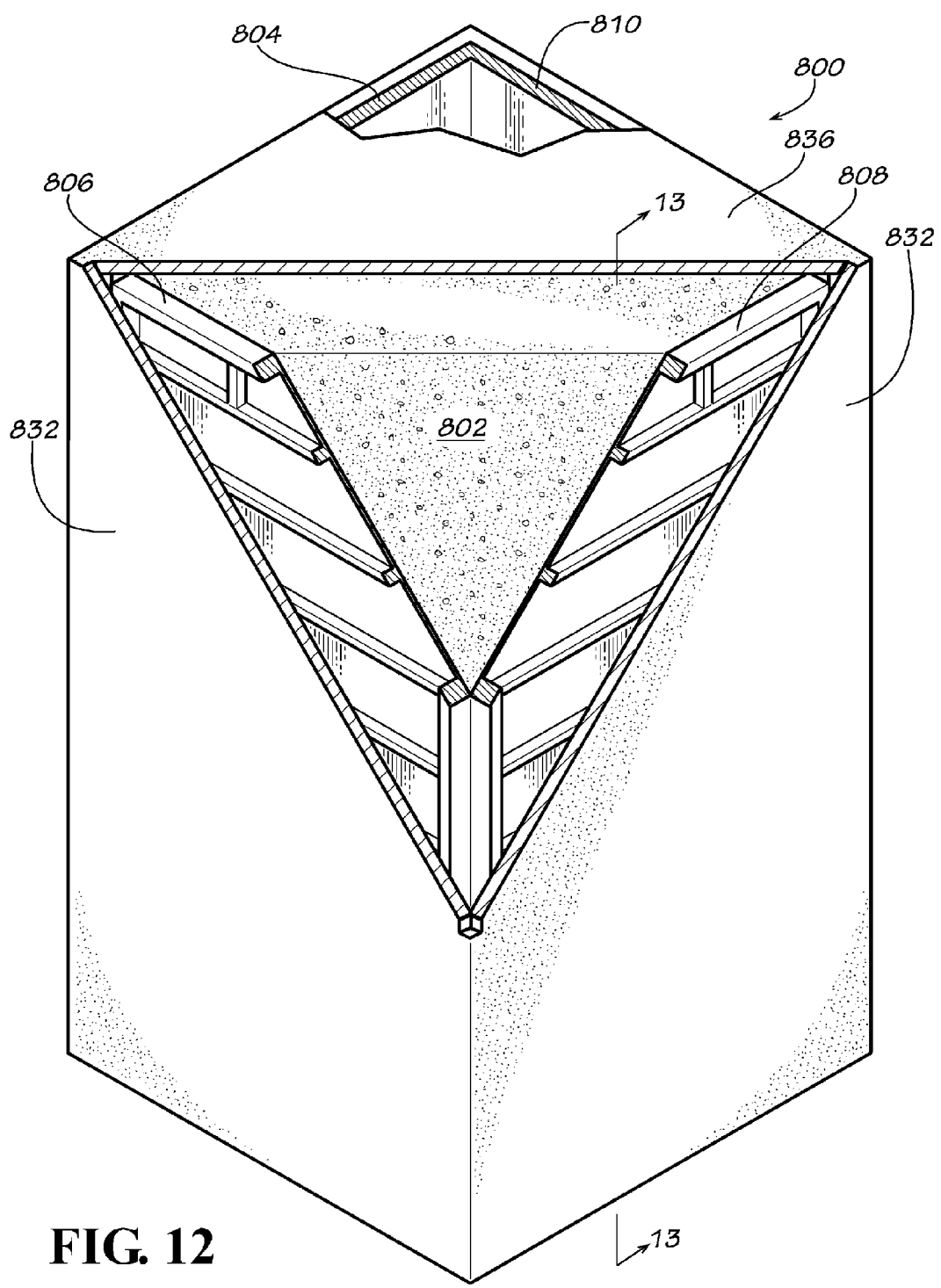
FIG. 12 is the perspective view of a disclosed embodiment of an insulated concrete form or mold in accordance with the present invention.
Figure 13:
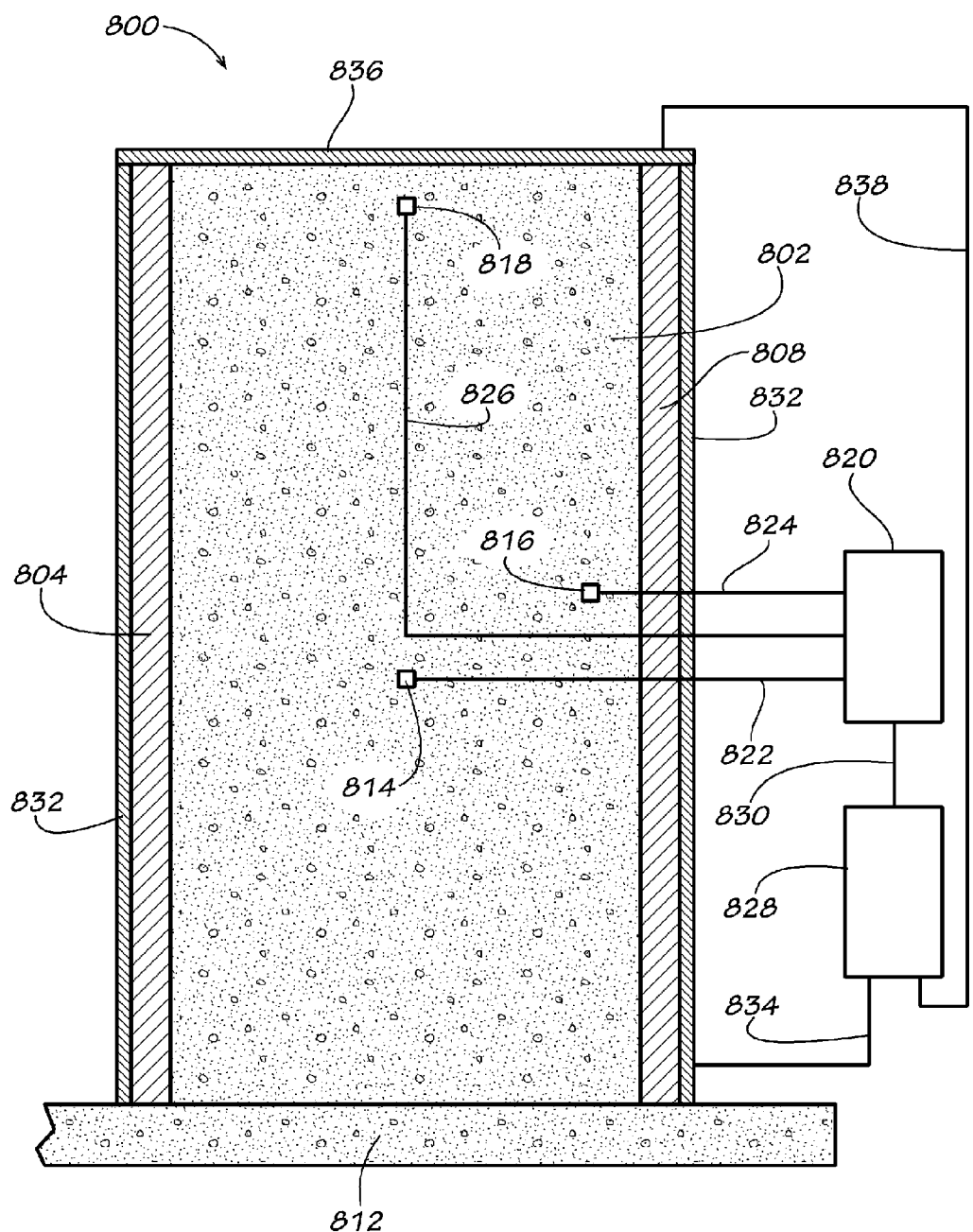
FIG. 13 is the cross-sectional view of the insulated concrete form shown in FIG. 12 taken along the line 13-13 and a schematic diagram for a temperature control system in accordance with the present invention.
Figure 14:
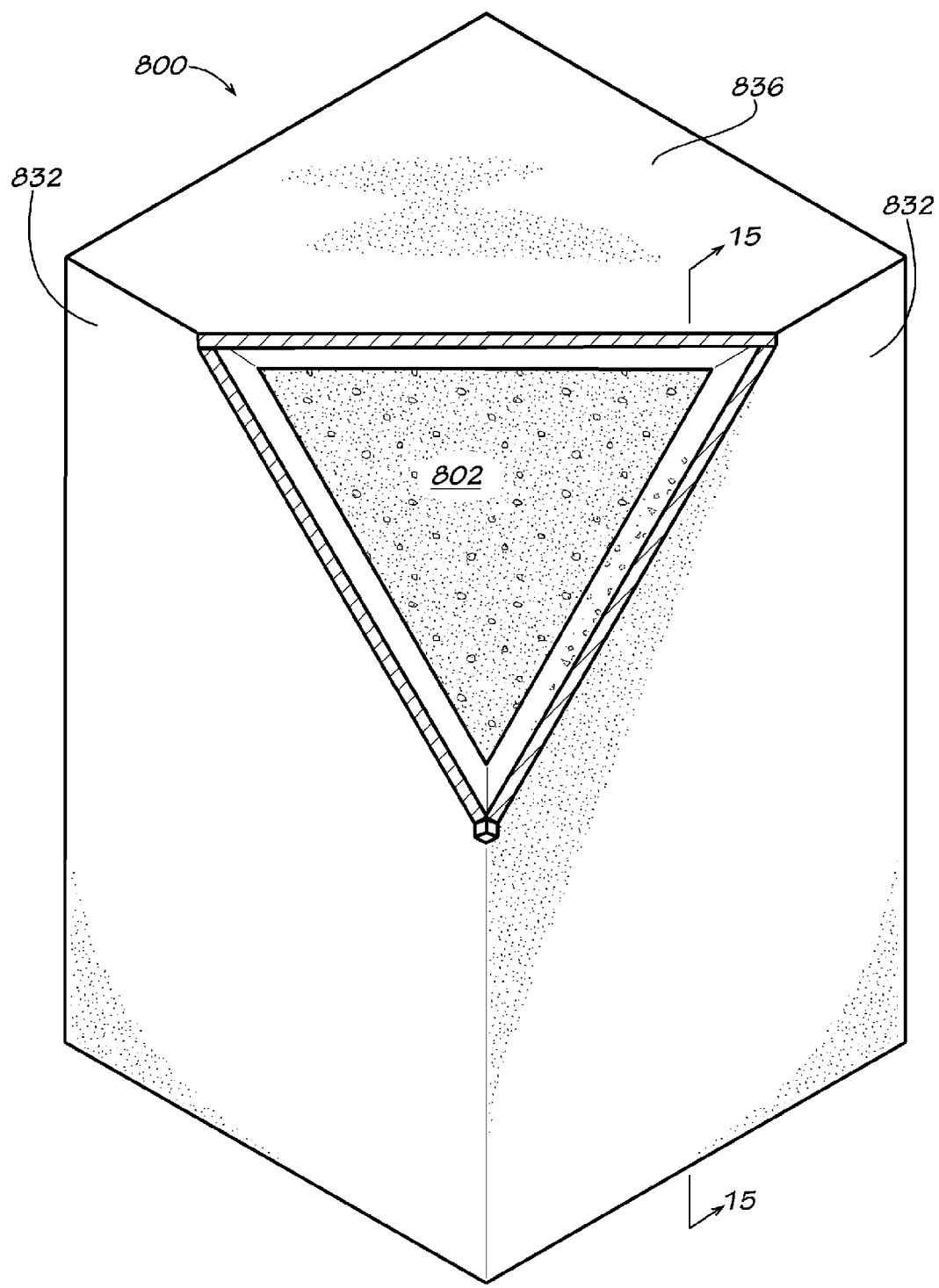
FIG. 14 is the perspective view of another disclosed embodiment of the insulated concrete form shown in FIG. 12.
Figure 15:
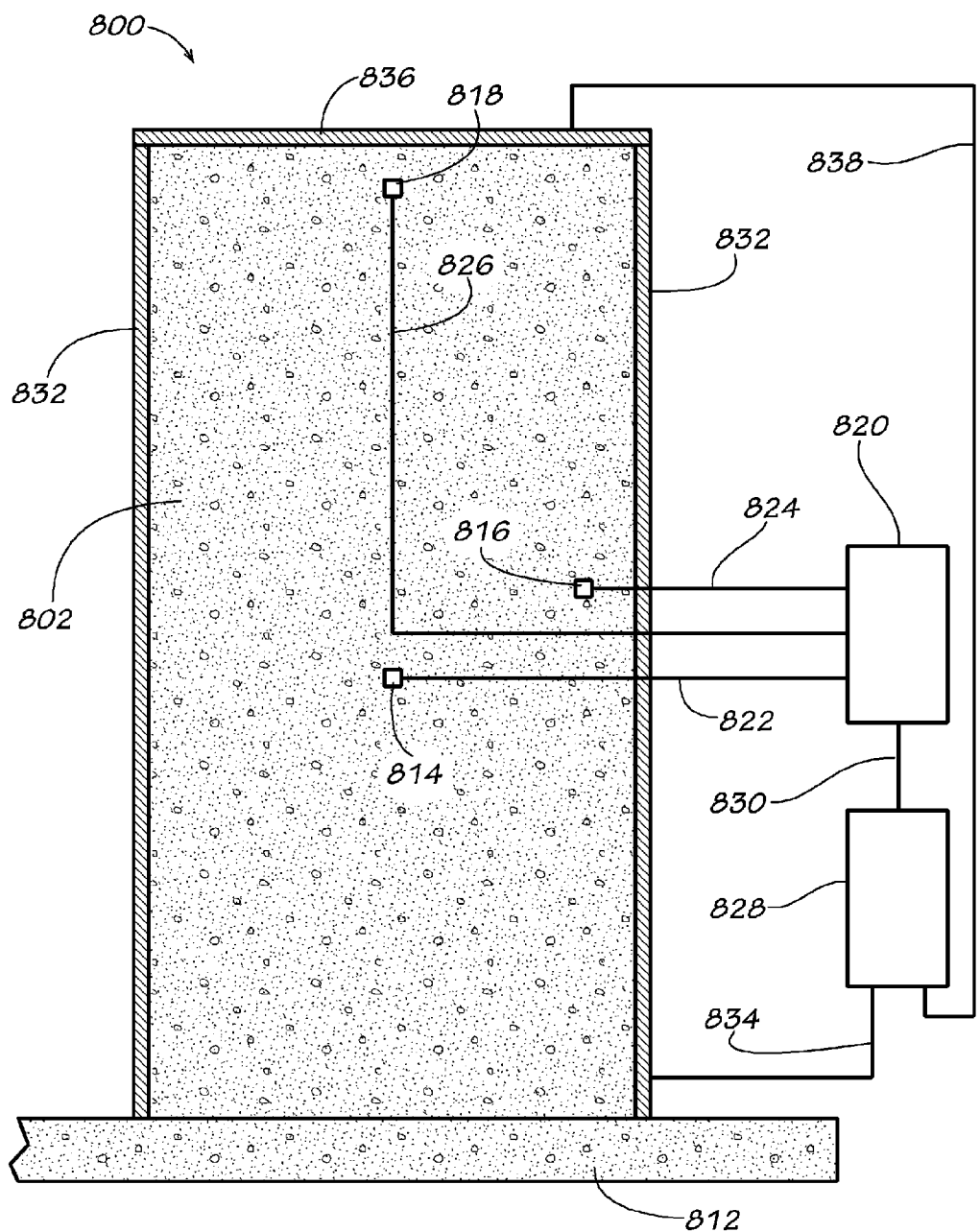
FIG. 15 is the cross-sectional view of the insulated concrete form shown in FIG. 14 taken along the line 15-15 and a schematic diagram for a temperature control system in accordance with the present invention.
Figure 16:
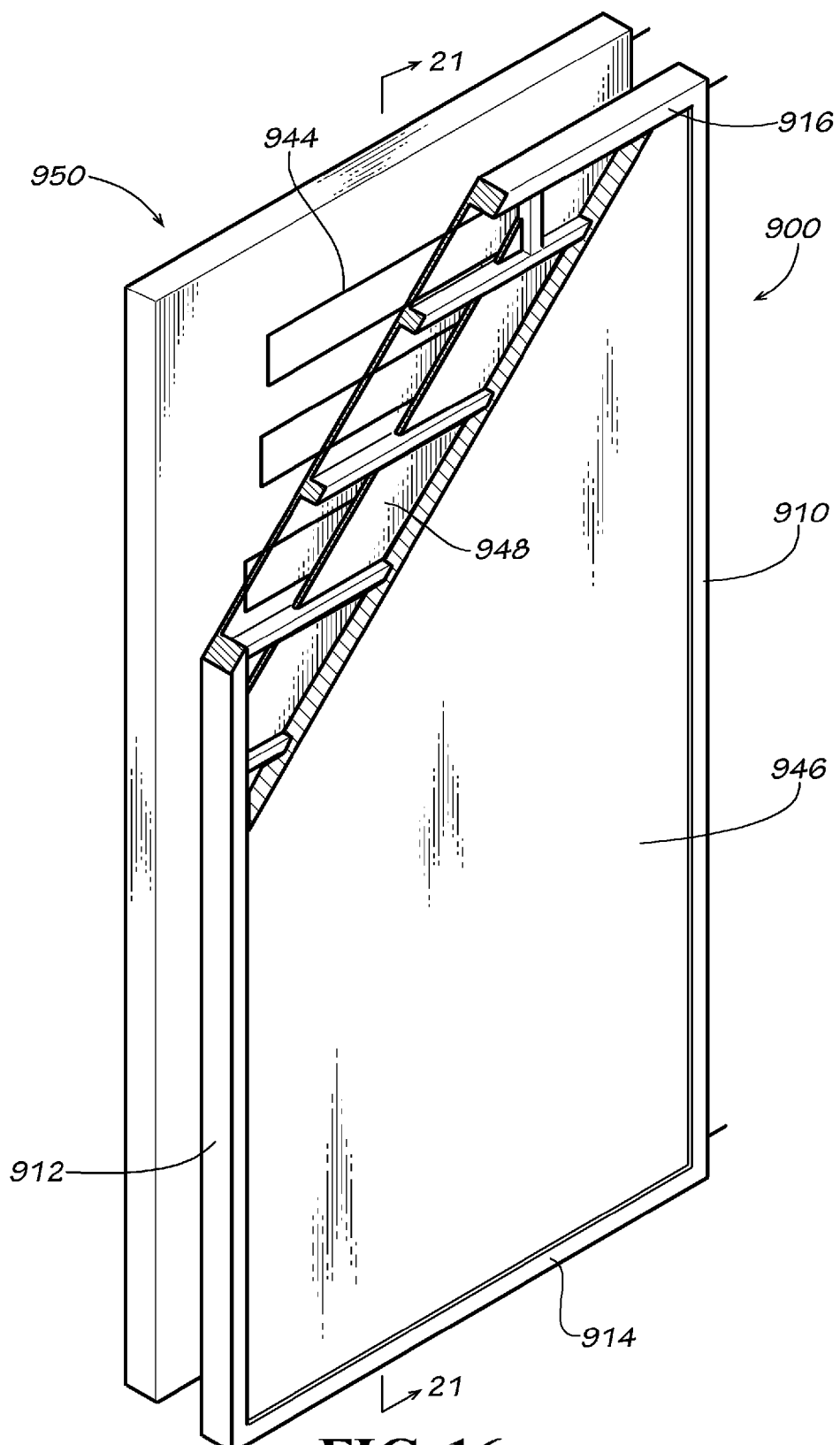
FIG. 16 is the perspective view of another disclosed embodiment of an electrically heated concrete form in accordance with the present invention.

In an alternate disclosed embodiment, the computing device 820 is programmed to operate according to the flow diagram shown in either FIG. 9 or 10 for both the configuration shown in FIGS. 12 and 13 and the configuration shown in FIGS. 14 and 15. In still another alternate disclosed embodiment, the computing device 820 is programmed to operate according to the flow diagram shown in either FIG. 9 or 10 and the flow diagram shown in FIG. 11 for both the configuration shown in FIGS. 12 and 13 and the configuration shown in FIGS. 14 and 15.

In some applications, it may be desirable to use an electrically heated concrete form instead of an electrically heated blanket. FIGS. 16-21 disclose an electrically heated concrete form 900. The electrically heated concrete form 900 comprises a rectangular concrete forming panel 902 made of a heat conducting material, such as aluminum or steel. Most prior art concrete forms use wood, plywood, wood composite materials, or wood or composite materials with polymer coatings for the concrete forming panel of their concrete forms. Although wood, plywood, wood composite materials, or wood or composite materials with polymer coatings are not very good conductors of heat, they do conduct some heat. Therefore, wood, plywood, wood composite materials, and wood or composite materials with polymer coatings are considered useful materials from which to make the panel 902, although they are not preferred. The panel 902 has a first surface 904 for contacting plastic concrete and an opposite second surface 906. The first surface 904 is usually smooth and flat. However, the first surface 904 can also be contoured so as to form a desired design in the concrete, such as a brick or stone pattern. Attached to the second surface 906 of the panel 902 is a rectangular frame 908, which is made from a rigid material, such as steel or aluminum. The frame 908 comprises two elongate longitudinal members 910, 912 and two elongate transverse members 914, 916. The longitudinal members 910, 912 and the transverse members 914, 916 are attached to each other and to the panel 902 by any suitable means, such as by welding or bolting. The frame 908 also comprises at least one, and preferably a plurality, of transverse bracing members 918, 920, 922, 924, 926, 928, 930, 932, 934. The transverse bracing members 918-934 are attached to the longitudinal members 910, 912 and to the panel 902 by any suitable means, such as by welding or bolting. The frame 908 also includes bracing members 936, 938 and 940, 942. The bracing members 936, 938 extend between the transverse member 914 and the bracing member 918. The bracing members 936, 938 are attached to the transverse member 914 and the bracing member 918 and to the panel 902 by any suitable means, such as by welding. The bracing members 940, 942 extend between the transverse member 916 and the bracing member 934. The bracing members 940, 942 are attached to the transverse member 916 and the bracing member 934 and to the panel 902 by any suitable means, such as by welding or bolting. The frame 908 helps prevent the panel 902 from flexing or deforming under the hydrostatic pressure of the plastic concrete when placed in the forms. Aluminum concrete forms of the foregoing design are available from Wall-Ties & Forms, Inc., Shawnee, Kans. and Wall Formwork of Doka, Amstetten, Austria and Lawrenceville, Ga., USA. However, the particular design of the frame 908 is not critical to the present invention. There are many different designs of frames for concrete forms and they are all applicable to the present invention.

The present invention departs from conventional prior art concrete forms, as explained below. On the second side 906 of the panel 902 is an electric resistance heating ribbon, tape or wire 944. The electric resistance heating wire 944 produces heat when an electric current is passed through the wire. Electric resistance heating ribbons, tapes or wires are known and are the same type as used in electric blankets and other electric heating devices. The wire 844 is electrically insulated so that it will not make electrical contact with the panel 902. However, the electric resistance heating wire 944 is in thermal contact with the panel 902 so that when an electric current is passed through the heating wire 944 it heats the panel. The electric resistance heating wire 944 is placed in a serpentine path on the second surface 906 of the panel 902 so that the panel is heated uniformly. Holes (note shown) are provided in the bracing members 918-942 so that the electric resistance heating wire 944 can pass there through. The electric resistance heating wire 944 is of a type and the amount of wire in contact with the panel 902 is selected so that the electric resistance heating wire will heat the panel to a temperature at least as high as the inner temperature of the mass concrete minus the desired heat differential. The heated concrete form 900 can also be used to accelerate the curing of conventional concrete, as described above. Therefore, it is desirable that the panel 902 be able to be heated to temperatures sufficient to accelerate the curing of the concrete, such as at least as high as 70° C.

Also disposed on the second side 906 of the panel 902 is a layer of insulating material 946. The layer of insulating material 946 is preferably a closed cell polymeric foam, such as expanded polystyrene, polyisocyanurate, polyurethane, and the like. The layer of insulating material 946 has insulating properties equivalent to at least 0.5 inches of expanded polystyrene foam; preferably equivalent to at least 1 inch of expanded polystyrene foam, preferably equivalent to at least 2 inches of expanded polystyrene foam, more preferably equivalent to at least 3 inches of expanded polystyrene foam, most preferably equivalent to at least 4 inches of expanded polystyrene foam. The layer of insulating material 946 can have insulating properties equivalent to approximately 0.5 inches to approximately 8 inches of expanded polystyrene foam. The layer of insulating material 946 can have insulating properties equivalent to approximately 0.5 inches, approximately 1 inch, approximately 2 inches, approximately 3 inches or approximately 4 inches of expanded polystyrene foam. The layer of insulating material 946 can have an R-value of greater than 2.5, preferably greater than 5, preferably greater than 10, more preferably greater than 15, especially greater than 20. The layer of insulating material 946 preferably has an R-value of approximately 5 to approximately 40; more preferably between approximately 10 to approximately 40; especially approximately 15 to approximately 40; more especially approximately 20 to approximately 40. The layer of insulating material 946 preferably has an R-value of approximately 5, more preferably approximately 10, especially approximately 15, most preferably approximately 20.

The layer of insulating material 946 is positioned between the bracing members 914-942 and such that the electrically heated wire 944 is positioned between the layer of insulation and the second surface 906 of the panel 902. Optionally, the side of the insulating material 946 adjacent the second surface 908 of the panel 902 includes a layer of radiant heat reflective material 948, such as metal foil, especially aluminum foil. The layer of radiant heat reflective material 948 helps direct the heat from the electrically heated wire 944 toward the panel 902. A preferred radiant heat reflective material is a metalized polymeric film, more preferably, metalized biaxially-oriented polyethylene terephthalate film, especially aluminized biaxially-oriented polyethylene terephthalate film. Alternately, the layer of heat reflective material 946 can be positioned on the side of the insulating material 946 opposite the electrically heated wire 944 or within the layer of insulating material. The layer of insulating material 946 can be preformed and affixed in place on the second surface 906 of the panel 902, or the layer of insulating material can be formed in situ, such as by spraying a foamed or self-foaming polymeric material into the cavity formed by the second surface of the panel and adjacent the frame bracing members 918-942. Another preferred material for the insulating material 946 is metalized plastic bubble pack type insulating material or metalized closed cell polymeric foam. Such material is commercially available as Space Age® reflective insulation from Insulation Solutions, Inc., East Peoria, Ill. 61611. The Space Age® product is available as two layers of polyethylene air bubble pack sandwiched between one layer of white polyethylene and one layer of reflective foil; two layers air bubble pack sandwiched between two layers of reflective foil; or a layer of closed cell polymeric foam (such as high density polyethylene foam) disposed between one layer of polyethylene film and one layer of reflective foil. All three of these Space Age® product configurations are useful in the present invention for the radiant heat reflective material 946.

A preferred construction is to apply a first layer of insulating material over the electrically heated wire 944 and second surface 906 of the panel 902 followed by a 1 mil sheet of aluminized Mylar® film, followed by another layer of foam insulating material. The aluminized Mylar® film is thus sandwiched between two layers of insulating material, such as expanded polystyrene foam, and the sandwiched insulation is then placed on top of the electrically heated wire 944 and second surface 906 of the panel 902. More preferably, the first layer of the sandwich described above covers the electrically heated wire 944 and the second surface 906 of the panel 902 between the bracing members 918-942 and the aluminized Mylar® film and second layer of insulating material covers the first layer of insulating material and the bracing members. This construction provides a layer of insulation on the bracing members 918-942 and prevents them from thermally bridging the panel 902.

Figure 21:
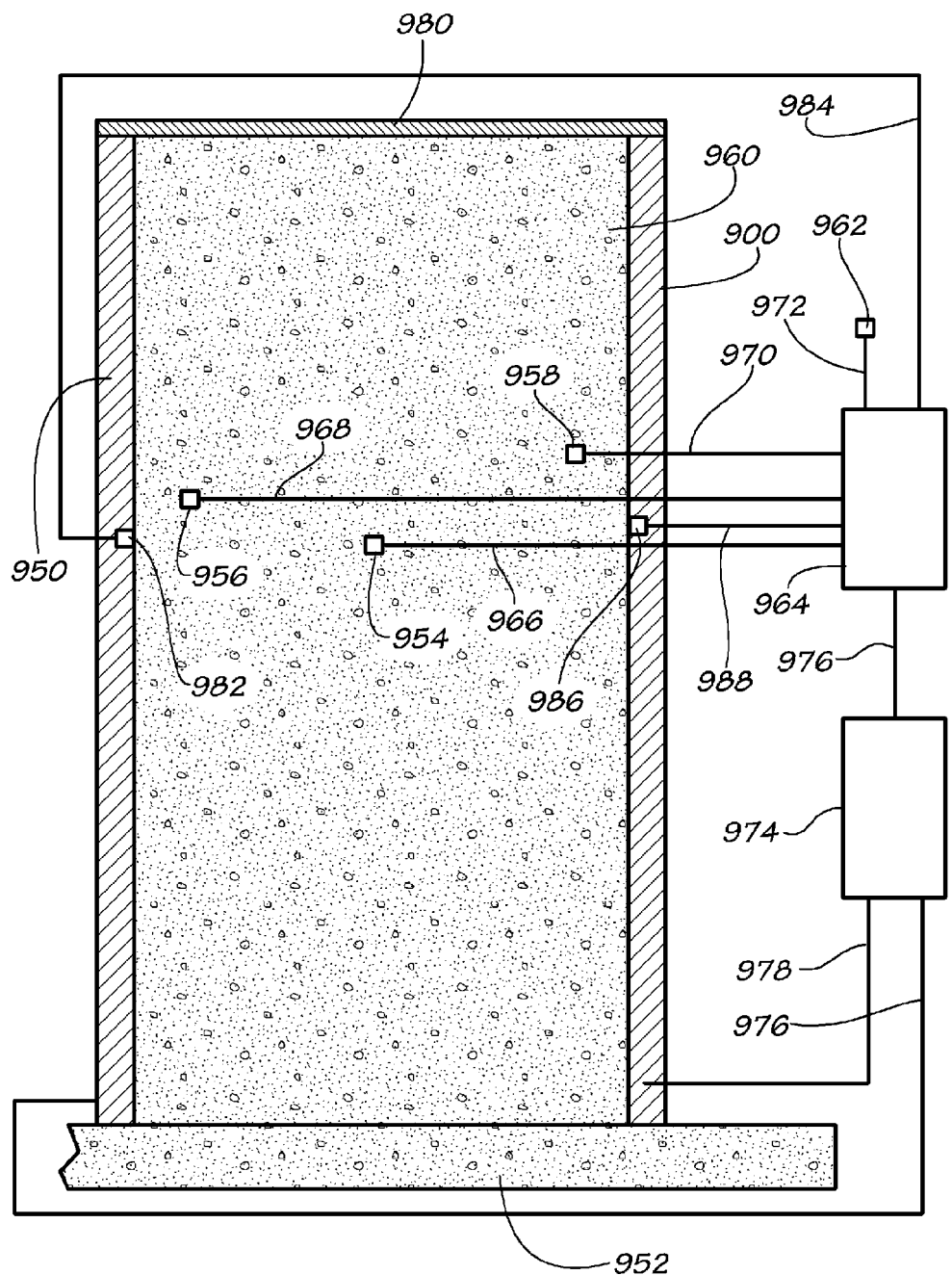
FIG. 21 is the cross-sectional view of the insulated concrete form shown in FIG. 16 taken along the line 21-21 and a schematic diagram for a temperature control system in accordance with the present invention.

Use of the heated form 900 will now be considered. As shown in FIG. 16-21, there is a first electrically heated form 900 and an identical second electrically heated form 950 spaced from the first form to provide a concrete receiving space there between. The electrically heated concrete forms 900, 950 can be used to form conventional elevated structures or mass concrete structures, such as walls, piers, columns, etc. The electrically heated concrete forms 900, 950 sit on a concrete footing or concrete slab 952 (FIG. 21).

When greater control of the temperature of the heated concrete form is desired, a first temperature sensor 954 is optionally placed in the approximate middle of the concrete receiving space defined between the two forms 900, 950. A second temperature sensor 956 is optionally placed adjacent a surface of a side of the concrete receiving space; i.e., adjacent the heated form 950. A third temperature sensor 958 is optionally placed adjacent an opposite surface of a side of the concrete receiving space; i.e., adjacent the heated form 900. Alternately, the temperature sensors 956, 958 can be placed at the interface between the electrically heated forms 900, 950 and the concrete 960 within the forms. A fourth temperature 962 sensor is optionally placed adjacent the electrically heated forms 900, 950. The first temperature sensor 954 therefore measures the temperature of an inner portion of the concrete 960, whereas the second and third temperature sensors 956, 958 measure the temperature of an outer portion of the concrete. The fourth temperature sensor 962 measures the ambient temperature of the air surrounding the electrically heated forms 900, 950. The specific sensor locations disclosed herein are only examples of operative sensor locations. Any other means, either direct or indirect, of measuring the temperature of the concrete 960 within the electrically heated forms 900, 950 and measuring the temperature of an inner portion of the concrete and an outer portion of the concrete in the forms are also considered to be useful in the present invention.

Each of the temperature sensors 954-958, 962 is connected to a computing device 964 by an electric circuit, such as by the wires 966, 968, 970, 972, respectively. The computing device 964 is connected to the temperature sensors 954-958, 962 so that it can continuously, or periodically, read and store the temperature measured by each of the temperature sensors. The computing device 964 is connected to a form temperature controller 974 by an electric circuit, such as the wires 976. The form temperature controller 974 is connected to a source of electricity, such as 12, 24, 120 or 220 volts AC or 12 or 24 volts DC electric current, by wires (not shown). The lower voltages are desirable as they eliminate the chances of electrocution by a worker touching the metal frame in a wet environment. The form temperature controller 974 is also connected to the electrically heated form 950 by an electric circuit, such as by the wires 976, which connects to the electrically heated wire 944 on the form 950. The form temperature controller 974 is also connected to the electrically heated form 900 by an electric circuit, such as by the wires 978, which connects to the electrically heated wire 944 on the form 900. The computing device 964 and the form temperature controller 974 are configured and programmed such that the computing device controls the amount of heat produced by the electrically heated wire 944 in each of the electrically heated forms 900, 950. Thus, the computing device 964 controls the amount of heat that is provided to the concrete 960 within the concrete forms 900, 950. Optionally, a layer of insulation 980 is provided on the top surface of the concrete 960.

Figure 17:
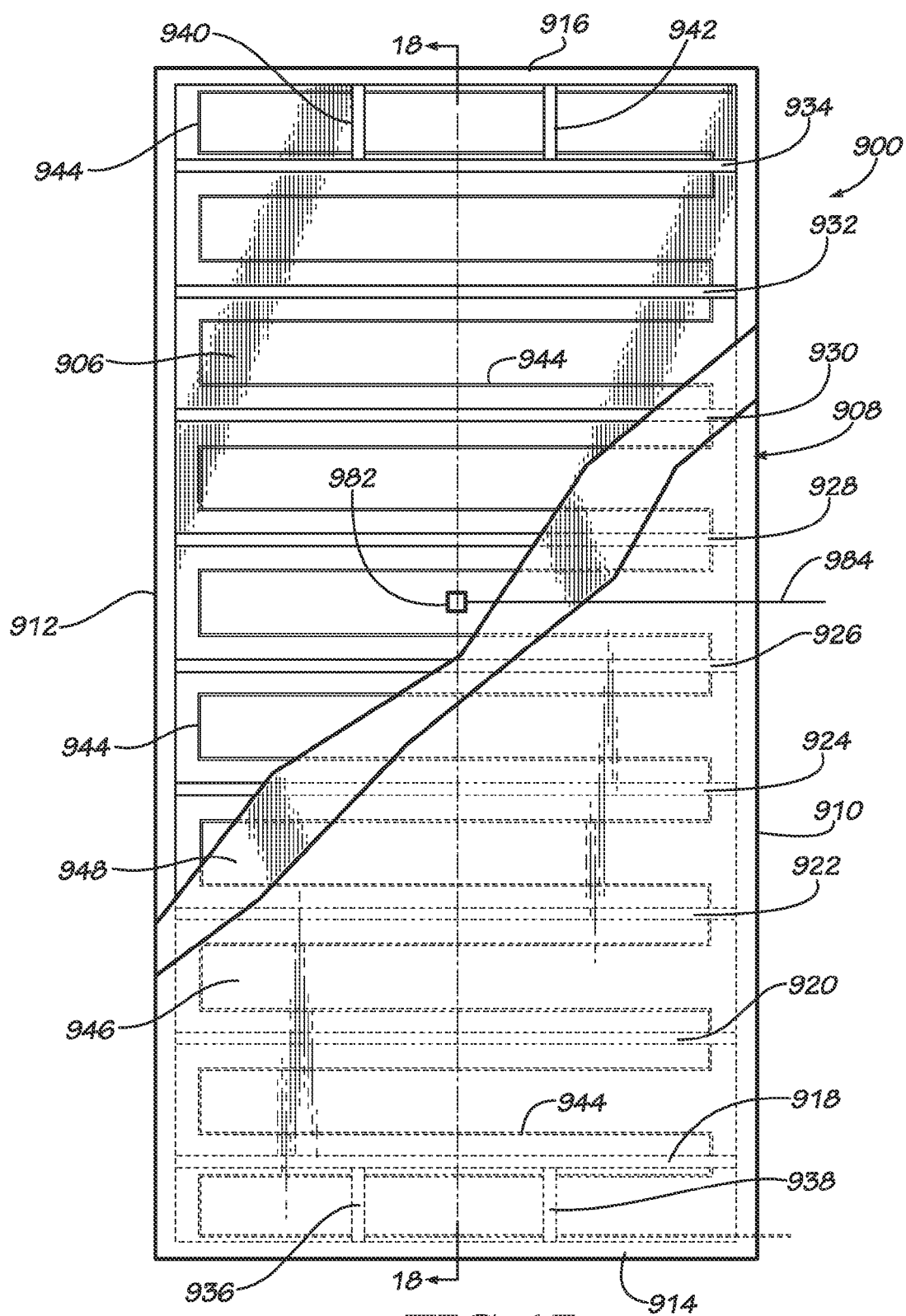
FIG. 17 is a plan view of one of the electrically heated concrete forms shown in FIG. 16.

For applications that do not involve mass concrete, the electrically heated form 950 includes a temperature sensor 982 in thermal contact with the second surface 906 of the panel 902 (FIGS. 17 and 21). The temperature sensor 982 is connected to the computing device 964 by an electric circuit, such as by the wires 984. The electrically heated form 900 includes a temperature sensor 986 in thermal contact with the second surface 906 of the panel 902 (FIG. 21). The temperature sensor 986 is connected to the computing device 964 by an electric circuit, such as by the wires 988. The temperature sensors 982, 986 allow the computing device 964 to continuously, or periodically, read and store the temperature of the panel 902 on each of the electrically heated forms 900, 950.

Figure 22:
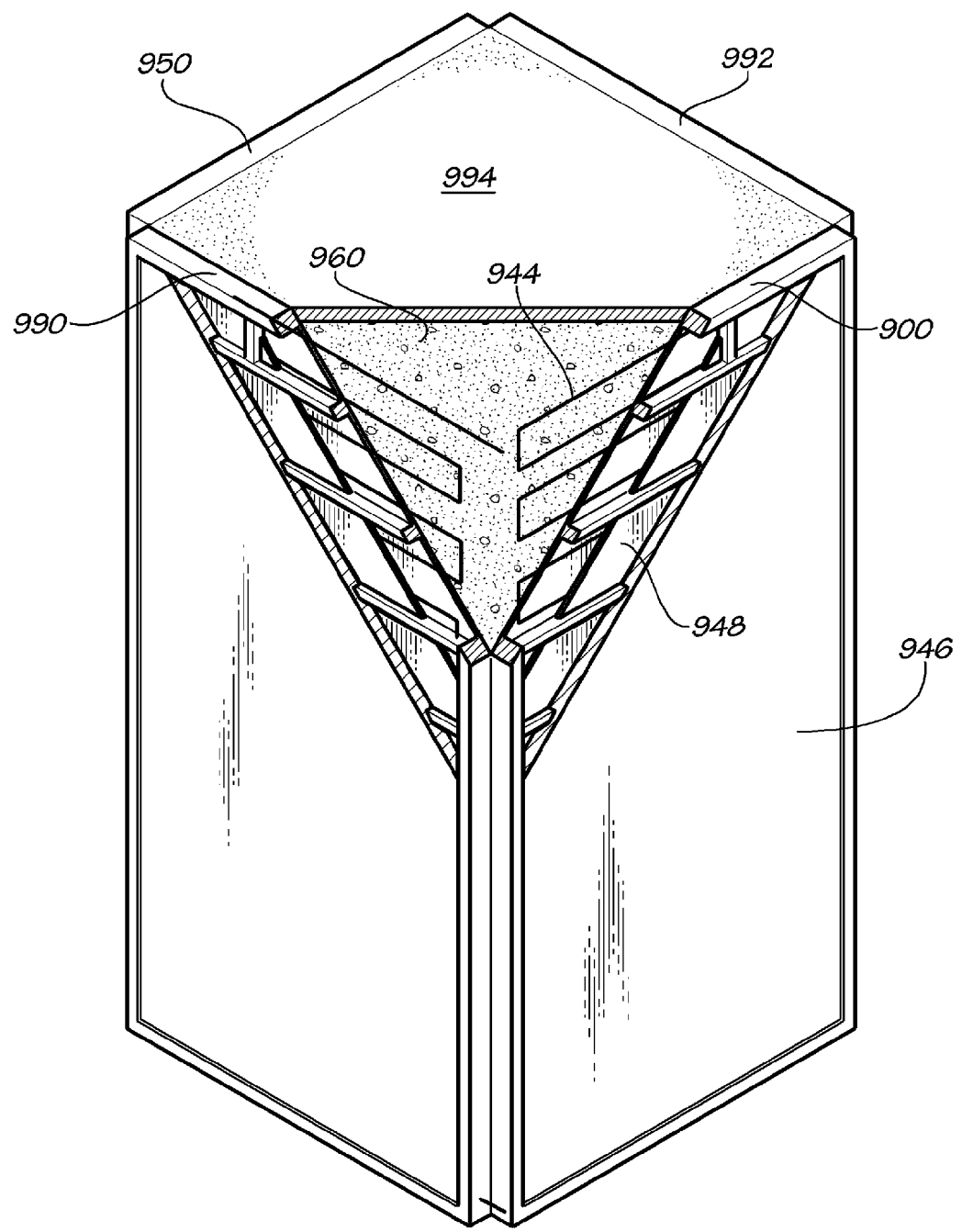
FIG. 22 is a perspective view of another disclosed embodiment of an electrically heated concrete form or mold in accordance with the present invention for use in constructing a square concrete column or object.

FIG. 22 shows the use of the electrically heated concrete form for the creation of a square column. In this embodiment, the four-sided form includes a pair of opposed electrically heated concrete forms 900, 950 and a second identical pair of opposed electrically heated concrete forms 990, 992. Concrete 994 is disposed between the four electrically heated concrete forms 900, 950, 990, 992. The concrete 994 can be mass concrete or conventional concrete depending on the size of the column.

Operation of the electrically heated forms 900, 950, 990, 992 in various modes will now be considered. In its simplest mode, the electrically heated forms 900, 950 (FIGS. 16-21) or forms 900, 950, 990, 992 (FIG. 22) are operated in an on/off mode. In this mode, a constant amount of electricity is provided to the resistance heating wire 944 of each of the electrically heated forms 900, 950 (FIGS. 16-21) or forms 900, 950, 990, 992 (FIG. 22) so that a constant amount of heat is provided to the panel 902. Thus, an operator can turn the heat on and turn the heat off. For this mode of operation, no computing device and no temperature sensors are required; a simple controller with an on/off switch will suffice.

In the next mode of operation, various fixed amounts of electricity are provided to the resistance heating wire 944, such as a low amount, a medium amount and a high amount. This can be done by providing a different voltage to the resistance heating wire 944 or by changing the amount of time that the heating wire is energized in each of the electrically heated forms 900, 950 (FIGS. 16-21) or forms 900, 950, 990, 992 (FIG. 22). Thus, an operator can select one of several predetermined amounts of heat provided to the panel 902. For this mode of operation, no computing device and no temperature sensors are required; a simple controller with a selector switch will suffice.

The next mode of operation is for the panel 902 to be held at a constant desired temperature. For this more of operation, the computing device 964 is programmed to perform the process shown in FIG. 23.

Figure 23:
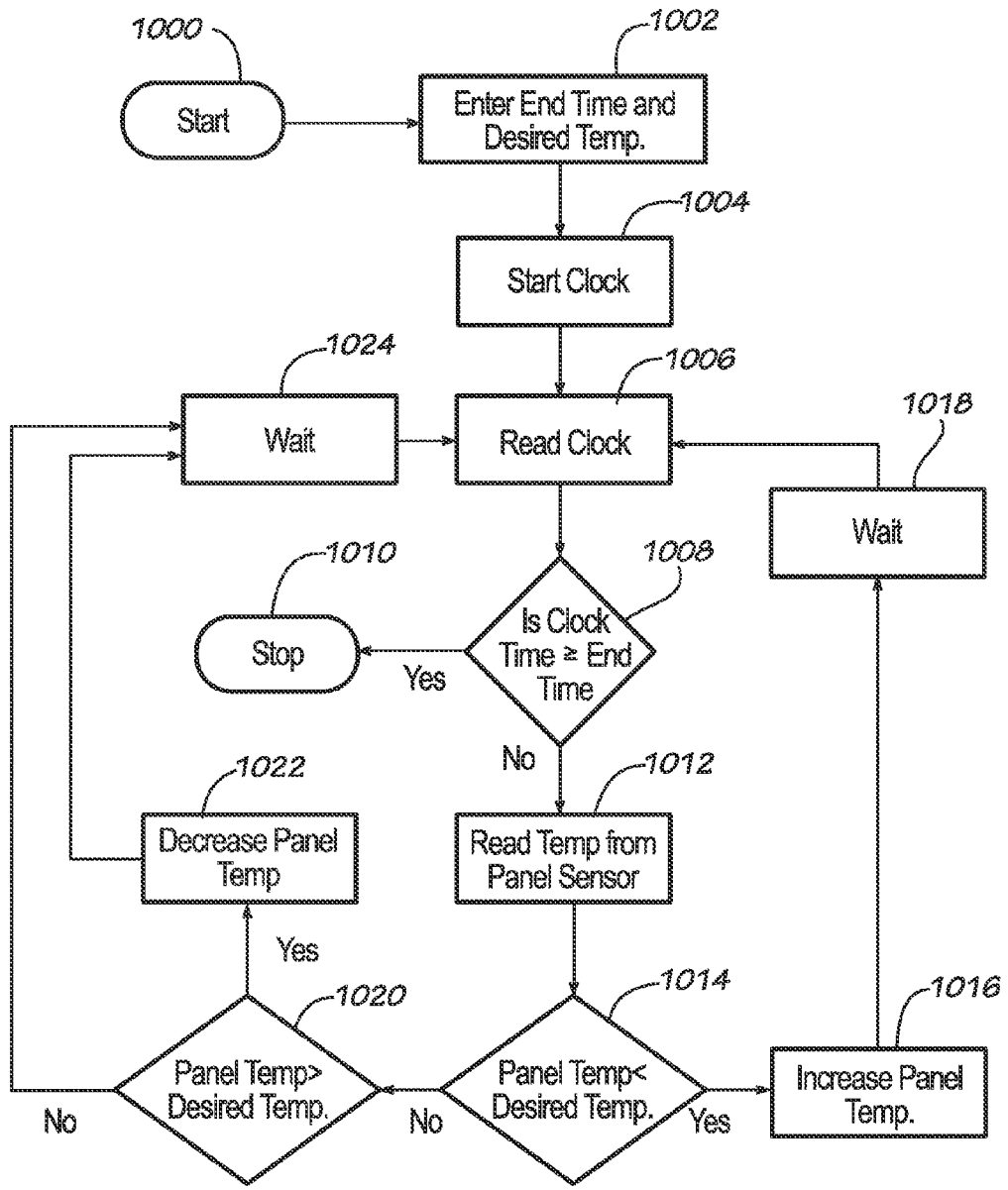
FIG. 23 is a flow diagram of a disclosed embodiment of a temperature controlled concrete curing process in accordance with the present invention.

As shown in FIG. 23, the process starts at the block 1000 and proceeds to the block 1002 where a desired end time and a desired temperature are entered. These values are stored in memory locations, such as in the RAM memory of the computing device 964. The end time is the desired amount of temperature controlled curing time for the concrete 960. The desired temperature is the temperature at which the panel 902 will be maintained even though the ambient temperature may change. Any desired temperature can be selected. However, it is preferred that the desired temperature is preferably about 55° C.; more preferably about 60° C.; most preferably about 65° C.; especially about 70° C.; most especially about 63° C. The process proceeds from the block 1002 to the block 1004 where the clock is initialized to time equal to zero and the clock is started. The clock measures the elapsed time from when the plastic concrete 960 or 994 is subjected to the controlled temperature curing process.

The process proceeds from the block 1004 to the block 1006 where the clock is read. The time that is read from the clock is then stored in a memory location, such as in the RAM memory of the computing device 964. The process proceeds from the block 1006 to the decision block 1008. A desired end time for terminating the process, such as 1 to 28 days, was entered into a memory location in the computing device 964 at the block 1002. At the block 1008, the clock time stored in the memory location is compared to the end time stored in the memory location of the computing device 964. If the clock time is less than the end time, the process proceeds to the block 1012. If the clock time is greater than or equal to the end time, the process proceeds to the block 1010 where the process is terminated.

At the block 1012, the temperature from the panel temperature sensors 982, 986 is read and stored in memory locations, such as in the RAM memory of the computing device 964. The process then proceeds from the block 1012 to the decision block 1014. At the decision block 1014 the temperature from the panel temperature sensors 982, 986 is compared to the stored desired temperature. If the measured panel temperature is less than the stored desired temperature, the process proceeds to the block 1016. When this condition is encountered, the panel temperature is less than the desired temperature, so it is necessary to provide additional heat to the panel 902 of the electrically heated forms 900, 950 (FIGS. 16-21) or forms 900, 950, 990, 992 (FIG. 22). At the block 1016 the temperature of the panel 902 is increased. This can be done by the computing device 964 sending a signal to the form temperature controller 974 providing an increased electrical voltage to the electrically heated wire 944 or by increasing the time that the wire is energized. The process then proceeds from the block 1016 to the block 1018. At the block 1018, a predetermined wait time is executed before the process proceeds from the block 1018 to the block 1006. The wait time can be any desired time that is suitable for the panel temperature being measured, such as one second or ten seconds or 30 seconds or one minute or one hour. If the actual measured panel temperature is greater than or equal to the desired temperature, the process proceeds from the decision block 1014 to the decision block 1020.

At the decision block 1020, if the actual measured panel temperature is greater than the stored desired temperature, the process proceeds to the block 1022. At the block 1022, the temperature of the panel 902 is decreased. This can be done by the computing device 964, sending a signal to the form temperature controller 970, to decrease the temperature of the electrically heated wire 944 in each of the electrically heated forms 900, 950 (FIG. 16-21) or forms 900, 950, 990, 992 (FIG. 22). This can be done by the form temperature controller 970 providing a reduced electrical voltage to the electrically heated wire 944 or by reducing the time that the wire is energized. The process then proceeds from the block 1022 to the block 1024. At the block 1024, a predetermined wait time is executed before the process proceeds from the block 1024 to the block 1006. The wait time can be any desired time that is suitable for the temperature of the panel 902 being measured, such as one second or ten seconds or 30 seconds or one minute or one hour. If the actual measured panel temperature is not greater than the stored desired temperature, the process proceeds to the block 1024. At the decision block 1020, if the actual measured panel temperature is less than or equal to the stored desired temperature, the process proceeds to the block 1024.

FIG. 9 shows the flow diagram for a disclosed embodiment of a process for controlling the heat provided to concrete by the electrically heated forms 900, 950 (FIGS. 16-21) or forms 900, 950, 990, 992 (FIG. 22) so that the temperature of the concrete can be controlled to match a desired temperature profile, such as that shown in FIG. 8. The computing device 964 is programmed so that it will perform the process shown by this flow diagram.

The process starts at the block 500 and proceeds to the block 502 where a clock is initialized to time equal to zero and the clock is started. The clock measures the elapsed time from when the plastic concrete is placed into the electrically heated concrete form or mold. This elapsed time therefore is a measure of the elapsed time for the curing of the concrete in the heated forms 900, 950 (FIGS. 16-21) or forms 900, 950, 990, 992 (FIG. 22).

The process proceeds from the block 502 to the block 504 where the clock is read. The time that is read from the clock is then stored in a memory location, such as in the RAM memory of the computing device 964. The process proceeds from the block 504 to the decision block 506. A desired end time for terminating the process, such as 1 to 28 days, is preprogrammed into a memory location, such as in the RAM memory of the computing device 964. At the block 506, the clock time stored in the memory location is compared to the end time stored in the memory location of the computing device 964. If the clock time is less than the end time, the process proceeds to the block 508. If the clock time is greater than or equal to the end time, the process proceeds to the block 510 where the process is terminated.

At the block 508, the temperature from each of the sensors, such as the sensors 954, 956, 958, 962, is read and stored in memory locations, such as in the RAM memory of the computing device 964. For example, the temperature from the sensor 954 is stored as the internal concrete temperature, the temperature from the sensor 956, 958 is stored as the surface concrete temperature and the temperature from the sensor 962 is stored as the ambient temperature. The process then proceeds from the block 508 to the block 512.

At the block 512 the temperature from the temperature profile is determined for the clock time stored in the memory location. This can be done from the temperature profile curve, such as the curve shown in FIG. 8. The clock time is found on the horizontal axis and the temperature is determined by finding the vertical axis component of the curve for the time corresponding to the clock time. When this temperature is determined, it is stored in a memory location, such as in the RAM memory of the computing device 964. In an alternate disclosed embodiment, instead of using a graph, such as shown in FIG. 8, the temperature profile can be in the form of a lookup table. The lookup table lists a range of times and a profile temperature corresponding to each of the ranges of time. The process then proceeds from the block 512 to the decision block 514.

At the decision block 514 the internal temperature of the concrete is compared to the profile temperature corresponding to the stored clock time. If the internal temperature is greater than the profile temperature, the process proceeds to the block 515. When this condition is encountered, the internal temperature of the concrete is greater than the profile temperature, so it is not necessary to provide additional heat to the concrete so that the temperature of the concrete will equal the profile temperature. If the internal temperature of the concrete is less than or equal to the profile temperature, the process proceeds to the decision block 516.

At the block 515, the temperature of the blanket is decreased. This can be done by the computing device 964 sending a signal to the form temperature controller 974 to decrease the temperature of the electrically heated concrete forms 900, 950 (FIGS. 16-21) or forms 900, 950, 990, 992 (FIG. 22). This can be done by the form temperature controller 974 providing a reduced electrical voltage to the heating wire 944 or a reduced amount of time that the heating wire is energized. The process then proceeds from the block 515 to the block 504 where a new clock time is read.

At the decision block 516, the ambient temperature is compared to the profile temperature corresponding to the stored clock time. If the ambient temperature is less than the profile temperature, the process proceeds to the decision block 518. If the ambient temperature is greater than or equal to the profile temperature, the process proceeds to the block 504. When this condition is encountered, the internal temperature of the concrete is greater than or equal to the profile temperature, so it is not necessary to provide additional heat to the concrete so that the temperature of the concrete will equal the profile temperature.

At the decision block 518, the surface temperature is compared to the profile temperature. If the surface temperature is less than the profile temperature, the process proceeds to the block 520. When this condition is encountered, both the surface temperature of the concrete and the internal temperature of the concrete are less than the profile temperature, so it is necessary to provide additional heat to the concrete so that the temperature of the concrete will equal the profile temperature. If the surface temperature is greater than or equal to the profile temperature, the process proceeds to the block 504.

At the block 520 the temperature of the electrically heated forms 900, 950 (FIGS. 16-21) or forms 900, 950, 990, 992 (FIG. 22) is increased. This can be done by the computing device 964, sending a signal to the form temperature controller 974, to increase the temperature of the electrically heated wire 944 in each of the electrically heated forms 900, 950 (FIGS. 16-21) or forms 900, 950, 990, 992 (FIG. 22). This can be done by the form temperature controller 974 providing a greater electrical voltage to the electric heated wire 944 in each of the electrically heated forms 900, 950 (FIGS. 16-21) or forms 900, 950, 990, 992 (FIG. 22) or a greater amount of time that the electrically heated wire is energized. The process then proceeds from the block 520 to the decision block 522.

At the decision block 522, the surface temperature is compared to the profile temperature. If the surface temperature is greater than the profile temperature, the process proceeds to the block 526. At the block 526, the temperature of the concrete forms 900, 950 (FIGS. 16-21) or forms 900, 950, 990, 992 (FIG. 22) is decreased. This can be done by the computing device 964 sending a signal to the form temperature controller 974 to decrease the temperature of the electrically heated concrete forms 900, 950 (FIGS. 16-21) or forms 900, 950, 990, 992 (FIG. 22). This can be done by the form temperature controller 974 providing a reduced electrical voltage to the electrically heated wire 944 in each of the electrically heated forms 900, 950 (FIGS. 16-21) or forms 900, 950, 990, 992 (FIG. 22) or a reduced amount of time that the electrically heated wire is energized. The process then proceeds from the block 526 to the block 504 where a new clock time is read. If the surface temperature is greater than or equal to the profile temperature, the process proceeds to the decision block 524.

At the decision block 524, the surface temperature is compared to the profile temperature. If the surface temperature is equal to the profile temperature, the process proceeds to the decision block 528. If the surface temperature is less than the profile temperature, the process proceeds to the block 520 where the temperature of the electrically heated forms 900, 950 (FIGS. 16-21) or forms 900, 950, 990, 992 (FIG. 22) is increased.

At the decision block 528 the internal temperature is compared to the profile temperature. If the internal temperature is greater than or equal to the profile temperature, the process proceeds to the block 504 where a new clock time is read. If the internal temperature is less than the profile temperature, the process proceeds to the block 520 where the temperature of the electrically heated forms 900, 950 (FIGS. 16-21) or forms 900, 950, 990, 992 (FIG. 22) is increased.

The foregoing process regulates the heat provided by the electrically heated wire 944 in each of the electrically heated forms 900, 950 (FIGS. 16-21) or forms 900, 950, 990, 992 (FIG. 22) so that the temperature of the concrete within the forms is equal to the profile temperature at any given elapsed concrete curing time. When the temperature of the concrete is less than the profile temperature at a given time, the electrically heated forms 900, 950 (FIGS. 16-21) or forms 900, 950, 990, 992 (FIG. 22) provide heat to the concrete until the temperature of the concrete is equal to the profile temperature. When the temperature of the concrete is greater than the profile temperature at a given time, no additional heat, or a reduced amount of heat, is provided to the concrete. Thus, the concrete temperature is continuously monitored and adjusted so that over time the concrete temperature will follow the predetermined temperature profile. Thus, over a predetermined time period the concrete temperature will be maintained at predetermined levels and the concrete temperature will be reduce to ambient temperature at a predetermined rate.

FIG. 10 shows an alternate disclosed embodiment of a flow diagram for a process for controlling the heat provided to concrete so that the temperature of the concrete can be controlled to match a desired temperature profile, such as that shown in FIG. 8, using the electrically heated forms 900, 950 (FIGS. 16-21) or forms 900, 950, 990, 992 (FIG. 22). The computing device 964 is programmed so that it will perform the process shown by this flow diagram.

The process starts at the block 600 and proceeds to the block 602 where a clock is initialized to time equal to zero and the clock is started. The clock measures the elapsed time from when the concrete is placed into the insulated concrete form or mold. This elapsed time therefore is a measure of the elapsed time for the curing of the concrete.

The process proceeds from the block 602 to the block 604 where the clock is read. The time that is read from the clock is then stored in a memory location, such as in the RAM memory of the computing device 964. The process proceeds from the block 604 to the decision block 606. A desired end time for terminating the process, such as 1 to 28 days, is preprogrammed into a memory location in the computing device 964. At the block 606, the clock time stored in the memory location is compared to the end time stored in the memory location of the computing device 964. If the clock time is less than end time, the process proceeds to the block 608. If the clock time is greater than or equal to the end time, the process proceeds to the block 610 where the process is terminated.

At the block 608, the temperature from the temperature sensor 982, 986 on second surface 906 of the plate 902 of the electrically heated forms 900, 950 (FIGS. 16-21) or forms 900, 950, 990, 992 (FIG. 22) is read and stored in a memory location, such as in the RAM memory of the computing device 964. The process then proceeds from the block 608 to the block 612.

At the block 612 the temperature from the predetermined temperature profile is determined for the clock time stored in the memory location. This can be done from the temperature profile curve, such as the curve shown in FIG. 8. The clock time is found on the horizontal axis and the temperature is determined by finding the vertical axis component of the curve for the time corresponding to the clock time. When this temperature is determined, it is stored in a memory location, such as in the RAM memory of the computing device 964. In an alternate disclosed embodiment, instead of using a graph, such as shown in FIG. 8, the temperature profile can be in the form of a lookup table. The lookup table would list a range of times and a profile temperature corresponding to the range of times. The process then proceeds from the block 612 to the decision block 614.

At the decision block 614 the temperature of the concrete, which in this case is assumed to be the temperature of the plate 902 of each of the electrically heated forms 900, 950 (FIGS. 16-21) or forms 900, 950, 990, 992 (FIG. 22) as measured by the sensors 982, 986, is compared to the profile temperature corresponding to the stored clock time. If the plate 902 temperature is greater than the profile temperature, the process proceeds to the block 618. When this condition is encountered, the temperature of the concrete is greater than the profile temperature, so it is not necessary to provide additional heat to the concrete so that the temperature of the concrete will equal the profile temperature. Therefore, at the block 618 the temperature of the plate 902 on each of the electrically heated forms 900, 950 (FIGS. 16-21) or forms 900, 950, 990, 992 (FIG. 22) is decreased. This can be done by the computing device 964 sending a signal to the form temperature controller 974 to reduce the temperature of the plate 902 of each of the electrically heated forms 900, 950 (FIGS. 16-21) or forms 900, 950, 990, 992 (FIG. 22). This is done by the form temperature controller 974 providing a reduced electrical voltage to the electrically heated wire 944 of each form 900, 950 (FIGS. 16-21) or forms 900, 950, 990, 992 (FIG. 22) or reducing the time that the electrically heated wire is energized. The process then proceeds from the block 618 to the block 620. At the block 620, a predetermined wait time is executed before the process proceeds from the block 620 to the block 604. The wait time can be any desired time that is suitable for the concrete temperature being measured, such as one second or ten seconds or 30 seconds or one minute or one hour. If the plate 902 temperature is less than or equal to the profile temperature, the process proceeds to the decision block 616.

At the decision block 616, the plate 902 temperature is compared to the profile temperature corresponding to the stored clock time. If the plate 902 temperature is equal to the profile temperature, the process proceeds from the block 616 to the block 620. If the plate 902 temperature is not equal to the profile temperature, the process proceeds to the decision block 622.

At the decision block 622, the plate 902 temperature is compared to the profile temperature. If the plate 902 temperature is greater than or equal to the profile temperature, the process proceeds to the block 620. If the plate 902 temperature is less than or the profile temperature, the process proceeds to the block 624.

At the block 624 the temperature of the plate 902 of each of the electrically heated forms 900, 950 (FIGS. 16-21) or forms 900, 950, 990, 992 (FIG. 22) is increased. This can be done by the computing device 964 sending a signal to the form temperature controller 974 to increase the temperature of the plate 902 of each of the electrically heated forms 900, 950 (FIGS. 16-21) or forms 900, 950, 990, 992 (FIG. 22). This can be done by the form temperature controller 974 providing a greater electrical voltage to the electrically heated wire 944 of each of the electrically heated forms 900, 950 (FIGS. 16-21) or forms 900, 950, 990, 992 (FIG. 22) or increasing the time that the electrically heated wire is energized. The process then proceeds from the block 624 to the block 626.

At the decision block 626, a predetermined wait time is executed before the process proceeds from the block 626 to the block 604. The wait time can be any desired time that is suitable for the concrete temperature being measured, such as one second or ten seconds or 30 seconds or one minute or one hour. The process then proceeds from the block 626 to the block 604 where a new clock time is read.

The foregoing process regulates the heat provided by the electrically heated forms 900, 950 (FIGS. 16-21) or forms 900, 950, 990, 992 (FIG. 22) so that the temperature of the concrete is equal to the profile temperature at any given time. When the temperature of the concrete is less than the profile temperature at a given time, the electrically heated forms 900, 950 (FIGS. 16-21) or forms 900, 950, 990, 992 (FIG. 22) provide heat to the concrete until the temperature of the concrete is equal to the profile temperature. When the temperature of the concrete is greater than the profile temperature at a given time, no additional heat, or a reduced amount of heat, is provided to the concrete. Thus, the concrete temperature is continuously monitored and adjusted so that over time the concrete temperature will follow the predetermined temperature profile. Thus, over a predetermined time period the concrete temperature will be maintained at predetermined levels that reduce to ambient temperature at a predetermined rate.

The electrically heated forms 900, 950 (FIGS. 16-21) or forms 900, 950, 990, 992 (FIG. 22) can also be used with mass concrete. In order to be operated in this mode, the computing device is programmed to perform the process shown in FIG. 11.

The process starts at the block 700 and proceeds to the block 702 where a desired end time, a desired temperature differential and a desired temperature variance are entered. These values are stored in memory locations, such as in the RAM memory of the computing device 964. The end time is the desired amount of temperature controlled curing time for the plastic concrete 960 or 994. The temperature differential is the desired difference in temperature of an inner portion of the concrete, as determined by the temperature sensor 954, and an outer portion of the concrete, as determined by the temperature sensors 956, 958 or by the temperature sensors 982, 986. This temperature differential will vary depending upon the thickness of the concrete and the particular concrete mix that is used. However, it is preferred that the temperature differential is less than 20° C.; more preferably less than 15° C.; most preferably less than 10° C.; especially less than 5° C. The temperature variance is the amount that the temperature differential can vary from the desired temperature differential. The process then proceeds from the block 802 to the block 804 where the clock is initialized to time equal to zero and the clock is started. The clock measures the elapsed time from when the concrete is placed into the electrically heated concrete forms 900, 950 (FIGS. 16-21) or forms 900, 950, 990, 992 (FIG. 22). This elapsed time therefore is a measure of the elapsed time for the curing of the concrete 960 or 994.

The process proceeds from the block 704 to the block 706 where the clock is read. The time that is read from the clock is then stored in a memory location, such as in the RAM memory of the computing device 964. The process proceeds from the block 706 to the decision block 708. A desired end time for terminating the process, such as 1 to 28 days, was entered into a memory location in the computing device 964 at the block 702. At the block 708, the clock time stored in the memory location is compared to the end time stored in the memory location of the computing device 964. If the clock time is less than the end time, the process proceeds to the block 712. If the clock time is greater than or equal to the end time, the process proceeds to the block 710 where the process is terminated.

At the block 712, the temperature measured by the internal concrete temperature sensor 954 is read and stored in a memory location, such as in the RAM memory of the computing device 964. The process then proceeds from the block 712 to the block 714. At the block 714 the temperature measured by the outer concrete temperature sensors 956, 958 or the temperature sensors 982, 986 is read and stored in a memory location, such as in the RAM memory of the computing device 964. The process then proceeds from the block 714 to the block 716.

At the block 716, the actual temperature differential is calculated. This is done by subtracting the temperature measured by the outer concrete temperature sensors 956, 958 or the temperature sensors 982, 986 from the temperature of the internal temperature sensor 954. This actually measured temperature differential is then stored in a memory location, such as in the RAM memory of the computing device 964. The process then proceeds from the block 716 to the decision block 718.

At the decision block 718 the actual measured temperature differential is compared to the stored desired temperature differential. If the actual measured temperature differential is less than or equal to the stored desired temperature differential, the process proceeds to the block 720. When this condition is encountered, the actual temperature differential of the concrete is less than or equal to the desired temperature differential, so it is not necessary to provide additional heat to the outer portion of the concrete to thereby reduce the actual temperature differential. The process then proceeds from the decision block 718 to the decision block 720. At the decision block 720, the actual measured temperature differential is compared to the stored desired temperature differential minus the desired temperature variance. If the actual measured temperature differential is less than the stored desired temperature differential minus the desired temperature variance, the process proceeds to the block 722. At the block 722 the temperature of the electrically heated forms 900, 950 (FIGS. 16-21) or forms 900, 950, 990, 992 (FIG. 22) is decreased. This can be done by the computing device 964 sending a signal to the form temperature controller 974 to reduce the temperature of the electrically heated forms 900, 950 (FIGS. 16-21) or forms 900, 950, 990, 992 (FIG. 22). This can be done by the form temperature controller 974 providing a reduced electrical voltage to the electrically heated wire 944 for each of the electrically heated forms 900, 950 (FIGS. 16-21) or forms 900, 950, 990, 992 (FIG. 22) or by energizing the electrically heated wire for a reduced period of time. The process then proceeds from the block 722 to the block 724. At the block 724, a predetermined wait time is executed before the process proceeds from the block 724 to the block 706 where a new clock time is read. The wait time can be any desired time that is suitable for the concrete temperature being measured, such as one second, ten seconds, 30 seconds, one minute, one hour and the like. If the actual measured temperature differential is greater than or equal to the stored desired temperature differential minus the desired temperature variance, the process proceeds from the decision block 720 to the block 724.

At the decision block 718, if the actual measured temperature differential is greater than the stored desired temperature differential, the process proceeds to the block 726. At the block 726, the temperature of the electrically heated form 900, 950 (FIG. 21) or forms 900, 950, 990, 992 (FIG. 22) is increased. This can be done by the computing device 964 sending a signal to the form temperature controller 974 to increase the temperature of the electrically heated form 900, 950 (FIG. 21) or forms 900, 950, 990, 992 (FIG. 22). This can be done by the form temperature controller 974 providing a greater electrical voltage to the electrically heated wire 944 for each of the electrically heated forms 900, 950 (FIGS. 16-21) or forms 900, 950, 990, 992 (FIG. 22) or by energizing the electrically heated wire for a longer period of time. The process then proceeds from the block 726 to the block 728. At the block 728, a predetermined wait time is executed before the process proceeds from the block 728 to the block 706 where a new clock time is read. The wait time can be any desired time that is suitable for the concrete temperature being measured, such as one second, ten seconds, 30 seconds, one minute, one hour and the like.

The foregoing process regulates the heat provided by the electrically heated forms 900, 950 (FIGS. 16-21) or forms 900, 950, 990, 992 (FIG. 22) so that the difference between the temperature of the inner portion of the concrete and the temperature of the outer portion of the concrete does not exceed a desired temperature differential. When the temperature differential of the concrete is greater than a desired amount, the electrically heated forms 900, 950 (FIGS. 16-21) or forms 900, 950, 990, 992 (FIG. 22) provide heat to the outer portion of the concrete so as to reduce the temperature differential. When the temperature differential of the concrete is less than a desired amount minus a desired variance, the electrically heated forms 900, 950 (FIGS. 16-21) or forms 900, 950, 990, 992 (FIG. 22) provide less heat to the outer portion of the concrete so as to increase the temperature differential.

Although the present invention is illustrated showing a single pair of electrically heated concrete forms 900, 950 (FIGS. 16-21) or four electrically heated forms 900, 950, 990, 992 (FIG. 22), in actual use multiple concrete forms are typically connected together. For some applications, there may be as many as 100 or more concrete forms used to construct a desired structure. As with prior art concrete forms, the electrically heated concrete forms of the present invention are attached side-by-side to provide a concrete form of a desired length and shape for a particular project. If each form had to be wired to a central computer, it would create a dangerous maze of wires that could pose a serious trip hazard and the wires could easily come undone or damaged. The present invention solves this problem by wiring each form to each adjacent form, attaching an addressable controller to each form and networking all of the forms so that each form can be monitored and controlled individually by a central computing device, especially wirelessly.

Figure 24:
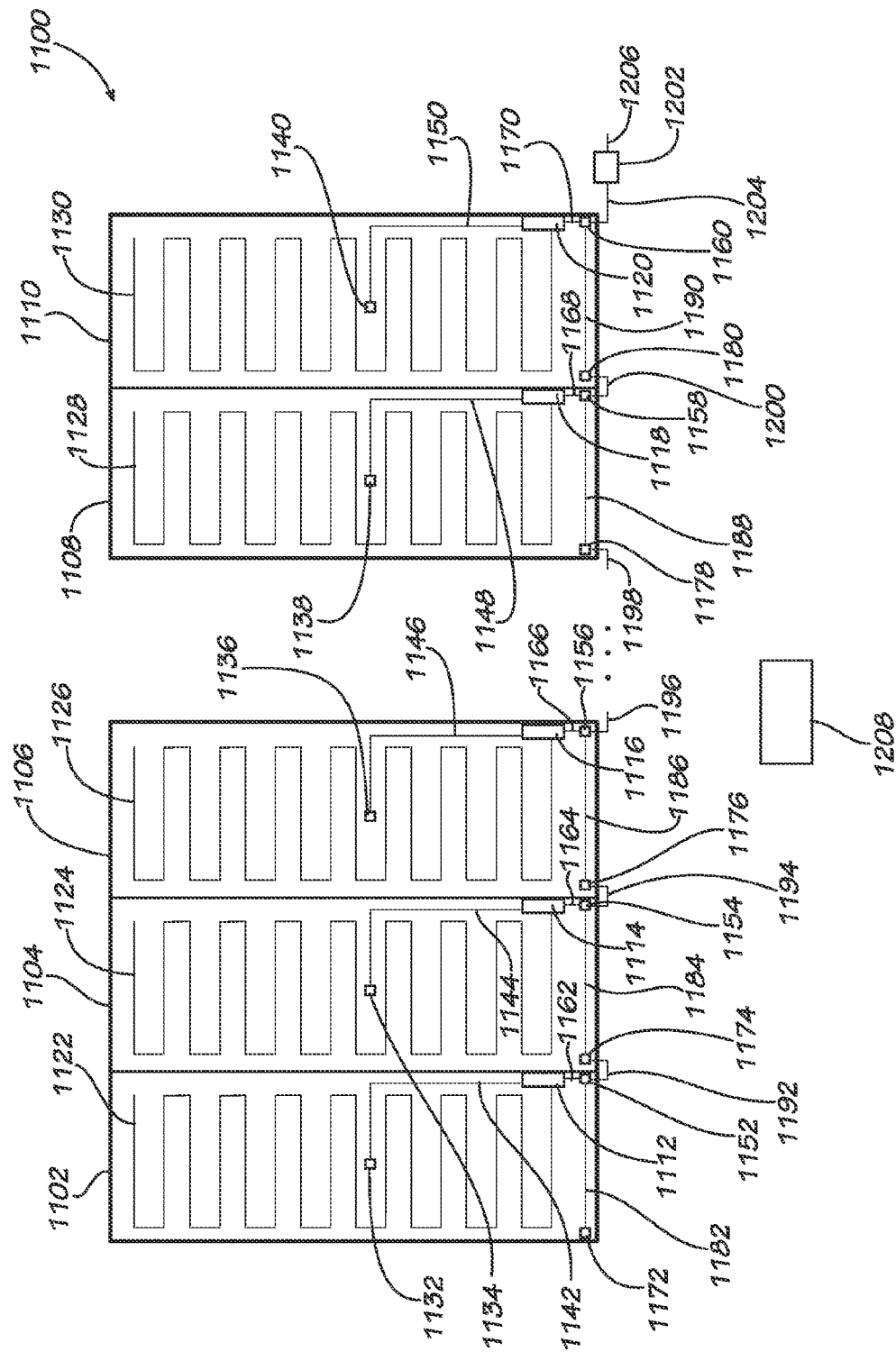
FIG. 24 is a schematic diagram of a disclosed embodiment of a temperature control system for use with a plurality of electrically heated concrete forms in accordance with the present invention.

As shown in FIG. 24, there is shown a series of adjacent electrically heated concrete forms 1100, as described above. The number of forms is equal to N. The first form is 1102, a second form 1104, a third form 1106, the N minus 1 form 1108 and an Nth form 1110. Each of the forms 1102-1110 is identical to the adjacent form and is identical to the electrically heated concrete forms 900, 950 (FIG. 16), except as further described below. Each of the forms 1102-1110 includes a digital controller 1112-1120, respectively. Each of the digital controllers 1112-1120 includes circuitry for providing an individually addressable node on a local area network. Each of the forms 1102-1110 includes an electrically heated resistance wire 1122-1130, respectively. Each of the forms 1102-1110 includes a temperature sensor 1132-1140, respectively, in thermal contact with the second side 906 of the concrete forming panel 902. Each of the temperature sensors 1132-1140 is connected to its corresponding digital controller 1112-1120 by an electric circuit, such as by the wires 1142-1150, respectively. Each digital controller 1112-1120 is connected to an electrical socket 1152-1160 by an electric circuit, such as by the wires 1162-1170, respectively, disposed on one side of the form. Each of the electric sockets 1152-1160 is designed to receive a multi-pronged plug (not shown). Each of the electric sockets 1152-1160 is connected to a corresponding identical electric socket 1172-1180, respectively, disposed on the opposite side of the form by an electric circuit, such as by the wires 1182-1190, respectively. The socket 1152 in the lower right corner of the form 1102 is connected to the socket 1174 in the lower left corner of the adjacent panel 1104 by an electric circuit, such as by the wires 1192 which includes a multi-prong plug (not shown) on each end thereof designed to fit into the sockets. Similarly, the socket 1154 in the lower right corner of the form 1104 is connected to the socket 1176 in the lower left corner of the adjacent panel 1106 by an electric circuit, such as by the wires 1194 which includes a multi-prong plug (not shown) on each end thereof designed to fit into the sockets. The socket 1156 in the lower right corner of the form 1106 is connected to a socket (not shown) in the lower left corner of the adjacent panel (not shown) by an electric circuit, such as by the wires 1196 which includes a multi-prong plug (not shown) on each end thereof designed to fit into the sockets. A socket (not shown) in the lower right corner of a form (not shown) is connected to the socket 1178 in the lower left corner of the adjacent panel 1108 by an electric circuit, such as by the wires 1198 which includes a multi-prong plug (not shown) on each end thereof designed to fit into the sockets. The socket 1158 in the lower right corner of the form 1108 is connected to the socket 1180 in the lower left corner of the adjacent panel 1110 by an electric circuit, such as by the wires 1200 which includes a multi-prong plug (not shown) on each end thereof designed to fit into the sockets. The socket 1160 in the lower right corner of the form 1110 is connected to a wireless router/switch, such as a wireless Wi-Fi router/switch 1202, by an electric circuit, such as by the wires 1204. The Wi-Fi router/switch 1202 is connected to a source of electricity (not shown) by an electric circuit, such as by the wires 1206.

The wires 1182, 1192, 1184, 1194, 1186, 1196, 1198, 1188, 1200, 1190, 1204 and the wires 1162-1170 are multi-wire cables that include at least two wires to supply electricity to the electrically heated resistance wires 1122-1130 via the digital controllers 1112-1120 and at least two wires that carry signals from the Wi-Fi router/switch 1202 to the digital controllers. Thus, the wires 1182, 1192, 1184, 1194, 1186, 1196, 1198, 1188, 1200, 1190, 1204 and the wires 1162-1170 provide two functions: they provide electricity to operate the digital controllers 1112-1120, which in turn provides a controlled amount of electricity to the electrically heated wires 1122-1130; and they provide a wired local area network on which each of the digital controllers 1112-1120 appears as a separate node that is separately addressable. Appropriate network termination (not shown) is provided in the last socket of the series of forms 1102-1110, such as the socket 1172.

A computing device 1208, including Wi-Fi communication capability, can communicate with the Wi-Fi router/switch 1202 and send and receive signals over the local area network to and from each of the digital controllers 1112-1120. Thus, each of the temperature sensors 1132-1140 provides data to its corresponding digital controller 1112-1120, respectively, which periodically sends a packet of data over the local area network and Wi-Fi router/switch 1202 to the computing device 1208. Those data packets include information corresponding to the temperature of the panel 902 as measured by one of the temperature sensor 1132-1140, which is in thermal contact therewith and information corresponding to the identification of the corresponding concrete form 1102-1110. Thus, the computing device 1208 can separately monitor, read and store the temperature of each of the panels 902 of each of the concrete forms 1102-1110. The computing device 1208 can also wirelessly send signals to the Wi-Fi router/switch 1202 and over the local area network to each of the digital controllers 1112-1120 separately. The signal sent by the computing device 1208 to the digital controllers 1112-1120 tells each of the digital controllers to increase, decrease or make no change to the heat produced by the electrically heated resistance wires 1122-1130. The computing device 1208 is programmed to execute any of the process shown in any of FIG. 9, 10, 11, or 23 so as to maintain the panel 902 of each of the forms 1102-1110 at desired temperatures at any given time or to adjust the temperature of the panel 902 of each of the forms 1102-1110 to a temperature corresponding to a desired temperature profile over a desired period of time, as described above.

Although the local area network described above is shown as a wired network, it should be understood that the present invention specifically contemplates that the local area network can also be a local area wireless network. If such a wireless network is desired, each of the forms 1102-1110 can be equipped with a wireless communication device, such as a Wi-Fi device, for communication with the computing device 1208. However, since each of the forms 1102-1110 must be wired for electricity, a wired local area network is the most practical and cost effective alternative.

The temperature control feature of the foregoing embodiment, such as shown in FIG. 21, can reside on either each of the digital controllers 1112-1120 or on the computing device 1208. If the temperature control feature resides on the digital controllers 1112-1120, the computing device 1208 only has to send information to the digital controllers as to what temperature to maintain. However, in order to keep the cost of the forms 1102-1110 as low as possible, it is preferred that the temperature control feature resides on the computing device 1208.

The local area network, as disclosed herein, can also be used with the electrically heated blankets of the present invention, such as the electrically heated blankets 200, 322, 832, 836. Such a system can be used where a large area of concrete needs to be heated with multiple electrically heated blankets. In such case, the electrically heated blankets are substituted for the electrically heated concrete forms, as shown in FIG. 24.

The electrically heated forms 900, 950 and 1102-1110 are particularly well suited for use as a slip form. Slip forms are typically used for high-rise building or high-rise tower structure construction. For such applications a combination of the electrically heated forms 900, 950 and 1102-1110 and the electrically heated blankets 200, 322, 832, 836 is contemplated. In such applications, concrete is initially poured into the electrically heated forms, such as the forms 900, 950 and 1102-1110. As the electrically heated forms climb up the structure, they expose formed partially cured concrete below. This newly exposed concrete is then wrapped in the electrically heated blankets, such as the electrically heated blankets 200, 322, 832, 836. As more concrete is exposed, the electrically heated blankets are moved up and replaced by a concrete insulating blanket having insulating properties as disclosed herein. Thus, in a vertical structure there are three phases of concrete curing. In the upper stage, the concrete is formed and heated with the electrically heated concrete form of the present invention, such as the forms 900, 950 and 1102-1110. In the second phase, which is below the first phase, the formed concrete is heated and insulated with the electrically heated concrete blankets, such as the electrically heated blankets 200, 322, 832, 836. In the third phase, which is below the second phase, the formed concrete is insulated by a concrete blanket having insulating properties as disclosed herein.

The electrically heated forms 900, 950 and 1102-1110 can be used as insulated concrete forms to practice the method disclosed in U.S. Pat. Nos. 8,545,749 and 8,877,329 (the disclosures of which are both incorporated herein by reference in their entirety). To practice this method the electrically heated wire 944 can be omitted from the concrete form 900. Or, the electrically heated wire 944 can be heated or not, depending on the circumstances and the desired results. When used as a passive insulated concrete form; i.e., no additional heat is provided to the concrete by the concrete form, the forms 900, 950 function in the same manner as the insulated concrete forms disclosed in U.S. Pat. Nos. 8,756, 890 and 8,545,749 (the disclosures of which are all incorporated herein by reference in their entirety). Specifically, the electrically heated forms 900, 950 can be used as an insulated concrete form without the electrically heated wire 944 or without the electrically heated wire being energized; i.e., the form 900 includes the insulating material, as described herein, but does not produce heat, with the concrete formulations disclosed herein below that include reduced amounts of portland cement.

Although the electrically heated forms 900, 950 have been disclosed herein as a concrete form for forming vertical objects, such as walls or columns, it is specifically contemplated that the electrically heated form of the present invention can be used for horizontal applications as well, such as elevated slabs and slabs on grade. Furthermore, although the electrically heated forms 900, 950 have been shown in use for forming two or more sides of an object, such as a wall or a column, it is specifically contemplated that an electrically heated form in accordance with the present invention can be used to form only one side of a concrete object. In such a case, insulating material can be used to cover the other side(s) of the concrete object. For example, the electrically heated concrete form 900 can be used to form precast panels on concrete forming tables. In such case, the electrically heated concrete form 900 can be used to form the bottom surface of the panels and insulating material can be used on the top and side surfaces. For example, the electrically heated concrete form can be used in the embodiment shown in FIGS. 1-7. In such case the electrically heated form 900 can be substituted for the foam insulating panels 14-22 (FIGS. 1-5) or for the foam insulating panel 310 (FIGS. 6-7). For slab on grade applications, such as for roads, highways or airport runway construction, the electrically heated form 900 can be used on the top surface of the concrete.

Figure 25:
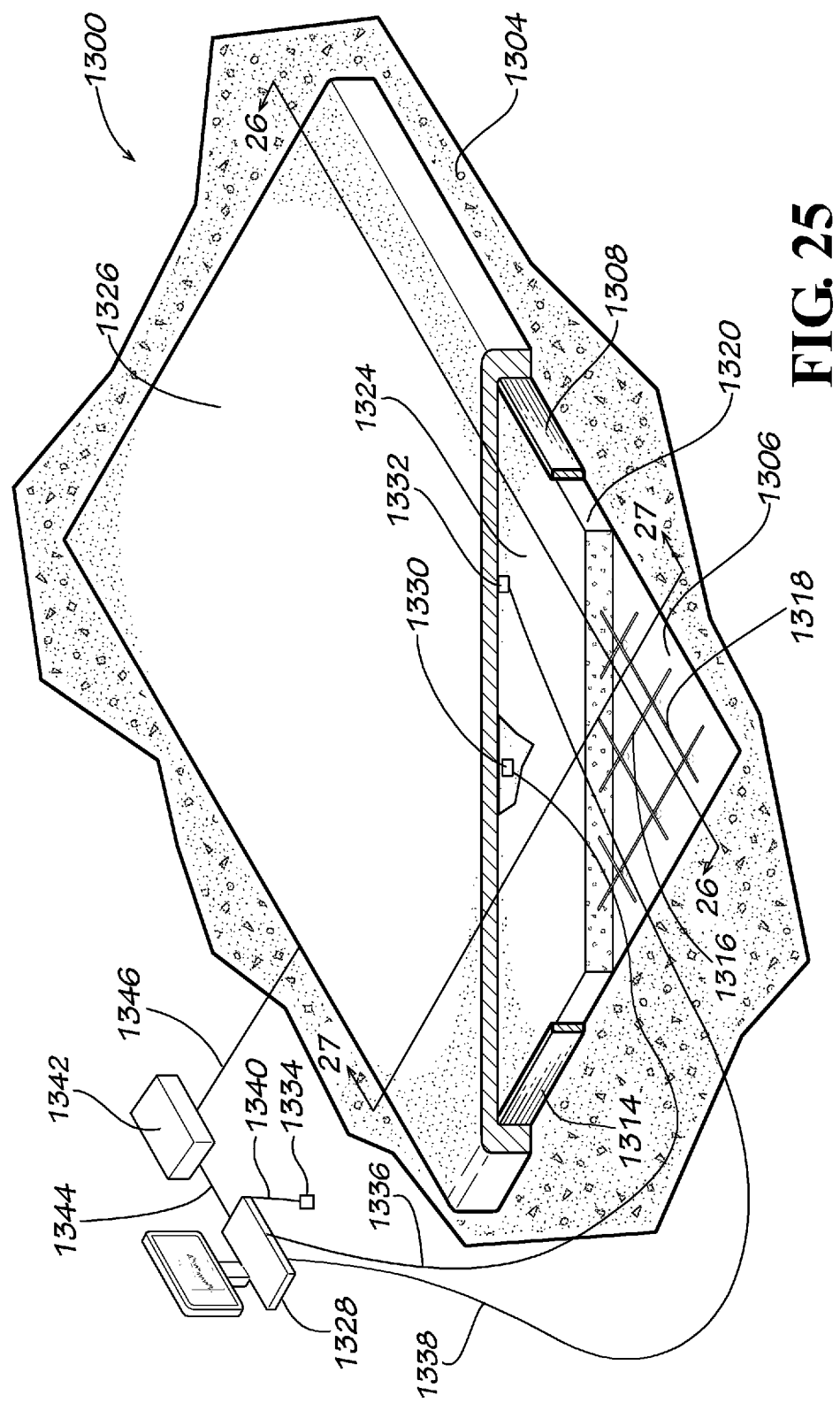
FIG. 25 is the perspective view of an alternate disclosed embodiment of an insulated concrete form and a schematic diagram of a disclosed embodiment of a temperature control system in accordance with the present invention.
Figure 26:
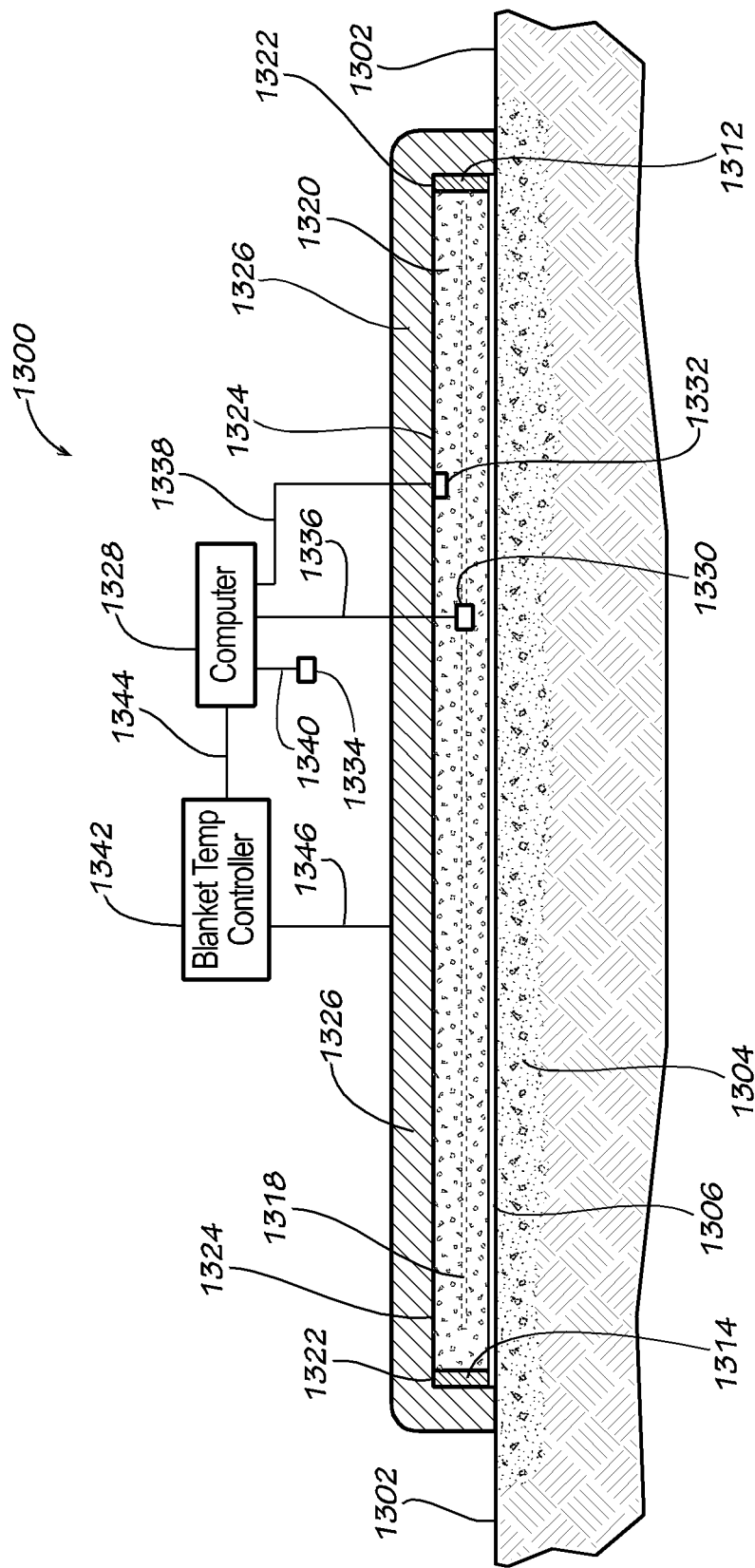
FIG. 26 is the cross-sectional view of the insulated concrete form shown in FIG. 25 taken along the line 26-26 and a schematic diagram for a disclosed embodiment of a temperature control system in accordance with the present invention.
Figure 27:
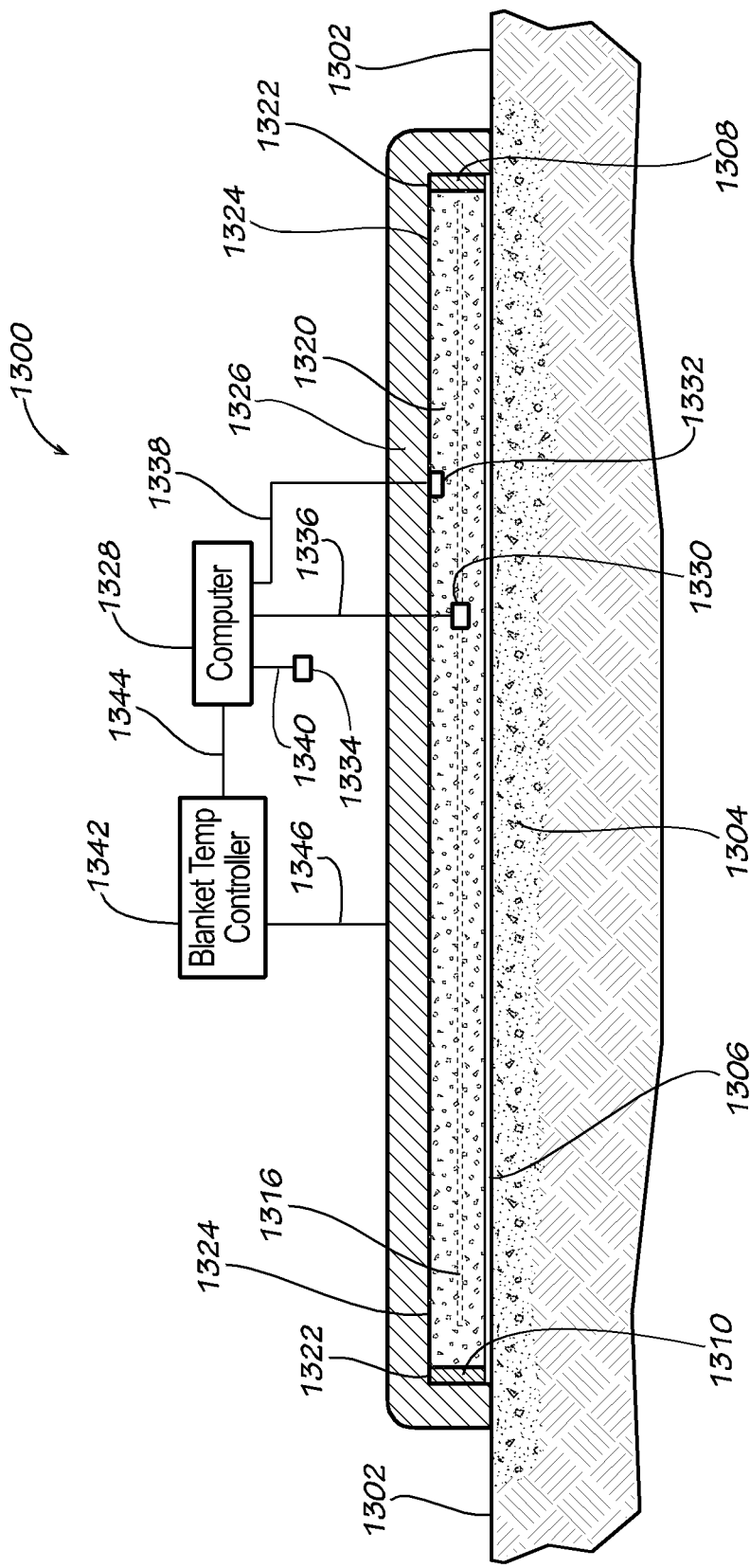
FIG. 27 is the cross-sectional view of the insulated concrete form shown in FIG. 25 taken along the line 27-27 and a schematic diagram for a disclosed embodiment of a temperature control system in accordance with the present invention.

Referring now to FIGS. 25-27, there is shown an alternate disclosed embodiment of an insulated concrete form 1300 in accordance with the present invention. This insulated concrete form is designed for constructing a concrete slab on grade, such as a floor of a commercial or residential building, a basement floor, a highway, a road, a bridge, an airport runway, and the like. Before the insulated concrete form 1300 is placed, the ground 1302 is excavated to a desired depth. Usually, a bed of aggregate 1304 is established below the concrete slab to be constructed. The insulated concrete form 1300 is constructed by first placing on the bed of aggregate 1304 a layer of insulating material 1306. The layer of insulating material can be either a layer of conductive heat insulating material, a sheet of radiant heat reflective material 1306, such as a metal foil, especially aluminum foil, or preferably both. A preferred conductive heat insulating material is the same as described above for the insulating material 201, 320, 324. A preferred radiant heat reflective material is a metalized polymeric film, more preferably, metalized biaxially-oriented polyethylene terephthalate film, especially aluminized biaxially-oriented polyethylene terephthalate film. Biaxially-oriented polyethylene terephthalate film is commercially available under the designation Mylar®, Melinex® and Hostaphen®. Mylar® film is typically available in thicknesses of approximately 1 mil or 2 mil. Aluminized Mylar® film is commercially available from the Cryospares division of Oxford Instruments Nanotechnology Tools Ltd., Abingdon, Oxfordshire, United Kingdom and from New England Hydroponics, Southampton, Mass., USA. Another preferred material is metalized plastic bubble pack type insulating material or metalized closed cell polymeric foam. Such material is commercially available as Space Age® reflective insulation from Insulation Solutions, Inc., East Peoria, Ill. 61611. The Space Age® product is available as two layers of polyethylene air bubble pack sandwiched between one layer of white polyethylene and one layer of reflective foil; two layers air bubble pack sandwiched between two layers of reflective foil; or a layer of closed cell polymeric foam (such as high density polyethylene foam) disposed between one layer of polyethylene film and one layer of reflective foil. All three of these Space Age® product configurations are useful in the present invention for the radiant heat reflective material 1306. The sheet of aluminized Mylar® film also provides an excellent vapor barrier. The radiant heat reflective material insulates the bottom surface of the concrete slab and helps retain the heat of hydration within the concrete. This system can be used where it is impossible or impractical to use foam insulation on the bottom surface of the concrete. When an aluminized polymer film is used as the radiant heat reflective material, care should be taken so that the aluminized side of the polymer film does not contact the plastic concrete in the form or mold.

A conventional wood or metal concrete form is constructed to the size and shape of the concrete slab to be constructed. The concrete form can be constructed on the sheet 1306 of aluminized Mylar® film or the concrete form can be constructed on the bed of aggregate 1304 and the sheet 1306 of aluminized Mylar® film can be placed on the bed of aggregate within the concrete form. Specifically, as shown in FIGS. 25-27, a conventional concrete form comprises two longitudinal side form members 1308, 1310 and two transverse side form members 1312, 1314. Collectively, the side form members 1308-1314 form a rectangular form or mold for receiving plastic concrete. Although the concrete form is illustrated as having a four-sided rectangular shape, it is specifically contemplated that the concrete form can be of any size or shape.

A rebar grid, including rebar 1316 and 1318, is then constructed in a conventional manner within the side form members 1308-1314. Rebar chairs (not shown) can be used to position the rebar grid at a desired height within the concrete slab. After a rebar grid is constructed in the insulated concrete form 1300, the form is filled with plastic concrete 1320. Sufficient plastic concrete 1320 is placed in the form such that the plastic concrete in the form reaches the top 1322 of the side form members 1308-1314. The top surface 1324 of the plastic concrete 1320 is then finished in any desired conventional manner, such as by troweling, or to provide other types of architectural finishes or patterns.

After the plastic concrete in the form has been finished, a layer, or multiple layers, of insulating material 1326 is placed on the top 1322 of the side form members 1308-1314 and the top surface 1324 of the finished plastic concrete 1320, as shown in FIGS. 25-27. The insulating material 1326 can be made from the same material and have the same insulating properties as the foam insulating panels 14-22 or the insulating material 200, 320, 324 disclosed above. The combination of a concrete insulating blanket and a sheet of aluminized Mylar® film is preferred for the insulating material 1326.

If the insulating material 1326 is a foam insulating panel or a concrete insulating blanket, the insulating material is left in place until the concrete 1320 has achieve a desired amount of cure. The insulating material 1326 can then be removed along with the side form members 1308-1314.

In cold weather conditions and/or for concrete employing relatively high amounts of slag cement and/or fly ash as disclosed below, it may be desirable to use an electrically heated blanket as the insulating material 1326. As shown in FIGS. 25-27, the electrically heated blanket/insulating material 1326 is place directly on top of the plastic concrete 1320 and is draped over the side form members 1308-1314. Then, an additional layer of insulating material (not shown) can optionally be placed on top of the electrically heated blanket/insulating material 1226. The additional layer of insulating material can be any material that reduces heat loss from the concrete 1320 in the form 1300. Examples of the additional layer of insulating material useful in the present invention include, but are not limited to, a concrete insulating blanket, flexible polymeric foam, foam insulating panels, such as polystyrene foam insulating panels similar to the top foam insulating panels 182-186, and/or a radiant heat reflective material, such as a metal foil, especially aluminum foil, most preferably aluminized Mylar® film. Another preferred material is metalized plastic bubble pack type insulating material or metalized closed cell polymeric foam. Such material is commercially available as Space Age® reflective insulation from Insulation Solutions, Inc., East Peoria, Ill. 61611. The Space Age® product is available as two layers of polyethylene air bubble pack sandwiched between one layer of white polyethylene and one layer of reflective foil; two layers air bubble pack sandwiched between two layers of reflective foil; or a layer of closed cell polymeric foam (such as high density polyethylene foam) disposed between one layer of polyethylene film and one layer of reflective foil. All three of these Space Age® product configurations are useful in the present invention for the additional layer of insulating material. The extra layer is insulating material can be made from the same material and have the same insulating properties as the insulating material 201, 320, 324 described above.

When an electrically heated blanket is used for the insulating material 1326, it is desirable to use the temperature sensor and electronic control system disclosed above for the electrically heated blanket. As shown in FIGS. 25-27, there is disclosed a computing device 1328 that is connected to three temperature sensors 1330, 1332, 1334 by electric circuits, such as by the wires 1336, 1338, 1340, respectively. The temperature sensor 1330 is positioned at approximately the middle of the plastic concrete 1320. The temperature sensor 1330 measures the interior temperature of the concrete 1320 as it cures. The temperature sensor 1332 is positioned at the interface between the electrically heated blanket/insulating material 1326 and the concrete 1320. The temperature sensor 1334 is positioned adjacent the insulated concrete form 1300 so as to read the ambient temperature of the air adjacent the form. For concrete of a thickness such that the temperature differential between the surface and the middle of the concrete is not significant, the temperature sensor 1330 is optional. The ambient temperature sensor 1334 is also optional. It is specifically contemplated that the temperature sensor 1332 is attached to the under side of the electrically heated blanket/insulating material 1326, so that when the electrically heated blanket is applied to the top 1324 of the concrete 1320, the temperature sensor will be positioned at the interface between the heated blanket and the concrete.

The computing device 1328 is connected to the temperature sensors 1330-1334 so that it can continuously, or periodically, read and store the temperature measured by each of the temperature sensors. The computing device 1328 is connected to a blanket temperature controller 1342 by an electric circuit, such as the wires 1344. The blanket temperature controller 1342 is connected to the electrically heated blanket/insulating material 1326 by an electric circuit, such as by the wires 1346. The computing device 1328 and the blanket temperature controller 1342 are configured and programmed such that the computing device controls the amount of heat produced by the electrically heated blanket/insulating material 1326. Thus, the computing device 1328 controls the amount of heat that is provided to the concrete 1320 within the insulated concrete form 1300. The computing device 1328 can be programmed to operate in any of the operating modes disclosed above, including those shown in FIGS. 9-11 and 23.

The insulated concrete form or mold, the insulated concrete blankets and the electrically heated concrete form used in various disclosed embodiments of the present invention have insulating properties equivalent to at least 0.25 inches of expanded polystyrene foam, preferably at least 0.5 inches of expanded polystyrene foam, preferably equivalent to at least 1 inch of expanded polystyrene foam, more preferably equivalent to at least 2 inches of expanded polystyrene foam, more preferably equivalent to at least 3 inches of expanded polystyrene foam, most preferably equivalent to at least 4 inches of expanded polystyrene foam. There is no maximum thickness for the equivalent expanded polystyrene foam useful in the present invention. The maximum thickness is usually dictated by economics, ease of handling and building or structure design. However, for most applications a maximum equivalence of 8 inches of expanded polystyrene foam can be used. In another embodiment of the present invention, the insulated concrete form or mold has insulating properties equivalent to approximately 0.25 to approximately 8 inches of expanded polystyrene foam, preferably approximately 0.5 to approximately 8 inches of expanded polystyrene foam, preferably approximately 1 to approximately 8 inches of expanded polystyrene foam, preferably approximately 2 to approximately 8 inches of expanded polystyrene foam, more preferably approximately 3 to approximately 8 inches of expanded polystyrene foam, most preferably approximately 4 to approximately 8 inches of expanded polystyrene foam. These ranges for the equivalent insulating properties include all of the intermediate values. Thus, the insulated concrete form or mold used in another disclosed embodiment of the present invention has insulating properties equivalent to approximately 0.25 inches of expanded polystyrene foam, approximately 0.5 inches of expanded polystyrene foam, approximately 1 inch of expanded polystyrene foam, approximately 2 inches of expanded polystyrene foam, approximately 3 inches of expanded polystyrene foam, approximately 4 inches of expanded polystyrene foam, approximately 5 inches of expanded polystyrene foam, approximately 6 inches of expanded polystyrene foam, approximately 7 inches of expanded polystyrene foam, or approximately 8 inches of expanded polystyrene foam. Expanded polystyrene foam has an R-value of approximately 4 to 6 per inch thickness. Therefore, the layer of insulating material 202 should have an R-value of greater than 1.5, preferably greater than 4, more preferably greater than 8, especially greater than 12, most especially greater than 20. The insulating material 202 preferably has an R-value of approximately 1.5 to approximately 40; more preferably between approximately 4 to approximately 40; especially approximately 8 to approximately 40; more especially approximately 12 to approximately 40. The insulating material 344 preferably has an R-value of approximately 1.5, more preferably approximately 4, most preferably approximately 8, especially approximately 20, more especially approximately 30, most especially approximately 40.

While the present invention can be used with conventional concrete mixes; i.e., concrete in which portland cement is the only cementitious material used in the concrete, it is preferred as a part of the present invention to use the concrete, plaster or mortar mixes disclosed in U.S. Pat. No. 8,545,749 (the disclosure of which is incorporated herein by reference in its entirety). Specifically, the concrete mix in accordance with the present invention comprises cementitious material, aggregate and water sufficient to hydrate the cementitious material. The amount of cementitious material used relative to the total weight of the concrete varies depending on the application and/or the strength of the concrete desired. Generally speaking, however, the cementitious material comprises approximately 25% to approximately 40% by weight of the total weight of the concrete, exclusive of the water, or 300 lbs/yd$^3$ of concrete (177 kg/m$^3$) to 1,100 lbs/yd$^3$ of concrete (650 kg/m$^3$) of concrete. The water to cement weight ratio is usually approximately 0.25 to approximately 0.6. Relatively low water to cement ratios lead to higher strength but lower workability, while relatively high water to cement ratios lead to lower strength, but better workability. Aggregate usually comprises 70% to 80% by volume of the concrete. However, the relative amount of cementitious material to aggregate to water is not a critical feature of the present invention; conventional amounts can be used. Nevertheless, sufficient cementitious material should be used to produce concrete with an ultimate compressive strength of at least 1,000 psi, preferably at least 2,000 psi, more preferably at least 3,000 psi, most preferably at least 4,000 psi, especially up to about 10,000 psi or more.

The aggregate used in the concrete used with the present invention is not critical and can be any aggregate typically used in concrete. The aggregate that is used in the concrete depends on the application and/or the strength of the concrete desired. Such aggregate includes, but is not limited to, fine aggregate, medium aggregate, coarse aggregate, sand, gravel, crushed stone, lightweight aggregate, recycled aggregate, such as from construction, demolition and excavation waste, and mixtures and combinations thereof.

The reinforcement of the concrete used with the present invention is not a critical aspect of the present invention and thus any type of reinforcement required by design requirements can be used. Such types of concrete reinforcement include, but are not limited to, deformed steel bars, cables, post tensioned cables, pre-stressed cables, fibers, steel fibers, mineral fibers, synthetic fibers, carbon fibers, steel wire fibers, mesh, lath, and the like.

The preferred cementitious material for use with the present invention comprises portland cement; preferably portland cement and one of slag cement or fly ash; and more preferably portland cement, slag cement and fly ash. Slag cement is also known as ground granulated blast-furnace slag (GGBFS). The cementitious material preferably comprises a reduced amount of portland cement and increased amounts of recycled supplementary cementitious materials; i.e., slag cement and/or fly ash. This results in cementitious material and concrete that is more environmentally friendly. The portland cement can also be replaced, in whole or in part, by one or more cementitious materials other than portland cement, slag cement or fly ash. Such other cementitious or pozzolanic materials include, but are not limited to, silica fume; metakaolin; rice hull (or rice husk) ash; ground burnt clay bricks; brick dust; bone ash; animal blood; clay; other siliceous, aluminous or aluminosiliceous materials that react with calcium hydroxide in the presence of water; hydroxide-containing compounds, such as sodium hydroxide, magnesium hydroxide, or any other compound having reactive hydrogen groups, other hydraulic cements and other pozzolanic materials. The portland cement can also be replaced, in whole or in part, by one or more inert or filler materials other than portland cement, slag cement or fly ash. Such other inert or filler materials include, but are not limited to limestone powder; calcium carbonate; titanium dioxide; quartz; or other finely divided minerals that densify the hydrated cement paste.

The preferred cementitious material of the present invention comprises 0% to approximately 80% by weight portland cement. The range of 0% to approximately 80% by weight portland cement includes all of the intermediate percentages; namely, 5%, 10%, 15%, 20%, 25%, 30%, 35%, 40%, 45%, 50%, 55%, 60%, 65%, 70%, and 75%. The cementitious material of the present invention can also comprise 0% to approximately 70% by weight portland cement, preferably 0% to approximately 60% by weight portland cement, more preferably 0% to approximately 60% by weight portland cement, most preferably 0% to approximately 50% by weight portland cement, especially 0% to approximately 40% by weight portland cement, more especially 0% to approximately 30% by weight portland cement, most especially 0% to approximately 20% by weight portland cement or 0% to approximately 10% by weight portland cement. In one disclosed embodiment, the cementitious material comprises approximately 10% to approximately 45% by weight portland cement, more preferably approximately 10% to approximately 40% by weight portland cement, most preferably approximately 10% to approximately 35% by weight portland cement, especially approximately 33⅓% by weight portland cement, most especially approximately 10% to approximately 30% by weight portland cement. Thus, in another disclosed embodiment of the present invention, the cementitious material can comprise approximately 5%, approximately 10%, approximately 15%, approximately 20%, approximately 25%, approximately 30%, approximately 35%, approximately 40%, approximately 45% or approximately 50% by weight portland cement or any sub-combination thereof.

The preferred cementitious material for use in one disclosed embodiment of the present invention also comprises 0% to approximately 90% by weight slag cement, preferably approximately 10% to approximately 90% by weight slag cement, preferably approximately 20% to approximately 90% by weight slag cement, more preferably approximately 30% to approximately 80% by weight slag cement, most preferably approximately 30% to approximately 70% by weight slag cement, especially approximately 30% to approximately 60% by weight slag cement, more especially approximately 30% to approximately 50% by weight slag cement, most especially approximately 30% to approximately 40% by weight slag cement. In another disclosed embodiment the cementitious material comprises approximately 33⅓% by weight slag cement. In another disclosed embodiment of the present invention, the cementitious material can comprise approximately 5% by weight slag cement, approximately 10% by weight slag cement, approximately 15% by weight slag cement, approximately 20% by weight slag cement, approximately 25% by weight slag cement, approximately 30% by weight slag cement, approximately 35% by weight slag cement, approximately 40% by weight slag cement, approximately 45% by weight slag cement, approximately 50% by weight slag cement, approximately 55% by weight slag cement, approximately 60% by weight slag cement, approximately 65%, approximately 70% by weight slag cement, approximately 75% by weight slag cement, approximately 80% by weight slag cement, approximately 85% by weight slag cement or approximately 90% by weight slag cement or any sub-combination thereof.

The preferred cementitious material for use in one disclosed embodiment of the present invention also comprises 0% to approximately 80% by weight fly ash, preferably approximately 10% to approximately 75% by weight fly ash, preferably approximately 10% to approximately 70% by weight fly ash, preferably approximately 10% to approximately 65% by weight fly ash, preferably approximately 10% to approximately 60% by weight fly ash, preferably approximately 10% to approximately 55% by weight fly ash, preferably approximately 10% to approximately 50% by weight fly ash, preferably approximately 10% to approximately 45% by weight fly ash, more preferably approximately 10% to approximately 40% by weight fly ash, most preferably approximately 10% to approximately 35% by weight fly ash, especially approximately 33⅓% by weight fly ash. In another disclosed embodiment of the present invention, the preferred cementitious material comprises 0% by weight fly ash, approximately 5% by weight fly ash, approximately 10% by weight fly ash, approximately 15% by weight fly ash, approximately 20% by weight fly ash, approximately 25% by weight fly ash, approximately 30% by weight fly ash, approximately 35% by weight fly ash, approximately 40% by weight fly ash, approximately 45% by weight fly ash or approximately 50% by weight fly ash, approximately 55% by weight fly ash, approximately 60% by weight fly ash, approximately 65% by weight fly ash, approximately 70% by weight fly ash or approximately 75% by weight fly ash, approximately 80% by weight fly ash or any sub-combination thereof. Preferably the fly ash has an average particle size of <10 μm; more preferably 90% or more of the particles have a particles size of <10 μm.

The cementitious material for use in one disclosed embodiment of the present invention can optionally include 0.1% to approximately 10% by weight Wollastonite. Wollastonite is a calcium inosilicate mineral ($CaSiO_3$) that may contain small amounts of iron, magnesium, and manganese substituted for calcium. In addition the cementitious material can optionally include 0.1-25% calcium oxide (quick lime), calcium hydroxide (hydrated lime), calcium carbonate or latex or polymer admixtures, either mineral or synthetic, that have reactive hydroxyl groups.

The cementitious material for use in one disclosed embodiment of the present invention can also optionally include fillers, such as limestone powder; calcium carbonate; titanium dioxide; quartz; or other finely divided minerals that densify the hydrated cement paste. Specifically, inert fillers optionally can be used in the cementitious material of the present invention in amounts of 0% to approximately 40% by weight; preferably, approximately 5% to approximately 30% by weight. In one disclosed embodiment, the cementitious material for use with the present invention comprises 0% to approximately 75% by weight portland cement, approximately 10% to approximately 90% by weight slag cement, approximately 5% to approximately 50% by weight fly ash and 0% to approximately 40% by weight inert filler. In another disclosed embodiment, the cementitious material for use with the present invention comprises approximately 10% to approximately 80% by weight portland cement; at least one of approximately 10% to approximately 90% by weight slag cement and approximately 5% to approximately 50% by weight fly ash; and 5% to approximately 40% by weight inert filler.

In one disclosed embodiment, the cementitious material in accordance with the present invention comprises approximately equal parts by weight of portland cement, slag cement and fly ash; i.e., approximately 33⅓% by weight portland cement, approximately 33⅓% by weight slag cement and approximately 33⅓% by weight fly ash. In another disclosed embodiment, a preferred cementitious material in accordance with the present invention has a weight ratio of portland cement to slag cement to fly ash of 1:1:1. In another disclosed embodiment, the hydraulic cement in accordance with the present invention has a weight ratio of portland cement to slag cement to fly ash of approximately 0.85-1.05:0.85-1.05:0.85-1.05, preferably approximately 0.9-1.1:0.9-1.1:0.9-1.1, more preferably approximately 0.95-1.05:0.95-1.05:0.95-1.05.

In one disclosed embodiment, the cementitious material for use with the present invention comprises approximately 10% to approximately 80% by weight portland cement, approximately 10% to approximately 90% by weight slag cement, and approximately 5% to approximately 80% by weight fly ash. In another disclosed embodiment, the cementitious material for use with the present invention comprises approximately 10% to approximately 70% by weight portland cement, approximately 10% to approximately 90% by weight slag cement, and approximately 5% to approximately 80% by weight fly ash. In another disclosed embodiment, the cementitious material for use with the present invention comprises approximately 10% to approximately 60% by weight portland cement, approximately 10% to approximately 90% by weight slag cement, and approximately 5% to approximately 50% by weight fly ash. In another disclosed embodiment, the cementitious material for use with the present invention comprises approximately 10% to approximately 50% by weight portland cement, approximately 10% to approximately 90% by weight slag cement, and approximately 5% to approximately 50% by weight fly ash. In another disclosed embodiment, the cementitious material for use with the present invention comprises less than 50% by weight portland cement, approximately 10% to approximately 90% by weight slag cement, and approximately 5% to approximately 50% by weight fly ash. In another disclosed embodiment, the cementitious material for use with the present invention comprises approximately 10% to approximately 45% by weight portland cement, approximately 10% to approximately 90% by weight slag cement, and approximately 5% to approximately 50% by weight fly ash. In another disclosed embodiment, the cementitious material for use with the present invention comprises approximately 10% to approximately 40% by weight portland cement, approximately 10% to approximately 90% by weight slag cement, and approximately 5% to approximately 50% by weight fly ash. In another disclosed embodiment, the cementitious material for use with the present invention comprises approximately 10% to approximately 35% by weight portland cement, approximately 10% to approximately 90% by weight slag cement, and approximately 5% to approximately 50% by weight fly ash.

In one disclosed embodiment, the cementitious material for use with the present invention comprises 0% to approximately 100% by weight portland cement, approximately 10% to approximately 90% by weight slag cement, and approximately 5% to approximately 50% by weight fly ash. In one disclosed embodiment, the cementitious material for use with the present invention comprises 0% to approximately 80% by weight portland cement, approximately 10% to approximately 90% by weight slag cement, and approximately 5% to approximately 50% by weight fly ash. In another disclosed embodiment, the cementitious material for use with the present invention comprises 0% to approximately 70% by weight portland cement, approximately 10% to approximately 90% by weight slag cement, and approximately 5% to approximately 50% by weight fly ash. In another disclosed embodiment, the cementitious material for use with the present invention comprises 0% to approximately 60% by weight portland cement, approximately 10% to approximately 90% by weight slag cement, and approximately 5% to approximately 50% by weight fly ash. In another disclosed embodiment, the cementitious material for use with the present invention comprises 0% to approximately 50% by weight portland cement, approximately 10% to approximately 90% by weight slag cement, and approximately 5% to approximately 50% by weight fly ash. In another disclosed embodiment, the cementitious material for use with the present invention comprises 0% to approximately 45% by weight portland cement, approximately 10% to approximately 90% by weight slag cement, and approximately 5% to approximately 50% by weight fly ash. In another disclosed embodiment, the cementitious material for use with the present invention comprises 0% to approximately 40% by weight portland cement, approximately 10% to approximately 90% by weight slag cement, and approximately 5% to approximately 50% by weight fly ash. In another disclosed embodiment, the cementitious material for use with the present invention comprises 0% to approximately 35% by weight portland cement, approximately 10% to approximately 90% by weight slag cement, and approximately 5% to approximately 50% by weight fly ash.

In another disclosed embodiment, the cementitious material for use with the present invention comprises approximately 10% to approximately 100% by weight portland cement and at least one of approximately 10% to approximately 90% by weight slag cement and approximately 5% to approximately 50% by weight fly ash. In another disclosed embodiment, the cementitious material for use with the present invention comprises approximately 10% to approximately 90% by weight portland cement and at least one of approximately 10% to approximately 90% by weight slag cement and approximately 5% to approximately 50% by weight fly ash. In another disclosed embodiment, the cementitious material for use with the present invention comprises approximately 10% to approximately 80% by weight portland cement and at least one of approximately 10% to approximately 90% by weight slag cement and approximately 5% to approximately 50% by weight fly ash. In another disclosed embodiment, the cementitious material for use with the present invention comprises approximately 10% to approximately 70% by weight portland cement and at least one of approximately 10% to approximately 90% by weight slag cement and approximately 5% to approximately 50% by weight fly ash. In another disclosed embodiment, the cementitious material for use with the present invention comprises approximately 10% to approximately 60% by weight portland cement and at least one of approximately 10% to approximately 90% by weight slag cement and approximately 5% to approximately 50% by weight fly ash. In another disclosed embodiment, the cementitious material for use with the present invention comprises approximately 10% to approximately 50% by weight portland cement and at least one of approximately 10% to approximately 90% by weight slag cement and approximately 5% to approximately 50% by weight fly ash. In another disclosed embodiment, the cementitious material for use with the present invention comprises approximately 10% to approximately 40% by weight portland cement and at least one of approximately 10% to approximately 90% by weight slag cement and approximately 5% to approximately 50% by weight fly ash.

In another disclosed embodiment, the cementitious material for use with the present invention comprises approximately 10% to approximately 90% by weight portland cement; approximately 10% to approximately 90% by weight slag cement; 0% to approximately 50% by weight fly ash; 0% to 10% by weight Wollastonite; and 0% to approximately 25% by weight calcium oxide, calcium hydroxide, or latex or polymer admixtures, either mineral or synthetic, that have reactive hydroxyl groups, or mixtures thereof. In one disclosed embodiment, the cementitious material for use with the present invention comprises approximately 10% to approximately 80% by weight portland cement; approximately 10% to approximately 90% by weight slag cement; 0% to approximately 50% by weight fly ash; 0% to approximately 10% by weight Wollastonite; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises approximately 10% to approximately 70% by weight portland cement; approximately 10% to approximately 90% by weight slag cement; 0% to approximately 50% by weight fly ash; 0% to approximately 10% by weight Wollastonite; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises approximately 10% to approximately 60% by weight portland cement; approximately 10% to approximately 90% by weight slag cement; 0% to approximately 50% by weight fly ash; 0% to approximately 10% by weight Wollastonite; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises approximately 10% to approximately 50% by weight portland cement; approximately 10% to approximately 90% by weight slag cement; 0% to approximately 50% by weight fly ash; 0% to approximately 10% by weight Wollastonite; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises less than 50% by weight portland cement; approximately 10% to approximately 90% by weight slag cement; approximately 10% to approximately 50% by weight fly ash; 0% to approximately 10% by weight Wollastonite; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises approximately 10% to approximately 45% by weight portland cement; approximately 10% to approximately 90% by weight slag cement; 10% to approximately 50% by weight fly ash; 0% to approximately 10% by weight Wollastonite; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises approximately 10% to approximately 40% by weight portland cement; approximately 10% to approximately 90% by weight slag cement; approximately 10% to approximately 50% by weight fly ash; 0% to approximately 10% by weight Wollastonite; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises approximately 10% to approximately 35% by weight portland cement; approximately 10% to approximately 90% by weight slag cement; approximately 10% to approximately 50% by weight fly ash; 0% to approximately 10% by weight Wollastonite; and 0% to approximately 25% by weight calcium oxide, calcium hydroxide, or latex or polymer admixtures, either mineral or synthetic, that have reactive hydroxyl groups, or mixtures thereof.

In another disclosed embodiment, the cementitious material for use with the present invention comprises at least one of approximately 10% to approximately 100% by weight portland cement, approximately 10% to approximately 90% by weight slag cement and approximately 5% to approximately 50% by weight fly ash; 0% to 10% by weight Wollastonite; and 0% to approximately 25% by weight calcium oxide, calcium hydroxide, or latex or polymer admixtures, either mineral or synthetic, that have reactive hydroxyl groups, or mixtures thereof. In one disclosed embodiment, the cementitious material for use with the present invention comprises at least one of approximately 10% to approximately 80% by weight portland cement, approximately 10% to approximately 90% by weight slag cement and approximately 5% to approximately 50% by weight fly ash; 0% to approximately 10% by weight Wollastonite; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises at least one of approximately 10% to approximately 70% by weight portland cement, approximately 10% to approximately 90% by weight slag cement and approximately 5% to approximately 50% by weight fly ash; 0% to approximately 10% by weight Wollastonite; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises at least one of approximately 10% to approximately 60% by weight portland cement, approximately 10% to approximately 90% by weight slag cement and approximately 5% to approximately 50% by weight fly ash; 0% to approximately 10% by weight Wollastonite; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises at least one of approximately 10% to approximately 50% by weight portland cement, approximately 10% to approximately 90% by weight slag cement and approximately 5% to approximately 50% by weight fly ash; 0% to approximately 10% by weight Wollastonite; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises less than 50% by weight portland cement; approximately 10% to approximately 90% by weight slag cement; approximately 10% to approximately 50% by weight fly ash; 0% to approximately 10% by weight Wollastonite; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises at least one of approximately 10% to approximately 45% by weight portland cement, approximately 10% to approximately 90% by weight slag cement and approximately 10% to approximately 50% by weight fly ash; 0% to approximately 10% by weight Wollastonite; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises at least one of approximately 10% to approximately 40% by weight portland cement, approximately 10% to approximately 90% by weight slag cement and approximately 10% to approximately 50% by weight fly ash; 0% to approximately 10% by weight Wollastonite; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises at least one of approximately 10% to approximately 35% by weight portland cement, approximately 10% to approximately 90% by weight slag cement and approximately 10% to approximately 50% by weight fly ash; 0% to approximately 10% by weight Wollastonite; and 0% to approximately 25% by weight calcium oxide, calcium hydroxide, or latex or polymer admixtures, either mineral or synthetic, that have reactive hydroxyl groups, or mixtures thereof.

In another disclosed embodiment, the cementitious material for use with the present invention comprises approximately 10% to approximately 90% by weight portland cement; at least one of approximately 10% to approximately 90% by weight slag cement and approximately 5% to approximately 50% by weight fly ash; and 0.1% to 10% by weight Wollastonite. In one disclosed embodiment, the cementitious material for use with the present invention comprises approximately 10% to approximately 80% by weight portland cement; at least one of approximately 10% to approximately 90% by weight slag cement and approximately 5% to approximately 50% by weight fly ash; and 0.1% to approximately 10% by weight Wollastonite. In another disclosed embodiment, the cementitious material for use with the present invention comprises approximately 10% to approximately 70% by weight portland cement; at least one of approximately 10% to approximately 90% by weight slag cement and approximately 5% to approximately 50% by weight fly ash; and 0.1% to approximately 10% by weight Wollastonite. In another disclosed embodiment, the cementitious material for use with the present invention comprises approximately 10% to approximately 60% by weight portland cement; at least one of approximately 10% to approximately 90% by weight slag cement and approximately 5% to approximately 50% by weight fly ash; and 0.1% to approximately 10% by weight Wollastonite. In another disclosed embodiment, the cementitious material for use with the present invention comprises approximately 10% to approximately 50% by weight portland cement; at least one of approximately 10% to approximately 90% by weight slag cement and approximately 5% to approximately 50% by weight fly ash; and 0.1% to approximately 10% by weight Wollastonite. In another disclosed embodiment, the cementitious material for use with the present invention comprises less than 50% by weight portland cement; at least one of approximately 10% to approximately 90% by weight slag cement and approximately 5% to approximately 50% by weight fly ash; and 0.1% to approximately 10% by weight Wollastonite. In another disclosed embodiment, the cementitious material for use with the present invention comprises approximately 10% to approximately 45% by weight portland cement; at least one of approximately 10% to approximately 90% by weight slag cement and approximately 5% to approximately 50% by weight fly ash; and 0.1% to approximately 10% by weight Wollastonite. In another disclosed embodiment, the cementitious material for use with the present invention comprises approximately 10% to approximately 40% by weight portland cement; at least one of approximately 10% to approximately 90% by weight slag cement and approximately 5% to approximately 50% by weight fly ash; and 0.1% to approximately 10% by weight Wollastonite. In another disclosed embodiment, the cementitious material for use with the present invention comprises approximately 10% to approximately 35% by weight portland cement; at least one of approximately 10% to approximately 90% by weight slag cement and approximately 5% to approximately 50% by weight fly ash; and 0.1% to approximately 10% by weight Wollastonite.

The portland cement, slag cement and fly ash, and any other supplementary cementitious material, can be combined physically or mechanically in any suitable manner and is not a critical feature of the present invention. For example, the portland cement, slag cement and fly ash can be mixed together to form a uniform blend of dry material prior to combining with the aggregate and water. Or, the portland cement, slag cement and fly ash can be added separately to a conventional concrete mixer, such as the transit mixer of a ready-mix concrete truck, at a batch plant. The water and aggregate can be added to the mixer before the cementitious material, however, it is preferable to add the cementitious material first, the water second, the aggregate third and any makeup water last.

Chemical admixtures can also be used with the concrete of the present invention. Such chemical admixtures include, but are not limited to, accelerators, retarders, air entrainments, plasticizers, superplasticizers, pigments, corrosion inhibitors, bonding agents and pumping aid. Although chemical admixtures can be used with the concrete of the present invention, it is believed that chemical admixtures are not necessary.

Mineral admixtures or supplementary cementitious materials can also be used with the concrete of the present invention. Such mineral admixtures include, but are not limited to, silica fume; metakaolin; rice hull (or rice husk) ash; ground burnt clay bricks; brick dust; bone ash; animal blood; clay; other siliceous, aluminous or aluminosiliceous materials that react with calcium hydroxide in the presence of water; hydroxide-containing compounds, such as sodium hydroxide, magnesium hydroxide, or any other compound having reactive hydrogen groups, other hydraulic cements and other pozzolanic materials. Although mineral admixtures can be used with the concrete of the present invention, it is believed that mineral admixtures are not necessary.

The concrete mix cured in a concrete form in which the temperature of the curing concrete is controlled in accordance with the present invention, especially controlled to follow a predetermined temperature profile, produces concrete with superior early strength and ultimate strength properties compared to the same concrete mix cured in a conventional form without the use of any chemical additives to accelerate or otherwise alter the curing process. Thus, in one disclosed embodiment of the present invention, the preferred cementitious material comprises at least two of portland cement, slag cement and fly ash in amounts such that at seven days the concrete mix cured in accordance with the present invention has a compressive strength at least 50% greater than the same concrete mix would have after seven days in a conventional (i.e., non-insulated) concrete form under ambient conditions. In another disclosed embodiment, the preferred concrete mix cured in accordance with the present invention has a compressive strength at least 25%, at least 50%, at least 75%, at least 100%, at least 150%, at least 200%, at least 250% or at least 300% greater than the same concrete mix would have after seven days in a conventional (i.e., non-insulated) concrete form under ambient conditions.

In another disclosed embodiment of the present invention, the preferred cementitious material comprises portland cement, slag cement and fly ash in amounts such that at seven days the concrete mix cured in accordance with the present invention has a compressive strength at least 50% greater than the same concrete mix would have after seven days in a conventional concrete form under ambient conditions. In another disclosed embodiment the preferred concrete mix cured in accordance with the present invention has a compressive strength at least 25%, at least 50%, at least 75%, at least 100%, at least 150%, at least 200%, at least 250% or at least 300% greater than the same concrete mix would have after seven days in a conventional concrete form under ambient conditions.

In another disclosed embodiment of the present invention, the preferred cementitious material comprises portland cement and slag cement in amounts such that at seven days the concrete mix cured in accordance with the present invention has a compressive strength at least 25% or at least 50% greater than the same concrete mix would have after seven days in a conventional concrete form under ambient conditions. In another disclosed embodiment, the preferred concrete mix cured in accordance with the present invention has a compressive strength at least 100%, at least 150%, at least 200%, at least 250% or at least 300% greater than the same concrete mix would have after seven days in a conventional concrete form under ambient conditions.

In another disclosed embodiment of the present invention, the preferred cementitious material comprises portland cement and fly ash in amounts such that at seven days the concrete mix cured in accordance with the present invention has a compressive strength at least 25% or at least 50% greater than the same concrete mix would have after seven days in a conventional concrete form under ambient conditions. In another disclosed embodiment the preferred concrete mix cured in accordance with the present invention has a compressive strength at least 100%, at least 150%, at least 200%, at least 250% or at least 300% greater than the same concrete mix would have after seven days in a conventional concrete form under ambient conditions.

Concrete cylinder curing boxes are well known in the art and are used to cure concrete test cylinders under standard laboratory conditions in accordance with ASTM C 31. Concrete cylinder curing boxes are insulated boxes that can contain a plurality of 6×12" or 4×8" concrete cylinders. These concrete cylinders are cured in the concrete curing box under water at a constant 72° F. The concrete cylinder curing boxes include the ability to both heat and cool the water therein in order to maintain the desired constant temperature. Concrete cylinder curing boxes are commercially available under the designation EZ Cure and intelliCure from Engius, LLC, Stillwater, Okla., USA and Thermocure II from Construction Innovations, Ballston Spa, N.Y., USA. It is specifically contemplated that the present invention can be used with a concrete cylinder curing box. Instead of the concrete cylinder curing box holding a constant temperature, as a part of the present invention, the concrete cylinder curing box would be programmed to heat and cool the water and concrete cylinders therein to follow a predetermined temperature profile, as disclosed herein. By doing so, the concrete cylinder curing box can be used to determine under laboratory conditions the best temperature profile for curing different concrete mix designs and for determining the strength of different concrete mix designs cured under a predetermined temperature profile.

The present invention can be used to form precast structures or objects, tilt-up concrete panels for exterior walls of buildings, load-bearing interior walls, columns, piers, parking deck slabs, elevated slab, roofs and other similar precast structures and objects. Additionally, the present invention can be used to form precast structures including, but not limited to, walls, floors, decking, beams, railings, pipes, vaults, underwater infrastructure, modular paving products, retaining walls, storm water management products, culverts, bridge systems, railroad ties, traffic barriers, tunnel segments, light pole beams, light pole bases, transformer pads, and the like.

Temperature sensors suitable for use in the present invention, such as the temperature sensors 204-208, 402-406, 814-818, 954-962, 982-986 and 1230-1234 are commercially available under the designation Intellirock II™ temperature loggers from Engius, LLC of Stillwater, Okla. Other concrete temperature sensors are also available under the designation DS1921G from Maxim Integrated Products, Sunnyvale, Calif.; and under the designation VW temperature sensor or RTD temperature sensor from Durham Geo Slope Indicator, Mukilteo, Wash.

Electrically heated blankets, such as the electrically heated blankets 200, 322, 832, 836 are commercially available under the designation Powerblanket from Power Blanket LLC, Salt Lake City, Utah.

Insulating blankets, such as the concrete insulating blankets 202, 324, are commercially available under the designation concrete insulating blankets from Pregis Corp., Lake Forest, Ill. and concrete curing blankets from Granite City Tool, Waite Park, Minn.

In the electrically heated blankets 200, 322, 832, 836 and the electrically heated concrete forms 900, 950, 990, 992 1102-1110, the electrical resistance heating element, such as the electrically heated wire 944, can be substituted with an infrared producing device, such as disclosed in U.S. Pat. No. 4,602,238 and U.S. Patent Application Publication No. 2009/0324811 (the disclosures of which are both incorporated herein by reference) or a far-infrared producing device, such as disclosed in U.S. Pat. Nos. 7,009,155 and 7,827,675 and U.S. Patent Application Publication Nos. 2003/0049473; 2003/0155347; 2009/0312822 and 2010/0062667 (the disclosures of which are all incorporated herein by reference in their entirety).

It should be understood, of course, that the foregoing relates only to certain disclosed embodiments of the present invention and that numerous modifications or alterations may be made therein without departing from the spirit and scope of the invention as set forth in the appended claims.

What is claimed is:

1. A computer system comprising:
a heating device;
a controller operatively associated with the heating device;
a computing device;
a data storage device for storing data and for the providing stored data to the computing device;
wherein the data storage device contains data defining a predetermined temperature profile for curing concrete that varies temperature as a function of time, wherein the predetermined temperature profile, when plotted temperature versus time, forms an initial ascending curve followed by a descending curve; and
wherein the computing device includes program instructions for:

(a) periodically detecting the temperature of a quantity of curing concrete;
(b) periodically comparing the detected temperature to the predetermined temperature profile;
(c) providing signals to the controller for selectively adding heat from the heating device to the quantity of curing concrete in response to step (b) when the detected temperature is lower than the predetermined temperature profile, so that the temperature of the quantity of curing concrete increases over a period of time; and
(d) after step (c), providing signals to the controller for selectively adding heat from the heating device to the quantity of curing concrete in response to step (b) when the detected temperature is lower than the predetermined temperature profile, so that the temperature of the quantity of curing concrete decreases over a period of time; and
wherein the controller is configured to receive the signals from the computing device to control the amount of heat produced by the heating device based on the signals received from the computing device.

2. The computer system of claim 1 further comprising a host network communication device for sending signals wirelessly from the computing device to a plurality of client network communicating devices.

3. The computer system of claim 2 further comprising:
a first concrete forming face panel;
wherein the heating device comprises a first electric heating element in thermal contact with the first concrete forming face panel;
a first client network communicating device for receiving the wireless signals from the computing device;
wherein the controller comprises a first controller operatively associated with the first client network receiving device and with the first electric heating element such that the first controller variably controls the amount of heat produced by the first electric heating element in response to signals from the first client network receiving device such that the computing device controls the temperature of the first concrete forming face panel.

4. The computer system of claim 3 further comprising:
a second concrete forming face panel;
a second electric heating element in thermal contact with the second concrete forming face panel;
a second client network receiving device for receiving the wireless signals from the computing device;
a second controller operatively associated with the second client network receiving device and with the second electric heating element such that the second controller variably controls the amount of heat produced by the second electric heating element in response to signals from the second client network receiving device such that the computing device controls the temperature of the second concrete forming face panel.

5. The computer system of claim 4, wherein the computing device is configured to send a first signal to the first client network receiving device for controlling the amount of heat produced by the first electric heating element and a second signal to the second client network receiving device for controlling the amount of heat produced by the second electric heating element so that the temperature of the first concrete forming face panel can be controlled separately from the temperature of the second concrete forming face panel.

6. The computer system of claim 3 further comprising:
a first temperature sensor operatively associated with the first client network communication device; and
wherein the first client network communication device is configure to send signals to the host network communication device corresponding to the temperature sensed by the first temperature sensor.

7. The computer system of claim 4 further comprising:
a second temperature sensor operatively associated with the second client network communication device; and
wherein the second client network communication device is configure to send signals to the host network communication device corresponding to the temperature sensed by the second temperature sensor.

8. The computer system of claim 1, wherein step (c) lasts for at least the first 24 hours of curing of the quantity of concrete.

9. The computer system of claim 4 further comprising:
a first temperature sensor operatively associated with the first client network communication device;
wherein the first client network communication device is configure to send signals to the host network communication device corresponding to the temperature sensed by the first temperature sensor;
a second temperature sensor operatively associated with the second client network communication device; and
wherein the second client network communication device is configure to send signals to the host network communication device corresponding to the temperature sensed by the second temperature sensor.

* * * * *